United States Patent
Head et al.

(10) Patent No.: US 10,364,001 B1
(45) Date of Patent: Jul. 30, 2019

(54) STRUCTURAL SPACING COMPONENT WITH COMPRESSION AND TENSION CHARACTERISTICS

(71) Applicant: A&P Technology, Inc., Cincinnati, OH (US)

(72) Inventors: Andrew A. Head, Cincinnati, OH (US); Pamela M Schneider, Independence, KY (US)

(73) Assignee: A&P Technology, Inc., Cincinnati, OH (US)

( * ) Notice: Subject to any disclaimer, the term of this patent is extended or adjusted under 35 U.S.C. 154(b) by 0 days.

(21) Appl. No.: 15/787,531

(22) Filed: Oct. 18, 2017

Related U.S. Application Data

(60) Provisional application No. 62/409,791, filed on Oct. 18, 2016.

(51) Int. Cl.
*B63B 59/02* (2006.01)
*E02B 3/26* (2006.01)

(52) U.S. Cl.
CPC .............. *B63B 59/02* (2013.01); *E02B 3/26* (2013.01)

(58) Field of Classification Search
CPC ................................ B63B 59/02; E02B 3/26
See application file for complete search history.

(56) References Cited

U.S. PATENT DOCUMENTS

| | | | |
|---|---|---|---|
| 5,878,685 A * | 3/1999 | Hemphill | B29C 44/569 114/219 |
| 6,814,019 B2 * | 11/2004 | Mears | B63B 43/14 114/123 |
| 6,823,811 B1 * | 11/2004 | Drake | B63B 59/02 114/219 |
| 7,143,714 B1 * | 12/2006 | Schmidt | B63B 59/02 114/345 |
| 8,087,371 B1 * | 1/2012 | Sadegh | B63B 59/02 114/119 |
| 8,721,224 B2 * | 5/2014 | Hough | E02B 3/26 405/215 |
| 9,180,945 B1 * | 11/2015 | Mears | B63C 7/00 |
| 9,216,803 B2 * | 12/2015 | Hough | E02B 3/26 |
| 2002/0050241 A1 * | 5/2002 | Leonard | B63B 59/02 114/220 |
| 2008/0000409 A1 * | 1/2008 | Adams | E02B 3/26 114/219 |
| 2008/0083364 A1 * | 4/2008 | Taylor | B63B 59/02 114/360 |
| 2014/0059979 A1 * | 3/2014 | Szydlowski | B65B 17/00 53/467 |

* cited by examiner

*Primary Examiner* — S. Joseph Morano
*Assistant Examiner* — Jovon E Hayes
(74) *Attorney, Agent, or Firm* — Answers IP, LLC; Cheryl A. Milone; Lissi M. Marquis

(57) ABSTRACT

A spacing component comprising a longitudinal axis wherein the structural spacing component may be configured to provide a boundary between a first object and a second object along its longitudinal axis is described. The structural spacing component may further comprise a restrictive layer enclosing an interior region wherein the restrictive layer may comprise a first length along the longitudinal axis and at least one second length transverse to the longitudinal axis. In examples, the restrictive layer may be formed of a plurality of braided strands. Additionally, the restrictive layer may define at least a partially enclosed interior region and may have flexural stiffness to maintain the first length as greater than the second length.

20 Claims, 69 Drawing Sheets

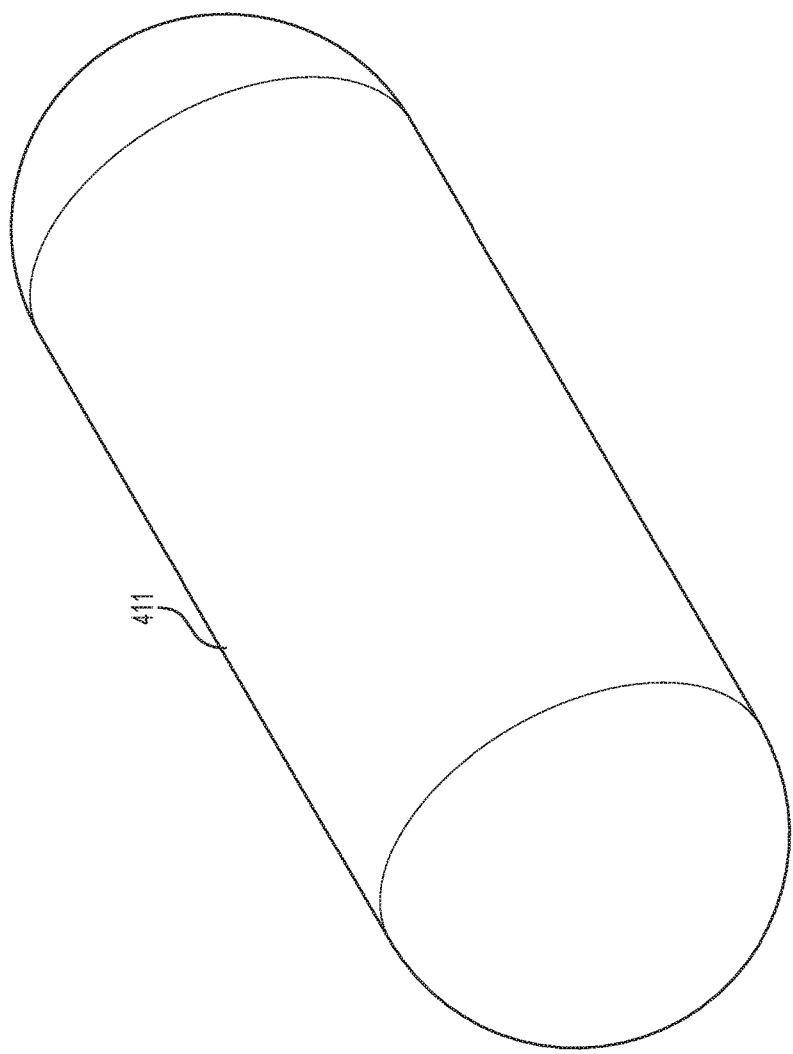

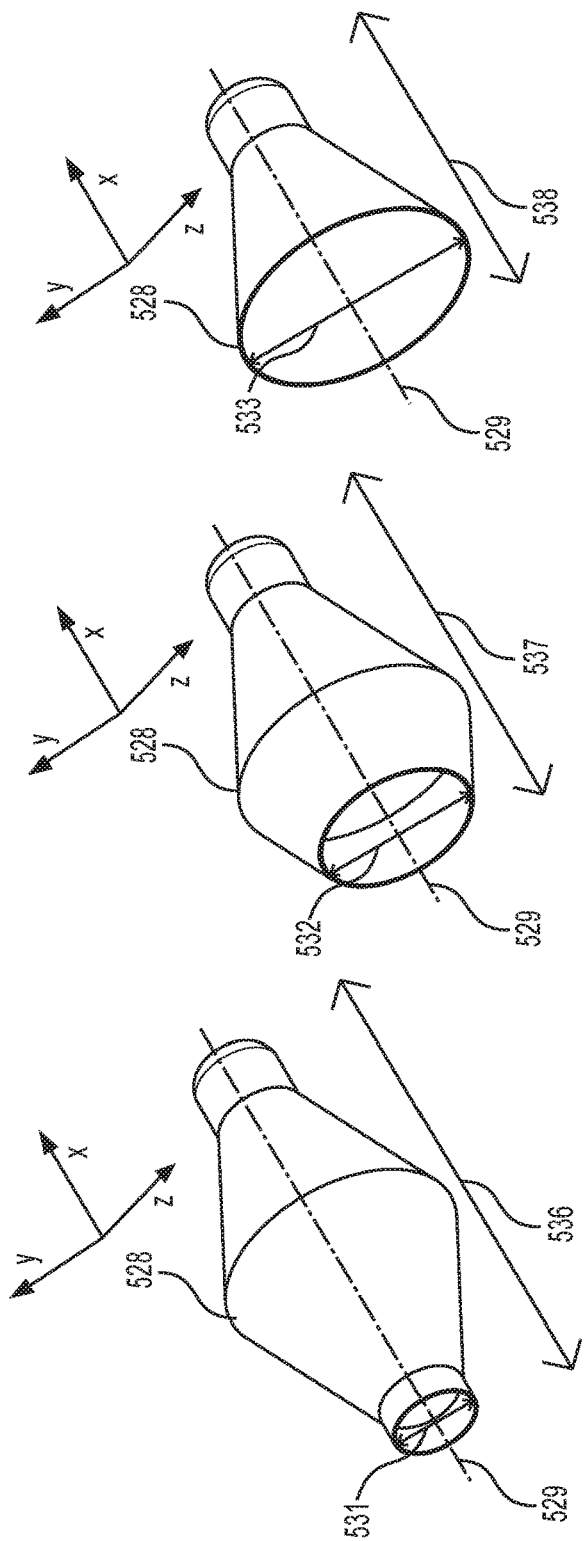

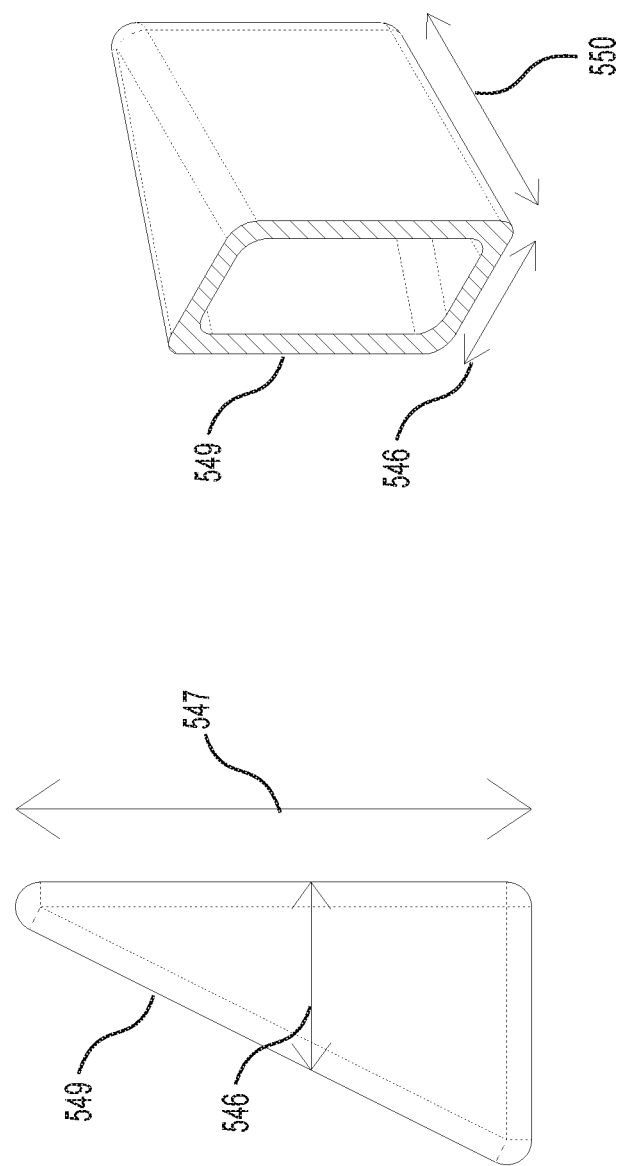

STRUCTURAL SPACING COMPONENT WITH COMPRESSION AND TENSION CHARACTERISTICS

TECHNICAL FIELD

The present subject matter relates to a storable structural spacing component which may withstand compression and tension without buckling or bending and which may be affixed between pluralities of articles.

BACKGROUND

When affixing a first article to a second article, it may be desired to create a certain amount of space between the articles such that the first article and second article may not come into contact with each other. In an example, the first article may comprise a boat and the second article may comprise an article to which the boat may be affixed, or docked, such as an additional boat. The costly nature of boats and other water vehicles, necessitates that appropriate measures be made to protect them from damage resulting from contact with any article which may be nearby including other watercraft, shorelines, outcroppings or other articles.

SUMMARY

Described in examples herein is a storable structural spacing component which may withstand compression and tension along a longitudinal axis without buckling or bending and which may be affixed between pluralities of articles. The structural spacing component of examples herein may be comprised of a tubular restrictive layer, which may serve as a boundary between an environment and the interior region comprising the tubular restrictive layer. An environment may be anything which may be comprised outside the tubular restrictive layer. The structural spacing component of examples herein may additionally be comprised of a longitudinal axis, a first length and a second length, wherein the first length may lie along the longitudinal axis and may be the longest length, and a second length which may be the diameter of the structural spacing component when rigidized, or a dimension of the structural spacing component in a direction transverse to the longitudinal axis. In examples, the structural spacing component may comprise a plurality of second lengths wherein the first length may be longer than at least one of the second lengths.

The structural spacing component of the present subject matter may comprise a plurality of states including, a pre-rigidized, a partially rigidized and a rigidized state. A structural spacing component comprised in a pre-rigidized state may describe a fully deflated condition while a structural spacing component comprised in a rigidized state may retain a three dimensional form, or may be completely inflated. Therefore, a partially rigidized state may describe any state in-between the pre-rigidized and rigidized states, wherein the braided structure may comprise a three dimensional from, which may not comprise the final three dimensional form of the structural spacing component as manufactured. Additionally, examples of the structural spacing component may comprise a single rigidized state.

Structural spacing components of examples herein may be rigidized to transition the structural spacing component between pre-rigidized, partially rigidized and rigidized states, through the introduction of a rigidizing media, or material, into the interior region comprising the tubular restrictive layer of the structural spacing component. A rigidizing media may be defined as a material, substance or other component that may cause the structural spacing component to take on and retain an intended three dimensional configuration. Examples of rigidizing media may include compressed gas such as air, nitrogen, helium; pressurized or non-pressurized liquids including water, glycol, or other liquids; or liquefied or flow-able solids including granular solids or powders; or various combinations of these materials. Examples of the structural spacing component may comprise ports which may allow for the introduction and expulsion of a rigidizing media into or out of the interior region of the tubular restrictive layer.

The structural spacing component of the present subject matter may be affixed between a plurality of articles such that a structural spacing component may be affixed to a first article and a second article and such that the structural spacing component may define a certain amount of space between the first article and the second article. The structural spacing component described herein may allow for angular displacement of the first article from the second article and may comprise sufficient flexural stiffness to resist bending and buckling. Additionally, in examples, the space or degree of separation, between the first article and the second article may be defined by a first length, or the dimension of the structural spacing component along the longitudinal axis comprising the structural spacing component.

The structural spacing component of examples may comprise affixment devices which may include hooks, loops, clamps, ratchets, handles and other affixment devices. Additionally, the structural spacing component of examples may comprise affixment features which may comprise channels through which ropes, chains, wire cables or other affixment devices may pass.

Structural spacing components described herein may have particular utility in nautical applications in which a structural spacing component may be comprised between two articles wherein the first article may be a boat and the second article may be a constraint. A constraint may comprise a dock, an outcropping, a buoy, a second boat, a pier or other locations or articles including an individual.

BRIEF DESCRIPTION OF DRAWINGS

FIG. 4 is illustrative of a structural spacing component of examples comprising domed endcaps;

FIG. 5G is illustrative of an isometric cross section of the structural spacing component illustrated in FIG. 5F;

FIG. 5H is illustrative of an additional isometric cross section of the structural spacing component illustrated in FIG. 5F;

FIG. 5I is illustrative of an additional isometric cross section of the structural spacing component illustrated in FIG. 5F;

FIG. 5M is illustrative of an additional example of a structural spacing component of examples herein;

FIG. 5N is illustrative of an isometric cross sectional view of the structural spacing component illustrated in FIG. 5M;

DETAILED DESCRIPTION

Figure 1:
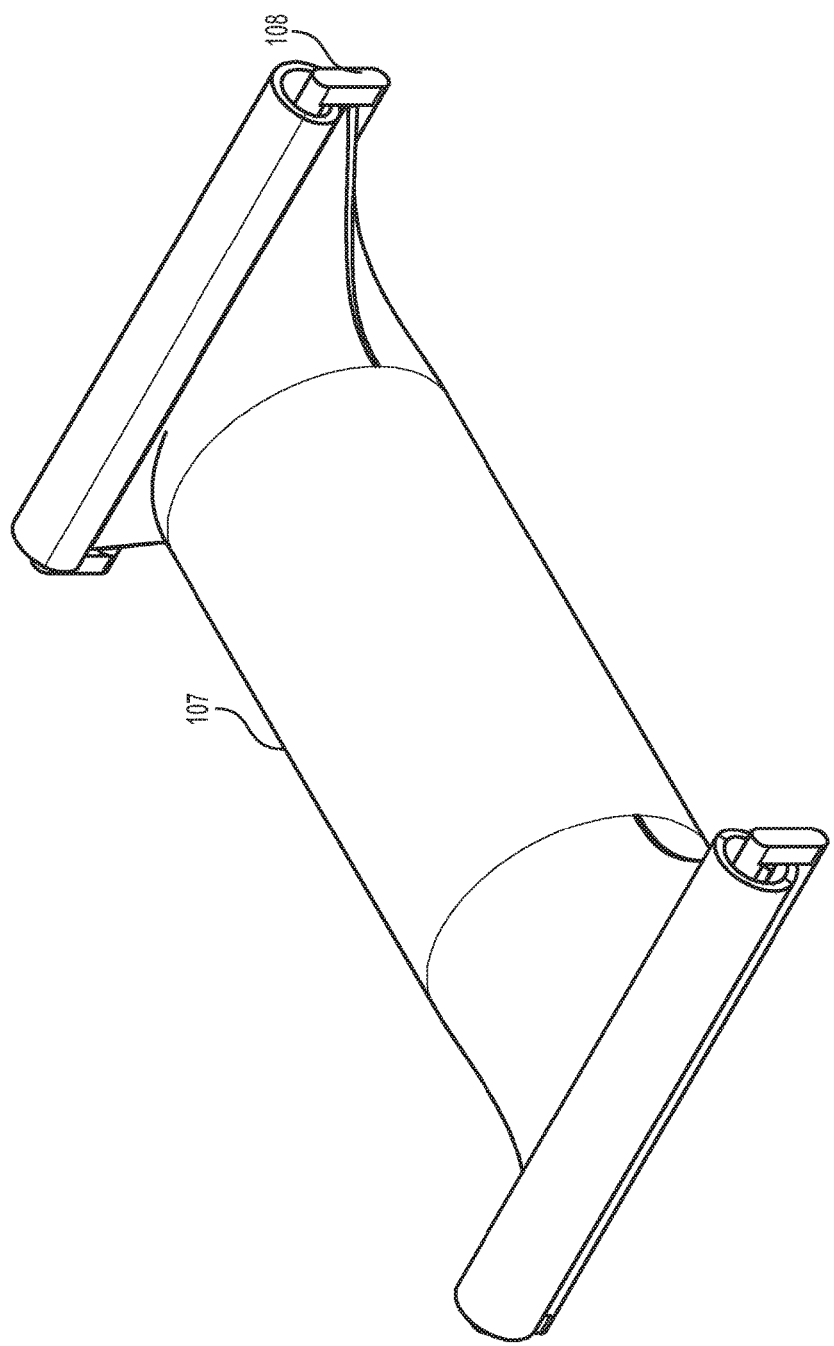
FIG. 1 is illustrative of a structural spacing component of examples comprising clamps.

The present subject matter relates to a storable structural spacing component comprising flexural stiffness to resist bending and buckling and which may be affixed between pluralities of articles. In examples herein, the structural spacing component may comprise a boat standoff such that the structural spacing component may be configured to define a certain amount of space between a boat and another boat or article and such that the dimension of longest longitudinal length along the longitudinal axis comprising the structural spacing component may define the amount of space comprised between the two articles.

The structural spacing component of the present subject matter may comprise a tubular restrictive layer wherein the tubular restrictive layer may serve as a boundary between an environment, which may be defined as everything which may be comprised outside of the tubular restrictive layer, and an interior region comprising the tubular restrictive layer. In the specification herein, a tubular restrictive layer may be generally defined as a hollow tubular structure which may comprise closed ends such that an interior region may be formed in which a rigidizing media, or rigidizing material, may be introduced. The term layer as defined in the specification herein may therefore be defined as a tubular shell which may not comprise seams, breaks or other discontinuities along the direction of the longitudinal axis. While examples of the structural spacing component described herein may comprise a tubular layer, or shell, additional examples of the restrictive layer comprising structural spacing components may be comprised of a single or plurality of sheets of material such that in examples ends of the sheet or sheets may be affixed to one another for the formation of a tubular restrictive layer such that the ends that may be affixed to one another may be configured to be oriented along the direction of the longitudinal axis. In additional examples, the ends may be oriented to be transverse to the longitudinal axis.

The tubular restrictive layer may comprise a textile component which, in examples, may comprise a layer of braided or woven fabric. Additionally, the tubular restrictive layer may comprise an impermeable layer affixed to the textile component wherein the impermeable layer may comprise an impermeable tubular sleeve or an impermeable coating applied to the textile component. In additional examples, the impermeable layer may not be affixed to the braided structure.

The structural spacing component of examples herein may comprise two states, a rigidized state and a pre-rigidized state, or may comprise only a single rigidized state. Further, the structural spacing component may comprise states in-between the pre-rigidized state and the rigidized state such that the structural spacing component may be partially rigidized.

The term "rigidized state" may define a state in which the structural spacing component of the present subject matter may retain a three dimensional form while the term "pre-rigidized state" may define a state in which the structural spacing component may not retain a three dimensional form. Additionally, the term "partially rigidized" may define a state or states between the pre-rigidized and rigidized states.

As defined in the specification herein, a three dimensional form may be used to define the structural spacing component of examples comprised in a partially rigidized or fully rigidized state, wherein a structural spacing component comprised in a pre-rigidized state may be generally flat, or deflated, or may not comprise a three dimensional form. The term three dimensional form encompasses the description defined herein.

The rigidized state of the structural spacing component of examples herein may be retained through properties inherent to the material comprising the tubular restrictive layer of the structural spacing component, such as stiffness or rigidity, or may be retained through the use of a rigidizing media, or rigidizing material, which may be comprised within the interior region of the structural spacing component. A rigidizing media may be defined as a material, substance or other component that may cause the structural spacing component to take on and retain an intended three dimensional configuration, wherein the structural spacing component may be comprised in a partially or fully rigidized state. Examples of rigidizing media may include compressed gas such as air, nitrogen, helium; pressurized or non-pressurized liquids including water, glycol, or other liquids; or liquefied or flow-able solids including granular solids or powders; or various combinations of these materials, as well as other media known to the industry. Subsequently, in examples of the present subject matter, the process of rigidizing the structural spacing component may comprise the step of inflating the structural spacing component with air to transition the structural spacing component from a pre-rigidized state, through a plurality of partially rigidized states and finally, to a rigidized state. Additionally, in another example of the present subject matter, the process of rigidizing the structural spacing component may comprise the step of filling the structural spacing component with water to transition the structural spacing component from a pre-rigidized state to a rigidized state.

As described herein the structural spacing component of the present subject matter, as deployed, may be affixed between pluralities of articles and may further be used to constrain motions of the plurality of articles relative to one another. In an example, the structural component herein may be affixed between a first article and a second article wherein the first article may comprise a boat and the second article may comprise a constraint. A constraint may be defined as an article to which the boat may be docked. Therefore a constraint may comprise a dock, an outcropping, a buoy, a second boat, a pier or other locations or articles.

Deployment may be defined as a state in which the structural spacing component may be configured for use, or partially or fully rigidized, and affixed between pluralities of articles. Therefore, the structural spacing component in a deployed state may be rigidized and configured to create a certain amount of space between a first article and a second article and may comprise the desired stiffness or rigidity to resist buckling or bending.

In an additional example of the structural component herein, the first article in the deployed state may comprise a boat while the second article may comprise an individual. The structural spacing component may then be employed to aid in the guiding of the boat to a constraint wherein the structural spacing component may then be affixed to the constraint and the structural article may then be comprised between the boat and the constraint. In an example, a boat may approach a dock for refueling. As the boat may approach the dock, the structural spacing component may be converted from a pre-rigidized state to a rigidized, or partially rigidized, state such that an individual standing on the dock may grip the structural spacing component to guide the boat to the re-fueling station.

The rigidized structural spacing component of examples herein may serve as a component to separate a boat and a constraint and may comprise sufficient flexural stiffness to resist buckling or bending. The term rigid, or rigidity, as used in the specification herein may be defined as the resistance of the structural spacing component to deformation. Further, in an example the term rigid, or rigidity, may additionally be defined as the resistance of the structural spacing component to any change in a first length comprising the structural spacing component and resistance to change in one or a plurality of second lengths. Flexural stiffness may be defined in the specification herein as the resistance of the structural spacing component to bending.

In examples of the structural spacing component described herein, the space or degree of separation, between the first article and the second article may be defined by the dimension of the structural spacing component along the longitudinal axis of the structural spacing component. The length of the structural spacing component along the longitudinal axis may be defined as a first length comprising the structural spacing component, and may be the longest length comprising the structural spacing component. Additionally, the structural spacing component may comprise a second length, or plurality of second lengths which may be defined as the diameter or length of the structural spacing component in a direction transverse to the longitudinal axis of the structural spacing component. In further examples of the present subject matter, the space or degree of separation, between the first article and the second article may be defined by one of or a plurality of the second lengths comprising the structural spacing component.

Additionally, the structural spacing component may be configured to resist bending and buckling along the longitudinal axis. In additional examples, the structural spacing component may be configured to resist buckling or bending in directions transverse or at angles to the longitudinal axis comprising the structural spacing component.

The structural spacing component of examples of the present subject matter may comprise a tubular restrictive layer which, as described herein, may serve as a boundary between the environment and the interior region of the tubular restrictive layer.

The tubular restrictive layer of examples of the present subject matter may comprise a plurality of various fittings to seal the ends of the tubular restrictive layer such that a rigidizing media may be comprised within the tubular restrictive layer and such that the rigidizing media may not escape. The tubular restrictive layer of the present subject matter may be comprised of a solid layer comprised of molded or injection molded rubber, plastics, elastomeric material or other materials. Additionally, the tubular restrictive layer may comprise a textile component as described in examples of the structural spacing component of the present subject matter. Further, in examples of the present subject matter the tubular restrictive layer may be comprised of two sheets of material such that the sheets of material may be affixed and such that when the two affixed sheets may be expanded, a tubular component may be obtained.

An example of the structural spacing component of the present subject matter may comprise a tubular restrictive layer of tubular shape and a plurality of fittings. This example is illustrated in FIG. 1. The tubular restrictive layer 107 of the present subject matter may comprise clamps 108 affixed to the ends of the tubular restrictive layer 107 such that the ends of the tubular restrictive layer 107 may be wrapped around the clamps 108 and such that the ends of the restrictive layer may be sealed. In further examples of the present subject matter, the clamps may comprise metal bars wherein the bars may be affixed to one another, or additionally crimps or other fittings which may seal the ends of the tubular restrictive layer.

In additional examples of FIG. 1, the ends of the tubular restrictive layer 107 may be sewn, fused, stapled, adhered or otherwise affixed to one another such that a rigidizing media may not escape from the interior region of the tubular restrictive layer comprising the structural spacing component.

Figure 2:
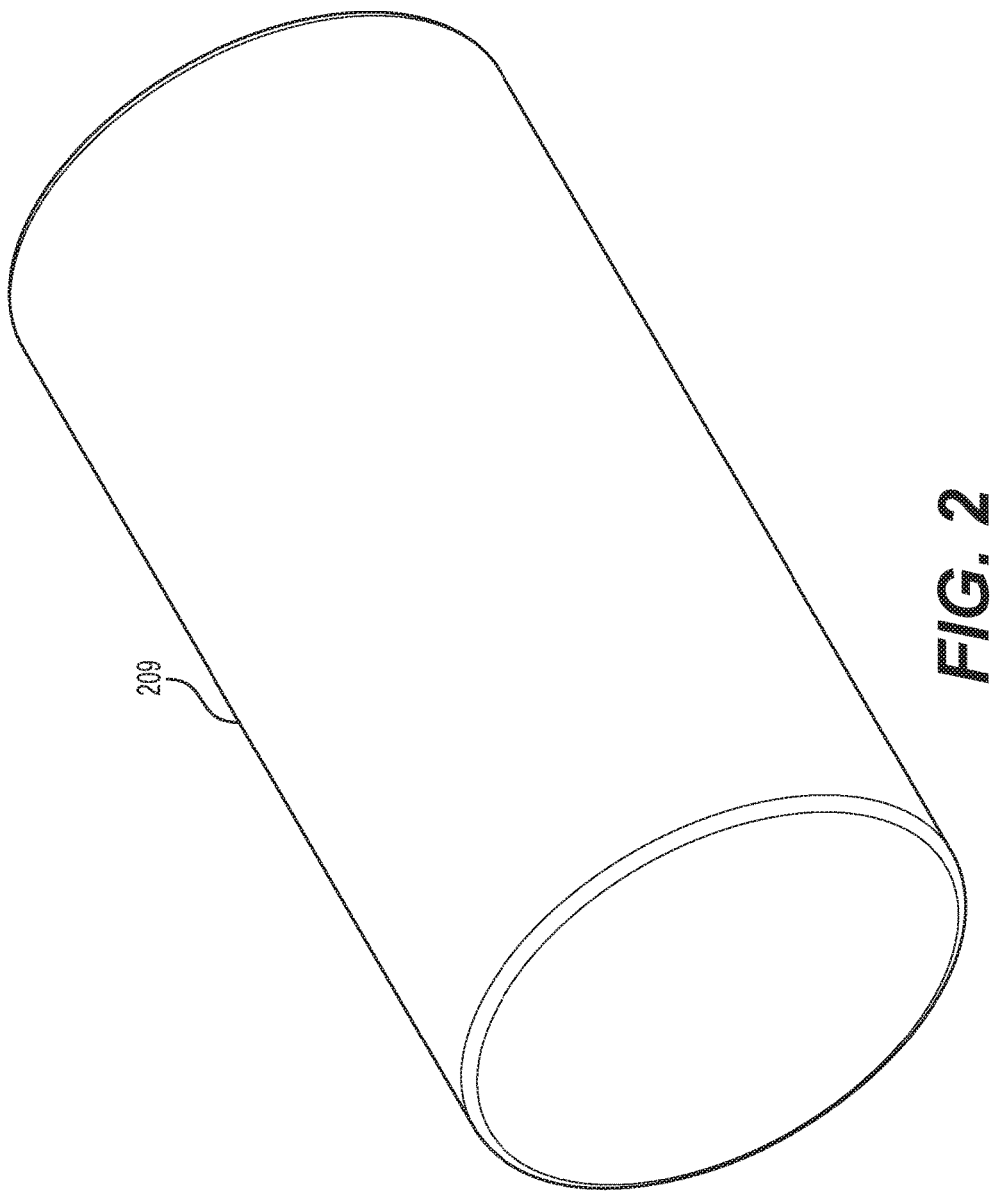
FIG. 2 is illustrative of a structural spacing component of examples comprising endcaps.
Figure 3:
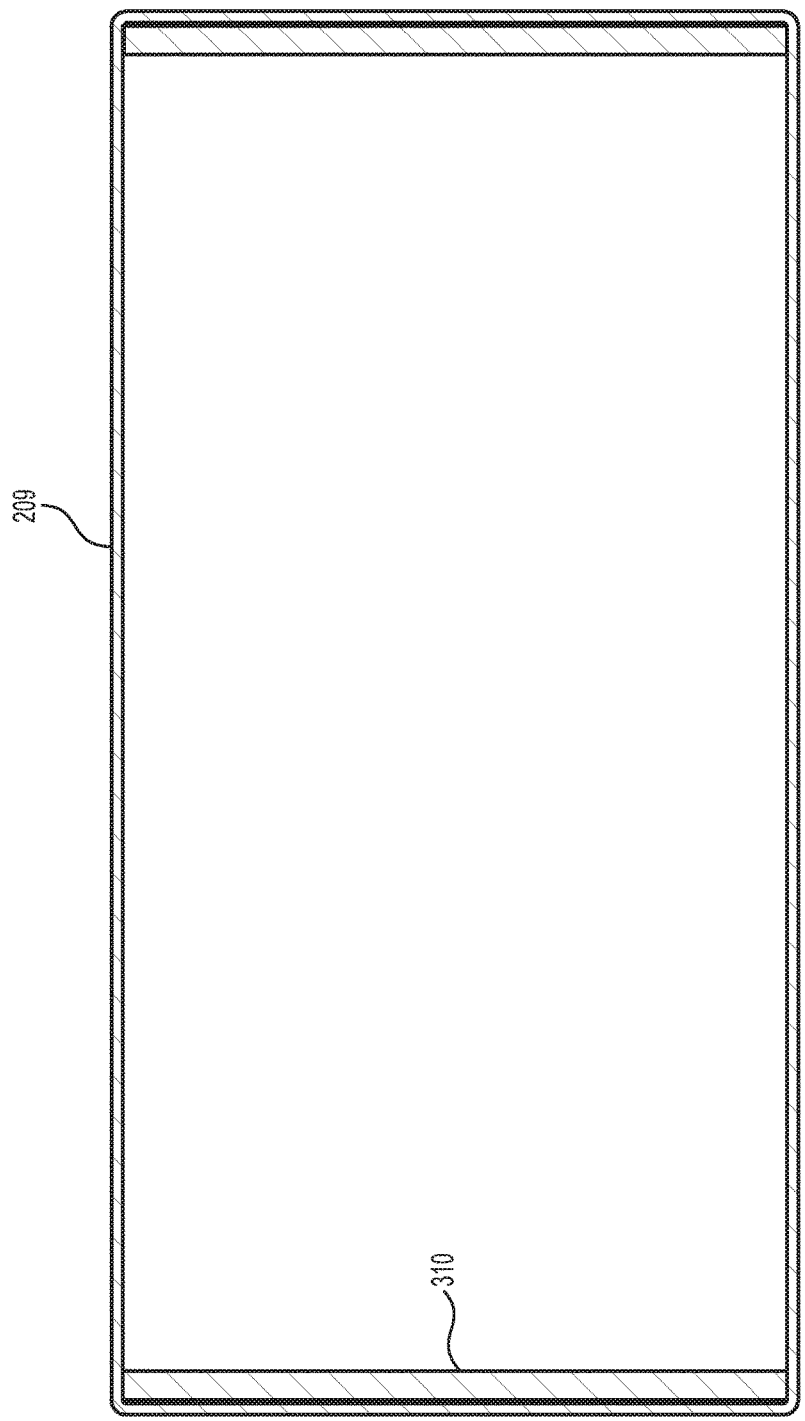
FIG. 3 is illustrative of a cross section of the structural spacing component of FIG. 2.

In additional examples of the tubular restrictive layer comprising the structural spacing component of the present subject matter, the tubular restrictive layer may be affixed to endcaps wherein the ends of the tubular restrictive layer may be sealed over the endcaps. An example of the present subject matter which may comprise a tubular restrictive layer 209 as well as a plurality of endcaps 310 is illustrated in FIGS. 2 and 3. The example of the structural spacing component 209 illustrated in FIGS. 2 and 3 may comprise flat disk shaped endcaps 310 wherein the ends of the tubular restrictive layer 209 may be affixed to the endcaps 310 such that the tubular restrictive layer 209 may retain a rigidizing media.

The endcaps of examples of the present subject matter may comprise materials including metal, plastic, glass, rubber or other materials. Further, endcaps may comprise a plurality of different shapes. In an additional example of the present subject matter illustrated in FIGS. 4 and 5A-5E the endcaps 512 may comprise a domed shape wherein the tubular restrictive layer 411 may be affixed to the endcaps 512 as described in other examples of the present subject matter.

In an additional example of the present subject matter, the structural spacing component may comprise both inner and outer endcaps wherein the inner endcap may be comprised within the interior region of the tubular restrictive layer and the outer endcap may be comprised on the exterior surface of the tubular restrictive layer. In this example, the end of the tubular restrictive layer may be affixed between the inner and outer endcaps such that the tubular restrictive layer may comprise a rigidizing media and the inner and outer endcaps may not be separated. In this example, the inner and outer endcaps may be affixed through methods including sewing, stitching, welding, bolting or through a plurality of other affixment methods. Additionally, in this example the endcaps may be domed, hollow, solid, cup shaped or may comprise additional features for the construction of the structural spacing component of examples herein.

In an example of a structural component comprising a tubular restrictive layer comprised of a braided structure, the affixment of the endcaps to the ends of the tubular restrictive layer may seal the ends of the braided structure such that the ends of tows, comprising the braided structure, may be affixed to the endcaps and such that the orientation of tows within the braided structure may be constrained by the affixment of the braided structure to the endcaps.

As described herein, the space or degree of separation, between the first article and the second article may be defined by the dimension of the structural spacing component along the longitudinal axis comprising the structural spacing component, wherein the dimension of the structural spacing component along the longitudinal axis may comprise the greatest longitudinal length of the structural spacing component. The length of the structural spacing component of examples along the longitudinal axis may be defined as a first length of the structural spacing component. Additionally, the structural spacing component may comprise one or a plurality of second lengths, which may comprise the inner or outer diameter of the structural spacing components of examples, or which may be defined as dimensions of the structural spacing component transverse to the longitudinal axis comprising the structural spacing component, wherein at least one of the second lengths may be smaller than the first length. Compression and tension forces, or components of these forces, in examples, may be directed along the longitudinal axis. In examples, compression and tension forces or components of compression and tension forces may be transverse to the longitudinal axis, or may be traverse to the longitudinal axis.

Tension forces may be defined in the specification herein as any forces which may tend to result in an increase in the first length comprising the structural spacing component in one or more directions or across one or more surfaces of the structural spacing component while compression forces may be defined as any forces which may tend to result in the reduction of the first length comprising the structural spacing component in one or more directions or across one or more surfaces.

Figure 5A:
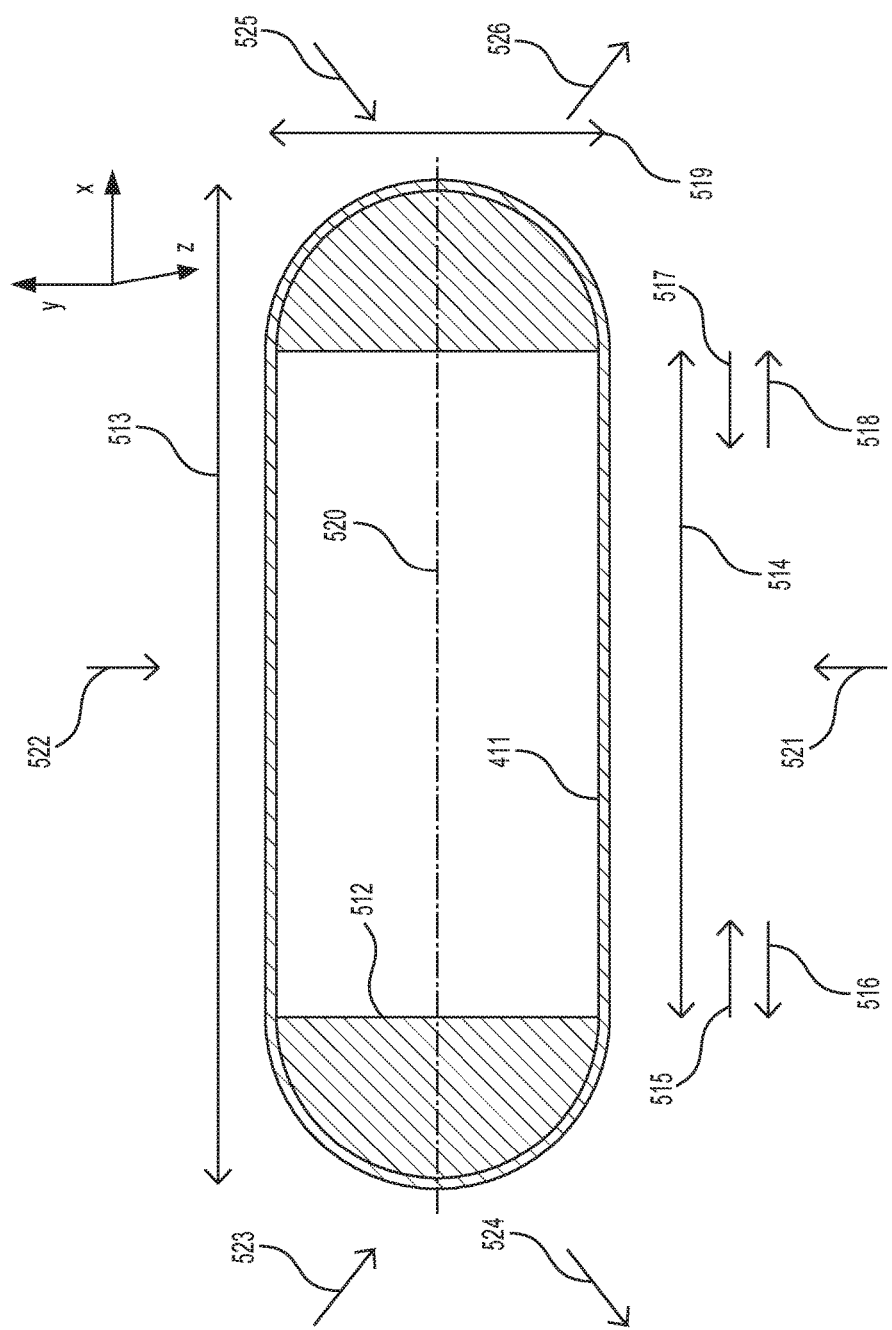
FIG. 5A is illustrative of a cross section of the structural spacing component of FIG. 4.

FIGS. 5A-5I will now be described in relation to the first length, second length and compression and tension forces as defined herein. FIG. 5A is illustrative of a cross section of FIG. 4 and comprises endcaps 512, a tubular restrictive layer 411 and a longitudinal axis 520. Additionally illustrated is a coordinate system in which the longitudinal axis lies along the X direction and the Y direction is perpendicular to the longitudinal axis, lying along the X direction.

The structural spacing component illustrated in FIG. 5A may comprise a first length which may comprise lengths 514 or 513 wherein length 514 may comprise the section of constant diameter of the structural spacing component while length 513 may comprise the section of constant diameter of the structural spacing component as well as two sections of transitory diameter of the structural spacing component. Additionally illustrated in FIG. 5A is a second length 519 which may define the inner or outer diameter of the structural spacing component, or length or lengths of the structural spacing component in directions transverse to the longitudinal axis, and which may be generally smaller than lengths 513 and 514 which lie along the longitudinal axis 520 of the structural spacing component. As described herein and illustrated in FIG. 5A the first length 514 or 513 may be generally larger than the second length 519 such that the dimension of longest longitudinal length may lie along the longitudinal axis 520 of the structural spacing component. Additionally, illustrated in FIG. 5A are tension forces 516 and 518 as well as compression forces 515 and 517, of which both the compression 515 and 517 and tension forces 516 and 518 may be directed along the longitudinal axis 520 as illustrated in FIG. 5A. As defined herein, the tension forces 516 and 518 may result in the increase of the first length comprising the structural spacing component while compression forces 516 and 518 may result in the decrease in the first length comprising the structural spacing component. Additionally illustrated in FIG. 5A are forces 523, 524, 525, 526, 522 and 521 which may be directed at angles traverse and transverse to the longitudinal axis 520. Forces 523, 524, 525 and 526 may comprise both compression and tension components which may tend to induce bending and buckling in the structural component of examples herein.

In an example, the forces 523 and 525 may occur in tandem with one another and may comprise a force component in the direction of force 522. Additionally, force 523 may comprise a force component in the direction of force 515 while force 525 may comprise a force component in the direction of force 517. Forces 523 and 525 in tandem may result in bending of the structural component which may induce tension to occur along some surfaces of the structural spacing component and compression to occur along other surfaces of the structural spacing component.

In an additional example, the structural spacing component illustrated in FIG. 5A may experience forces 524 and 526 in tandem with one another. As described for forces 523 and 525, forces 524 and 526 may comprise a force component in the direction of force 522. Further, force 524 may comprise a force component in the direction of force 516 while force 526 may comprise a force component in the direction of force 518. As described herein, when subjected to forces 524 and 526, some surfaces of the structural component may experience tension while others may experience compression as forces 524 and 526 attempt to bend the structural component illustrated in FIG. 5A.

Figure 5C:
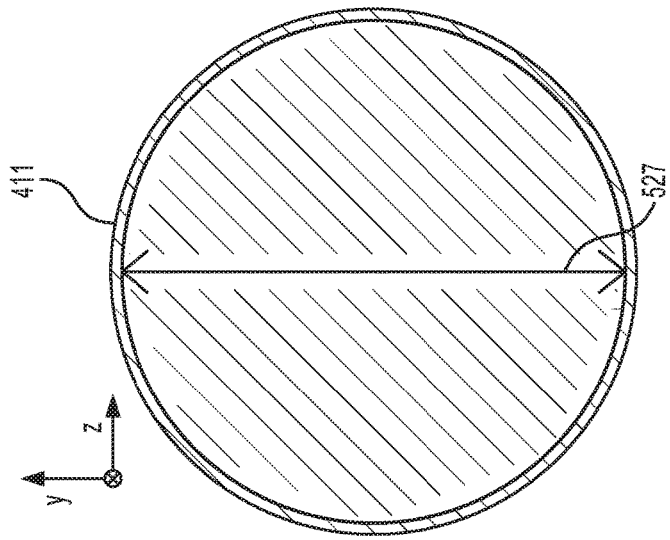
FIG. 5C is illustrative of an additional cross section of the structural spacing component illustrated in FIG. 4.
Figure 5B:
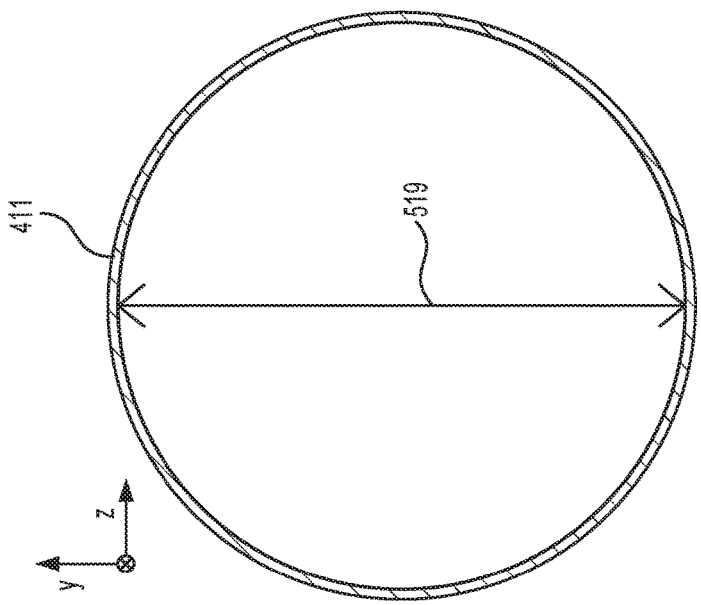
FIG. 5B is illustrative of an additional cross section of the structural spacing component illustrated in FIG. 4.

FIGS. 5B and 5C are illustrative of cross sections of the structural component illustrated in FIG. 5A. The cross section of the structural spacing component of FIG. 5B is a cross section taken along the section of constant diameter while FIG. 5C is illustrative of a cross section taken along a portion of transitory diameter. The structural spacing component as illustrated in FIGS. 5A and 5B comprises tubular restrictive layer 411 and second length 519, wherein second length 519 may generally be smaller that of the first length 513 or 514. FIG. 5C is additionally illustrative of second length 527 which is smaller than second length 519 and additionally smaller than lengths 513 and 514. In examples, the structural spacing component illustrated in FIGS. 4-5E may be partially rigidized such that the second length may be defined as the length of the structural spacing component in directions transverse to the longitudinal axis 520, wherein the second lengths may be greater or smaller than second lengths 519 and 527. As illustrated in FIGS. 5B and 5C, the X direction comprising the coordinate system as illustrated, may be oriented such that the X direction may be into the page.

Figure 5E:
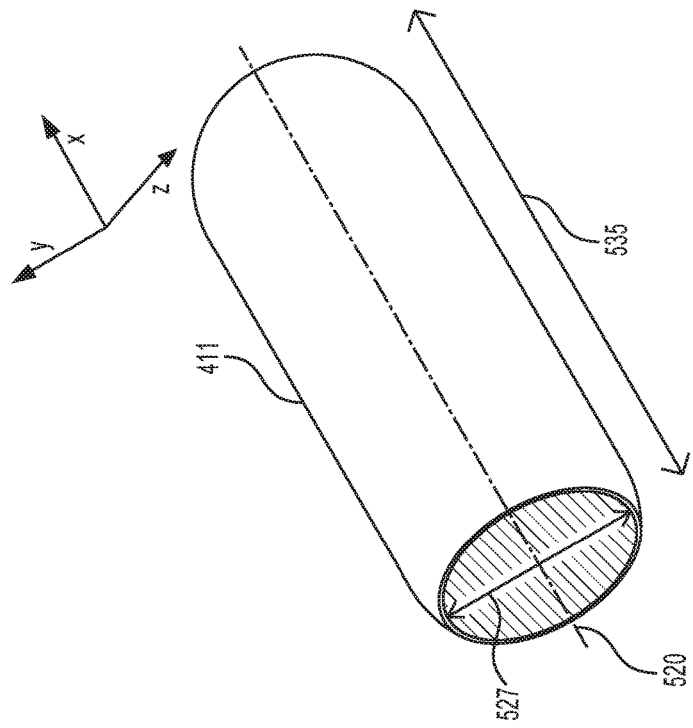
FIG. 5E is illustrative of an additional isometric cross section of the structural spacing component illustrated in FIG. 4.
Figure 5D:
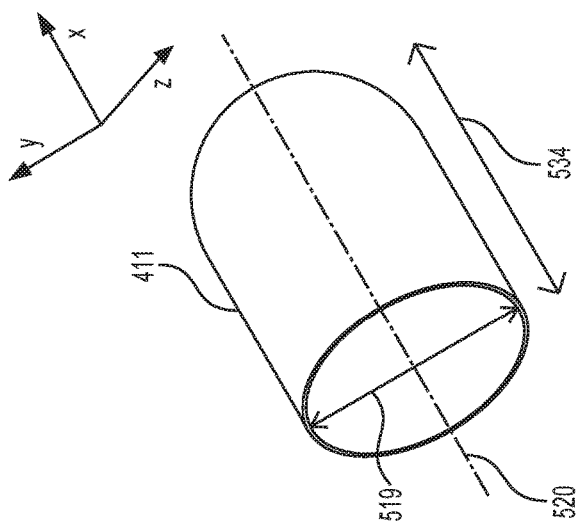
FIG. 5D is illustrative of an isometric cross section of the structural spacing component illustrated in FIG. 4.

FIG. 5D is illustrative of an isometric view of the cross section illustrated in FIG. 5B wherein the second length 519 of the structural spacing component may be viewed in comparison to a length portion 534 of the first length 513. FIG. 5E is illustrative of an isometric view of the cross section illustrated in FIG. 5C wherein the second length 527 may be viewed in comparison to a length portion 535 of the first length 513. In the examples illustrated in FIGS. 5D and 5E, the length portions 534 and 535 of the first length 513 may lie along the longitudinal axis 520, or as illustrated by the coordinate systems, in the X direction, while the second lengths 519 and 527 may lie along the Y direction, or in a direction transverse to the longitudinal axis 520.

Figure 5F:
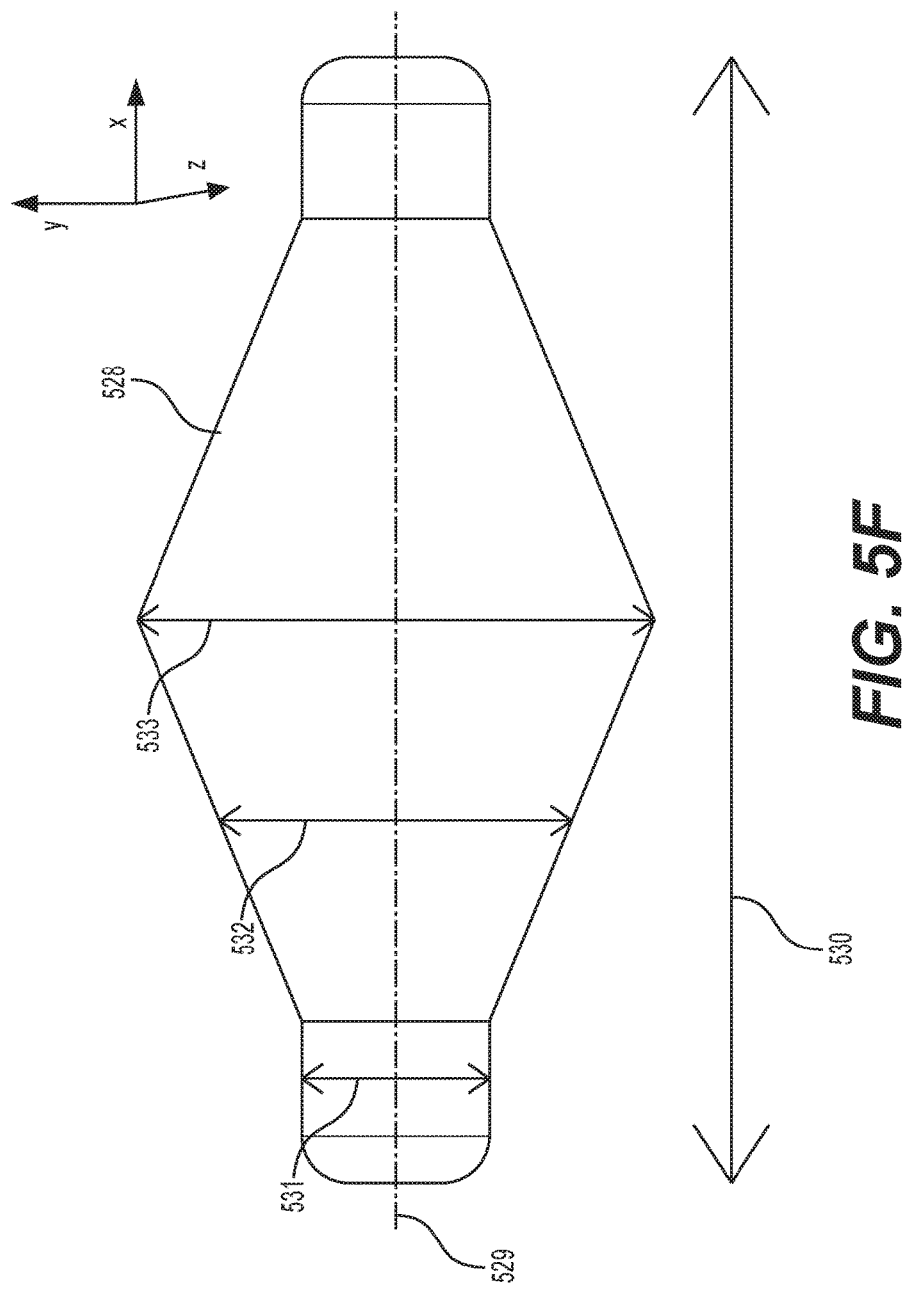
FIG. 5F is illustrative of a structural component of examples comprised of multiple and varying diameters along the longitudinal length of the structural spacing component.

An additional example of a structural spacing component is illustrated in FIG. 5F in which the structural spacing component may comprise a generally tubular restrictive layer 528, a longitudinal axis 529 and a first length 530 which may lie along the longitudinal axis 529 and which may define a certain amount of space between two articles. As illustrated in FIGS. 5A-5E a coordinate system is additionally provided in FIGS. 5F-5I. In this example, the longitudinal axis 529 comprising the structural spacing component may lie along the X direction. The structural spacing component illustrated in FIG. 5F may comprise several sections of constant diameter and several sections of variable diameter. Second length 531, may define a cross section in a region of constant diameter while second lengths 532 and 533 may be comprised in a region of transitory diameter. As illustrated in FIG. 5F, second lengths 531, 532 and 533 may be smaller than first length 530 and may lie along the Y direction, or in a direction transverse to the longitudinal axis 529 comprising the structural spacing component of examples herein. In examples herein, the first length 530 may be greater than one or a plurality of second lengths 531, 532 and 533, but may not be greater than all first lengths.

FIGS. 5G-5I are illustrative of isometric cross sections of the structural component illustrated in FIG. 5F. FIG. 5G is illustrative of an isometric cross section of the structural component illustrating second length 531 and a length portion 536 of the first length 530 oriented along the longitudinal axis 529. FIG. 5H is illustrative of a cross section of the structural component illustrating second length 532 and length portion 537 of the first length 530. FIG. 5I is illustrative of a cross section of the structural component illustrating second length 533 and length portion 538 of the first length 530. As illustrated, second lengths 531, 532 and 533 are smaller than first length 530 wherein first length 530 and length portions 536, 537 and 538 lie along the direction of the longitudinal axis 529. As illustrated by the coordinate systems in FIGS. 5G-5I, the longitudinal axis 529 may be oriented along the X direction while the second lengths 531, 532 and 533 may be oriented along the Y direction.

In additional examples of the present subject matter, the first length may be greater than at least one of the second lengths, such that in the example illustrated in FIGS. 5F-5I, the first length 530 may be greater than second lengths 531 and 532, but may not be greater than second length 533.

Figure 5L:
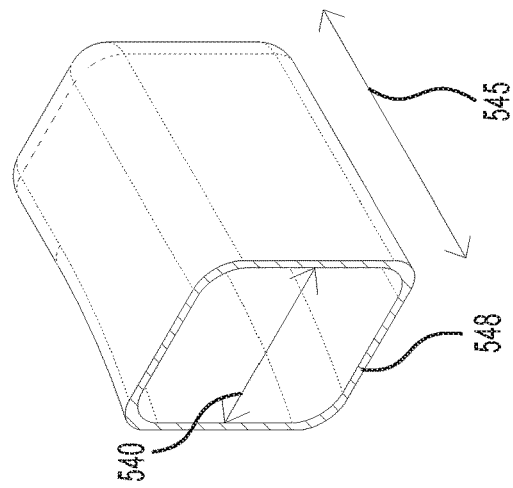
FIG. 5L is an additional isometric cross sectional view of the structural spacing component illustrated in FIG. 5J.
Figure 5K:
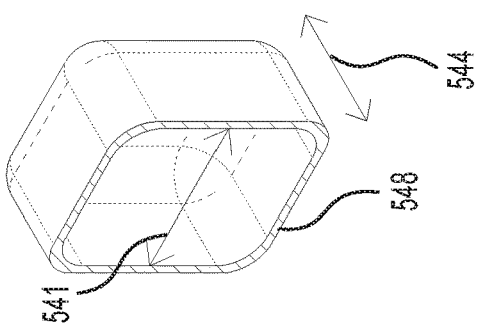
FIG. 5K is an isometric cross sectional view of the structural spacing component illustrated in FIG. 5J.
Figure 5J:
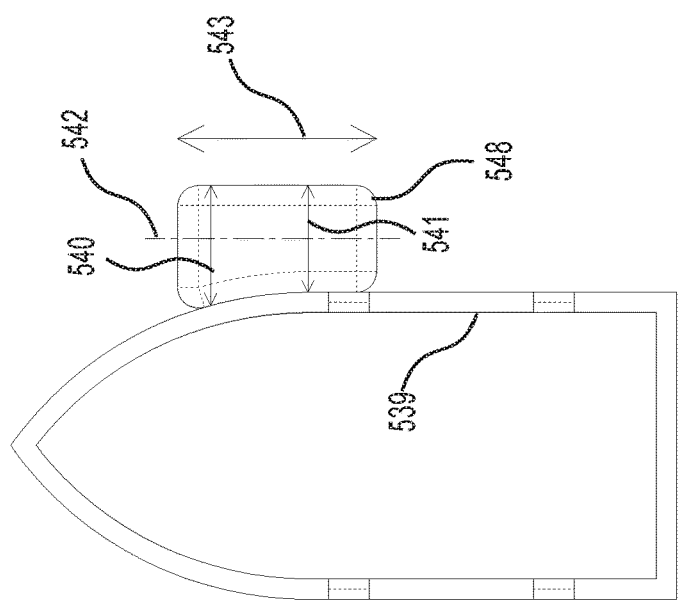
FIG. 5J is illustrative of a structural spacing component of examples which may comprise a shape which may reflect the curvature of the side of a boat.

Additional examples of the structural spacing component described herein may not comprise tubular restrictive layers and may additionally comprise restrictive layers of additional shapes and forms. Illustrated in FIGS. 5J-5L is a structural spacing component 548 which may be shaped to conform to the side of a boat 539 such that the structural spacing component 548 may additionally stabilize the boat 539 against a dock and such that the boat 539 may not pivot against the structural spacing component 548 or against the dock. Structural spacing component 548 may comprise a longitudinal axis 542 wherein a first length 543 may lie along the longitudinal axis 542 and such that the first length 543 may comprise the longest longitudinal dimension of the structural spacing component 548. The structural spacing component 548 may additionally comprise a plurality of second lengths 540 and 541 which may comprise inner or outer lengths in dimensions transverse to the longitudinal axis 542. Illustrated in FIG. 5K is an isometric cross section of the structural spacing component 548 wherein the cross section is representative of a cross section in a portion of constant second length 541. Additionally illustrated in FIG. 5K is length portion 544 which comprises a portion of the first length 543. FIG. 5L is illustrative of a cross section in a portion of transitory second length wherein second length 540 may be larger than second length 541. Additionally illustrated in FIG. 5L is length portion 545 wherein length portion 545 is representative of a portion of first length 543.

FIGS. 5M through 5N are additionally illustrative of structural spacing components comprised of non-tubular restrictive layers which may comprise shapes which may serve to stabilize a boat against a dock. The structural spacing component 549 illustrated in FIGS. 5M and 5N may comprise first length 547 which may lie along the direction of the longitudinal axis of the structural spacing component 549. Also illustrated in FIGS. 5M and 5N is second length 546 which may be smaller than first length 547 and length portion 550 which may represent a portion of first length 547.

Figure 6:
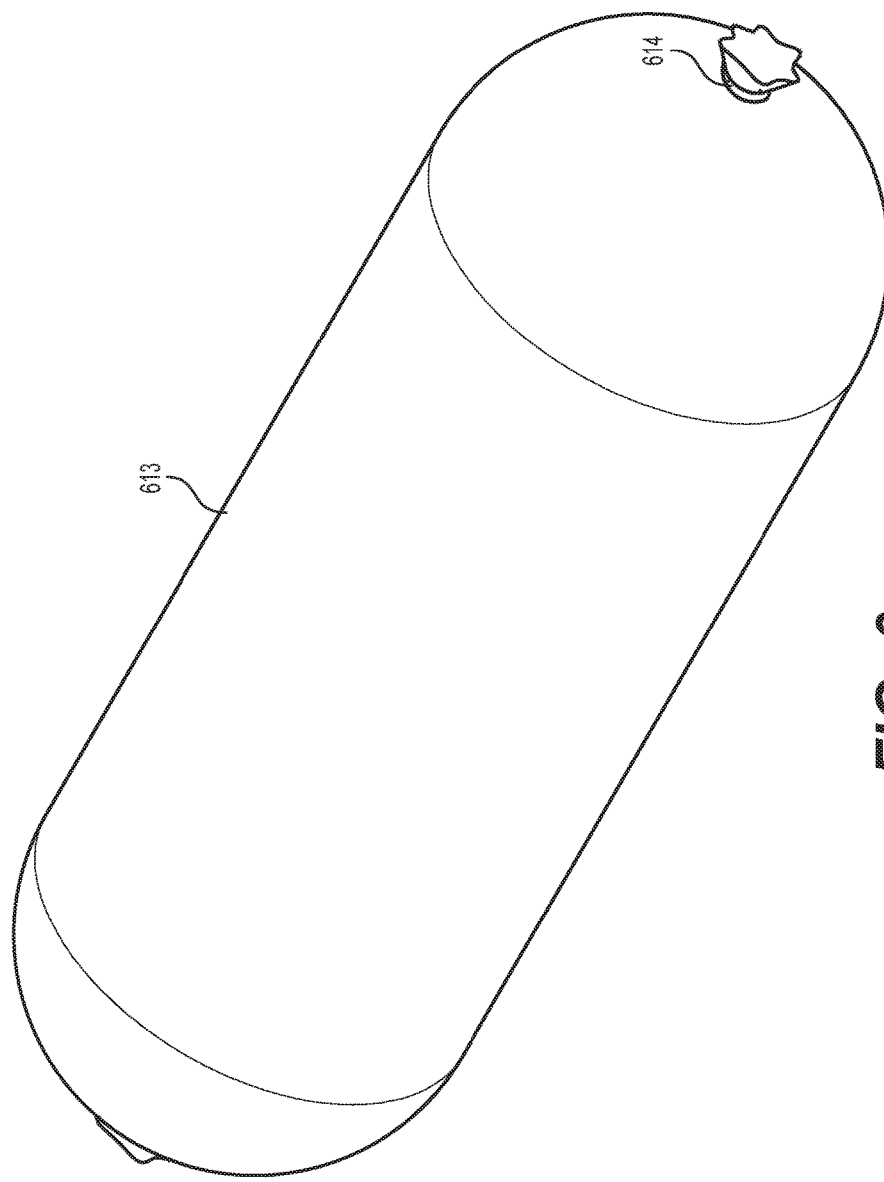
FIG. 6 is illustrative of a structural spacing component of examples comprising ties.

Additional examples of the present subject matter may comprise a tubular restrictive layer wherein the ends of the tubular restrictive layer may be fastened with ties, clamps, or other devices. In variation from the structural spacing component illustrated in FIG. 1, the ends of the structural spacing component as illustrated in FIG. 6 may be rounded and the ends of the tubular restrictive layer 613 may be fastened with ties 614. Additionally, the ends of the tubular restrictive layer comprising the structural spacing component illustrated in FIG. 6 may be sewn, fused or otherwise affixed in additional examples herein. The example of the present subject matter may additionally comprise endcaps.

While examples herein have been illustrated and described as comprised of generally straight tubular structures, additional examples of the tubular restrictive layer of present subject matter may be comprised of curved, round, ellipsoidal, "S" and other shapes.

In examples of the present subject matter, the tubular restrictive layer may comprise a plurality of different shapes as described herein. In examples in which the tubular restrictive layer of the present subject matter may be molded or injection molded, a predetermined shape may be induced in the tubular restrictive layer such that upon introduction of a rigidizing media, the tubular restrictive layer may retain the desired three dimensional shape in a partially rigidized or fully rigidized state. Additional examples of the tubular restrictive layer of the present subject matter may be produced in a rigidized state such that the tubular restrictive layer may retain the desired three dimensional shape, or intended fully rigidized form, without introduction of a rigidizing media.

Additional examples of the tubular restrictive layer comprising the structural spacing component of examples herein may be comprised of a textile component wherein the textile component may comprise a braided structure.

Braided structures are used extensively in the manufacture of composite parts as reinforcement materials embedded in a resin matrix. It is also known to use braided structures as distinct components within an assembly of parts, for instance, as a blade-out containment component in a jet engine. Braided structures are often preferred over other types of structures, because tows of material within the structure may be oriented relative to each other along non-perpendicular directions and the structures may either conform to a surface upon application or be manufactured in to conform to a specific surface.

As used herein, a "braided structure" may be a product comprised of three or more strands of material, or tows, such that each tow may be joined with other tows in a repeating intertwined pattern. Two-dimensional braided materials, as defined in the braiding field, are those wherein the repeating pattern may be largely characterized by two or more principal directions in a plane, typically the longitudinal direction (or the axis along which the braided structure may be formed or the central axis of a tubular braid) of the braided structure, commonly called the longitudinal axis, or the axial direction, and one or more oblique directions, commonly called bias directions, each at a predetermined angle to the longitudinal axis or direction. The term longitudinal axis as used in the specification herein may refer to an axis generally perpendicular to the braiding machine track along which a braided structure may be formed. This longitudinal axis may be additionally described in reference to braided structures in which bias tow materials may be oriented in angular positions in reference to the longitudinal axis of the braided structure, or along the axis along which the braided structure may be formed. Examples of bias directions for various braiding architectures with respect to the longitudinal axis may include 45° and 60° angular positions. Three-dimensional braided structures may be those wherein additional principal directions, generally mutually perpendicular to the longitudinal and oblique directions, may be required to completely define the structure and the patterns thereof. For simplicity of description, these additional directions may generically referred to as radial directions, whether the structure may be generally tubular in form, may be laid out as a flattened tubular form or may be in a fabric, or generally planar form.

Two-dimensional braided structures may be manufactured as generally cylindrical materials, commonly called sleeves, wherein the axial direction may correspond to the longitudinal axis of the cylinder and the bias directions oblique to the longitudinal axis.

In this disclosure reference to a braided structure may generally imply two-dimensional forms but may also include three-dimensional forms, as defined in the braiding field, wherein additional thicknesses may comprise the braided structure when compared to a two dimensional braided structure.

In this disclosure reference to braided fabric may generally be directed to two-dimensional fabric forms but one skilled in the art may recognize that three-dimensional braided materials may be used in particular examples of the present invention as desired to satisfy requirements of particular applications.

Common terms used to describe braided structures may be based on a Cartesian system of directions and rotations as applied to a plane surface considered to be formed from a cylindrical surface after it may be slit in the direction of the longitudinal axis and the cylindrical surface rolled out into a plane.

The longitudinal axis of braided structures may often be used as a reference direction when describing the orientations of sets of tows comprising the braided structure. Directions oblique to the longitudinal axis may often be referred to as bias directions. Oblique directions oriented at angles clockwise to the longitudinal axis may generally be referred to as positive bias directions and those oriented at angles counterclockwise to the longitudinal axis may generally be referred to as negative bias directions.

Biaxial braided structures may comprise two sets of tows, one set oriented along a positive bias direction and the other set along a negative bias direction. A typical shorthand description of the orientations of the two sets of tows within a biaxial braided structure may be that a first set of tows may be comprised of a positive number and the second set may be comprised of a negative number, each numerating the bias angle for a set of tows. For example, a biaxial braided structure called Bimax, manufactured by A&P Technology, Inc., is designated as a +45°/−45° braid.

A set of tows as described herein may be defined such that a set of tows may include a plurality of tows oriented to be substantially adjacent and parallel to each other at an angle relative to the longitudinal axis of the braided structure wherein each set of tows may include a plurality of subsets of tows. The plurality of sets of tows may be oriented such that at least one set of tows may be at a substantially different angle with respect to the longitudinal axis to at least a second set of tows. Additionally, the sets of tows may intertwine to form a complete unit cell within a braided structure.

A unit cell may be defined in the specification herein as the minimum pattern of intertwining tows, which may be required to uniquely characterize a braided structure. Further, a unit cell may also be defined as the smallest repeating unit, or structure, comprising a braided structure. In an example of a diamond braid structure comprised of a repeating pattern; one clockwise traveling tow may pass over one counterclockwise traveling tow and under one counterclockwise traveling tow, while one counterclockwise tow may pass under one clockwise traveling tow and over one clockwise traveling tow. This repeating pattern may comprise a minimum of three tows to uniquely characterize the braided structure and to create the smallest repeating structure that may comprise the braided structure. In the case of a diamond braid structure three tows may be necessary to achieve the one over and one under pattern.

Additionally, to uniquely characterize a regular braid comprised of a repeating pattern in which two clockwise traveling tows may pass over two counterclockwise traveling tows and under two counterclockwise traveling tows, while two counterclockwise traveling tows may pass under two clockwise traveling tows and over two clockwise traveling tows, five tows may be required to uniquely characterize the braided structure. In the case of a regular braid structure, five tows may be necessary to achieve the two over two under pattern of the braided structure.

Therefore, for any braided structure comprised of a repeating pattern of N tows, such that N may be an integer greater than one, passing over and under each other in a repeating pattern, a total of 2N+1 tows may be required to uniquely characterize the braided structure and to create the smallest repeating unit of the braided structure.

An inherent feature of biaxial braided structures is that the tows comprising the braided structure may move relative to one another and may allow the braided structure to conform to a range of surfaces without compromising the braided structure or the tows. After conformation to a specific surface, the general relative orientation of tows within subsets of a set and subset to subset may be maintained and may be best understood, by considering the Cartesian system, to have been mapped onto the surface.

Triaxial braided structures may be manufactured to conform to a specific surface at the time of manufacture by overbraiding onto a specific surface such that the locking action of the axial tows may occur as the braided structure may be laid on the surface and the geometry of the braided structure may assume and retain its as-manufactured configuration.

The addition of axial tows may restrict relative motion of tows thereby generally locking the structure in the as-manufactured geometry. Triaxial braided structures may generally be used in sheet or tubular form or may be manufactured to conform to a specific surface at the time of manufacture.

Triaxial braided structures may comprise three sets of tows. Two sets may be oriented as described for biaxial structures. The third set of tows may be oriented along the longitudinal axis and may be intertwined with the first and second set of tows. A typical shorthand description for a triaxial braid structure may include the angular orientation of each tow set relative to the longitudinal axis and the longitudinal axis itself to better convey that the braided structure is triaxial. For example, a triaxial braided structure marketed as Qiso, manufactured by A&P Technology, is designated as a +60°/0°/−60° braid structure.

The terms "strand", "tow", "yarn", "yarn bundle", "fiber" and "fiber bundle" are generally meant to describe a primary intertwined component of the braided structure, laid in each of the principal directions. The tow itself may be comprised of multiple components (e.g., individual filaments) that may run together in a principal direction. A tow may comprise monofilament arrangements, multiple filament arrangements or be comprised of staple or spun material. Tow material may have a variety of cross-sectional shapes, including but not limited to, circular, ellipsoidal, triangular and flat tape shapes, as well as other variants thereof. Tow material may be subject to intermediate or pre-processing prior to braiding operations. Examples of intermediate or pre-processing may include, but are not limited to, twisting, braiding small numbers of filaments into braided tow materials, pre-impregnation with resins and specialty coating to facilitate braiding and/or subsequent processing. A tow may comprise any combination of these materials and material forms. Any one tow may comprise one or more filaments or staple materials. In examples, a tow may be comprised of carbon materials, basalt, glass materials, thermoplastic polymeric materials, thermoset polymeric materials, a combination of carbon and polymeric materials or a combination of polymeric and glass materials, or some combination thereof. Tows that may lay in one of the bias directions of the fabric may commonly be called bias tows. Tows that may lie along the longitudinal axis of the fabric may commonly be called axial tows.

As used herein, the term braid architecture may be defined as the pattern in which tow materials oriented in bias directions may be intertwined to form a braided structure in which an integer, N, of clockwise oriented tows may pass over and under N counterclockwise oriented tows and in which an integer, N, of counterclockwise oriented tows may pass under and over N clockwise traveling tows. The term braid architecture may also describe, in additional manners, the types of tow materials which may comprise a braided structure. In examples, a braided structure may be comprised of axial and bias tows for the formation of a triaxial braided structure, in addition, a braided product may be comprised of only of bias tows for the formation of a biaxial braided structure, finally, a braided structure may be comprised of sections of biaxial and triaxial sections for the formation of a hybrid braided structure. As used herein, biaxial braid may describe braided structures comprised of bias tows. Triaxial braid may be comprised of bias and axial tows. Hybrid braided structures may be comprised of continuous tow materials comprising adjacent regions of biaxial and triaxial braided structures.

The term continuous as described herein may refer to unbroken lengths of tow material within a braided structure. Disruption in the length of a tow may be described as the presence of splices, stitching, tying or other methods of cutting and reaffixing portions of tow material to one another.

In the art, several terms in common use describe the most common braid architectures. For example, in regular or plain braid architecture each bias tow may be intertwined into the structure such that it may pass over two bias tows in a substantially opposing bias direction and under two bias tows in a substantially opposing bias direction in a repeated pattern. The numerical designation 2×2, typically read as "two-over, two-under", may be used to define this pattern. Similarly, Hercules braid architecture may be a 3×3 architecture wherein each bias tow may pass over three bias tows in a substantially opposing bias direction and then under three bias tows in a substantially opposing bias direction in a repeated pattern. Further, diamond braid architecture may comprise a 1×1 architecture.

As used herein, a braiding machine may comprise an apparatus for the manufacture of braided structures. Said machine may be specific to particular braid architecture or a family of related braid architectures or may generally produce multiple braid architectures. Examples of braiding machines may include maypole braiding machines or 3D braiding machines.

Biaxial and triaxial two-dimensional braids may commonly be made on maypole braiding machines. A maypole braiding machine may generally be comprised of a flat ring assembly on which tow carrier devices may be deployed. Tow carrier devices may be transported along the circumferential direction of the flat ring and may be caused to move in and out along the radial direction. One group of tow carrier devices, generally half the number of total tow carrier devices deployed in the machine, may move in the counterclockwise, or S, circumferential direction and another group of tow carrier devices may move in the clockwise, or Z, circumferential direction. For description purposes, tow carrier devices moving in the S circumferential direction may be called S tow carrier devices and those moving in the Z circumferential direction may be called Z tow carrier devices. The combination of circumferential and inner and outer radial motion may result in the intertwining of S and Z tow carrier devices. For a regular or plain 2×2 braid, the S and Z tow carrier devices may move in the circumferential and radial directions such that a tow paid out by each S tow carrier device may pass over two Z tow carrier device tows and under two Z tow carrier device tows in a repeating pattern and vice versa for Z and S tow carrier devices.

Conventional braiding machines may be comprised of a plurality of tow carrier devices dispersed around a braiding machine track. Braided products formed by conventional braiding machines may be comprised of a two over, two under (2×2) braid architecture in which two clockwise traveling tow carrier devices may pass over two counter-clockwise traveling tow carrier devices and under two counterclockwise traveling tow carrier devices, while two counterclockwise traveling tow carrier devices may pass under two clockwise traveling tow carrier devices and over two clockwise traveling tow carrier devices in a repeating pattern. Tow carrier devices may travel circumferentially as well as radially inwards and outwards around the braiding machine track to promote the intertwining of tows to form the braided structure.

Braided structures created using conventional braiding machines may comprise biaxial or triaxial tubular structures which may be overbraided onto a variety of preforms or core materials to form a composite part. As a result of overbraiding, the shape of generally tubular conventional braided structures may be altered to conform to the surface of the preform or core material. Further, a lasting structural shape may be induced during the braiding process through changes in the length of axial tows due to differences in the rate in which axial tows may be drawn into the braided structure as a result of the geometry of the preform.

The braided structure of examples of the tubular restrictive layer may comprise a curvilinear shape. A curvilinear shaped braided structure may comprise a triaxial braided structure wherein the curvilinear form of the braided structure may be maintained in a rigidized and a pre-rigidized state.

Triaxial braided structures may be used for the creation of braided products of lasting structural shape which may be stiffer and more durable than biaxial braided products. Lasting structural shapes may be induced in triaxial braided products through the alteration in length of axial tows comprising the braided structure through methods including tensioning or the use of contoured take-up rollers. In an example in which a contorted take-up roller may be employed, the contoured roller may be comprised of varying cross sectional diameters along the longitudinal direction of the roller. During the braiding process axial tows comprising the braided structure, which may lie along larger diameter sections of the contoured roller, may be taken up at a faster rate than those which may lie on smaller cross sectional diameters of the roller. The increased rate of take up of axial tows, which may lie on larger cross sectional diameters of the contoured roller, may result in axial tows of a longer length while the decreased rate of those which may lie on smaller cross sectional diameters of the roller may comprise shorter lengths. Upon removal of the braided product from the contoured roller the braided structure may maintain the contour of the roller onto which it was taken up due to the length differences in the axial tows which may add stability and shape to the braided structure.

The length of axial tows comprising the braided structure of examples of the present subject matter may be altered in such a manner that a curvilinear shaped braided structure may be obtained. This curvilinear shape may be induced in a braided structure through the use of a pair of conical rollers which may be used to pull a finished braided structure upwards from the center of a maypole style braiding machine. The slope angle which may comprise the conical rollers, or the angle between each conical surface and the longitudinal axis comprising each roller, may define the radius of curvature of a braided structure taken up by the conical rollers.

Additional examples of the braided structure comprising a tubular restrictive layer of the structural spacing component herein may comprise variable radii of curvature along the length of the curvilinear braided structure. Variance in the radii of curvature which may comprise a braided structure of examples of the present subject matter may be achieved by passing the braided structure through conical rollers of a fixed slope angle wherein the position of the braided structure within the conical rollers may be altered. In an example of the present subject matter, the slope angle between the conical rollers may be fixed at ninety degrees.

For discussion purposes of examples herein, the smallest diameter portion of a conical roller may be defined as the primary end and the largest diameter portion of a conical roller may be defined as the secondary end.

During the formation of a curvilinear shaped braided structure, a pair of conical rollers may exert a gradient of un-even pulling forces on the braided structure as it may be pulled upwards from the braiding machine. In this manner, a fast rate of axial tow take-up may occur where the secondary ends of the conical rollers may be adjacent and a low rate of take-up of axial tows may occur where the primary ends of the conical rollers may be adjacent. Therefore, axial tows of longer length may be formed closest to the secondary ends of the conical rollers and shorter axial lengths may be formed closest to the primary ends of the conical rollers. Along a line which may pass from the secondary ends of the conical rollers to the primary ends of the conical rollers, a gradient of axial length may be obtained which may steadily decrease. After a braided structure may be passed through these rollers, and the lengths of the axial tows may be fixed, the braided structure may be comprised of a lasting structural curvilinear shape.

The curvilinear shape of the braided structure of examples of the tubular restrictive layer described herein may be comprised of a single radius of curvature or a plurality of radii of curvature. The curvature of the curvilinear shaped braided structure may be affected by altering the slope angle of the conical rollers or by altering the position of the braided structure within the conical rollers.

In an example of the present subject matter, the position of the braided structure within the conical rollers may be used to affect the radius of curvature of the braided structure. The position of the braided structure described herein may be altered by changing the position of the forming ring over the braiding machine, through the movement of both the braiding machine and the forming ring or through the alteration of the position of the conical rollers. In this manner, the braided structure may be situated closest to the secondary ends of the conical rollers to obtain greater radii of curvature within the braided structure and then may be moved closest to the primary ends of the conical rollers to obtain smaller radii of curvature.

While examples of curvilinear braided products may be formed through the use of conical rollers, additional examples may be formed through the use of curved mandrels.

Figure 7:
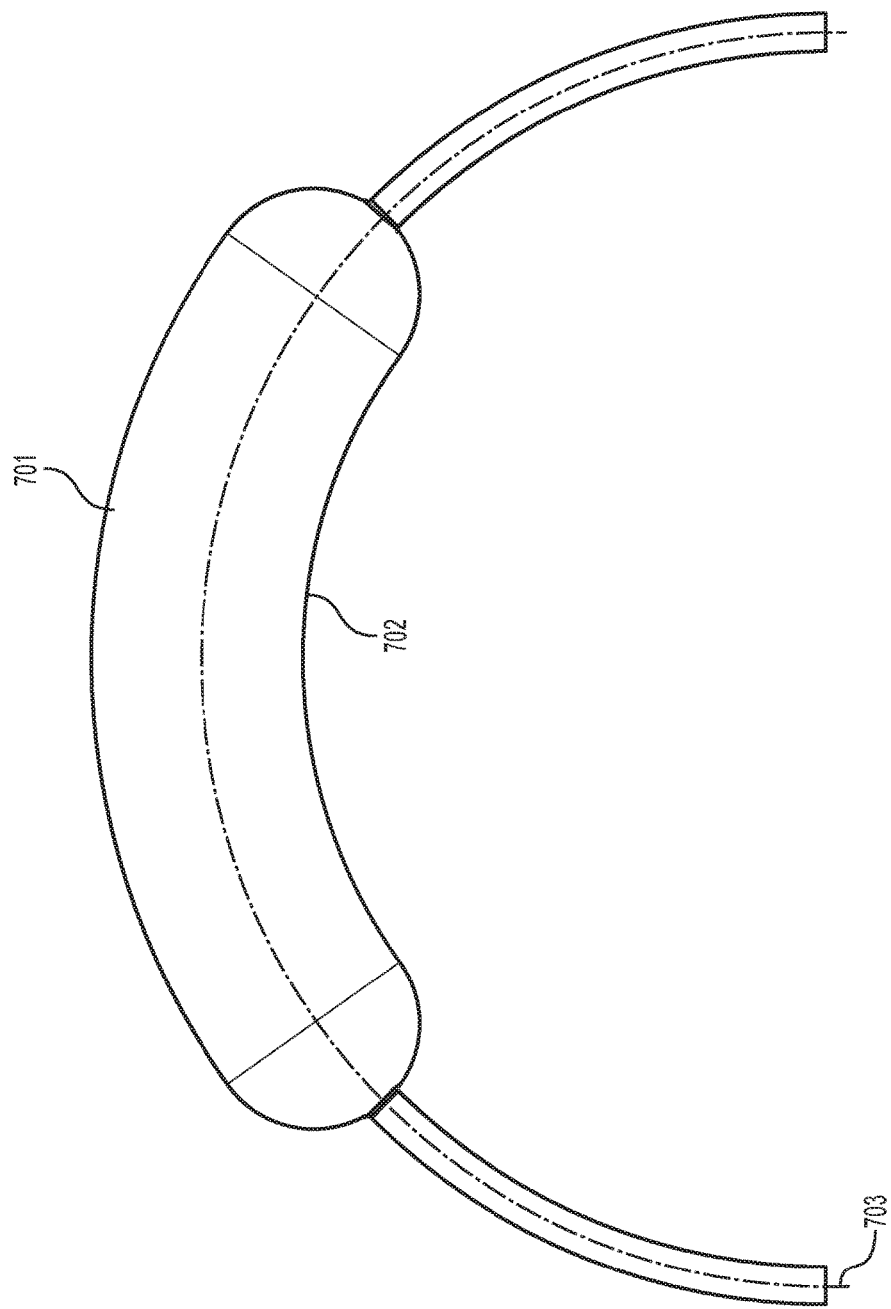
FIG. 7 is illustrative of a curved example of a braided structure of examples of the tubular restrictive layer comprising a structural spacing component of the present subject matter.
Figure 8:
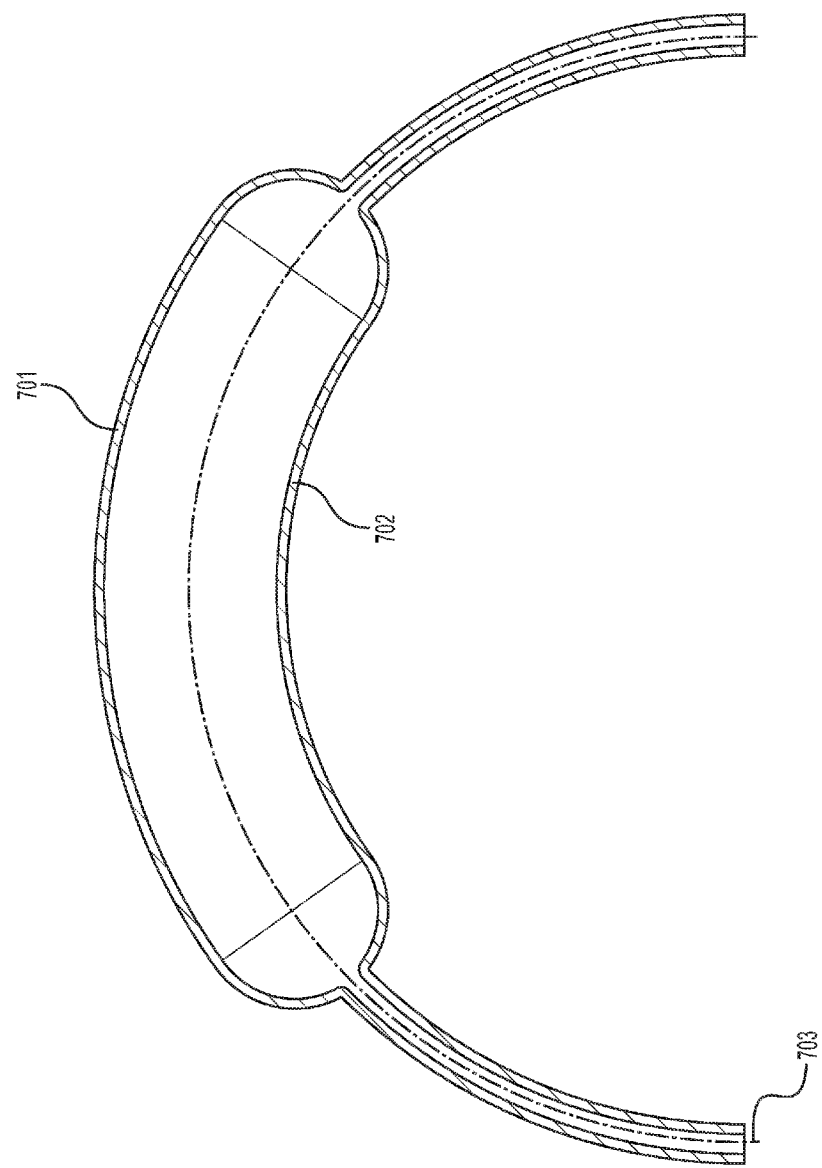
FIG. 8 is illustrative of a cross-section of the braided structure of FIG. 7.

In an example of a braided structure which may comprise a tubular restrictive layer of examples of the present subject matter, a curved mandrel may be provided which may be reflected by the shape of the braided structure illustrated in FIGS. 7 and 8. FIG. 7 is illustrative of a curved example of the braided structure described herein while FIG. 8 is illustrative of a cross section of the braided structure of FIG. 7.

The mandrel which may be employed for the formation of the braided structure illustrated in FIGS. 7 and 8 may be guided through the center of the braiding machine of examples of the present subject matter such that a curve 703 equidistant from each edge comprising the cross section of the braided structure, illustrated in FIGS. 7 and 8, may be maintained as tangent to a longitudinal axis passing though the center of the braiding machine and which may be perpendicular to the braiding machine track. The mandrel may be guided through the center of the braiding machine in examples of the present subject matter through the use of robotic components or mechanical components including rollers.

The braided structure illustrated in FIG. 7 may be defined to have one or more first lengths and second lengths. In this example, the first length comprising a structural spacing component comprising the braided structure of FIG. 7 may be defined as the arc length of 703, or portions of the arc length of 703, as illustrated in the final form of the braided structure illustrated in FIG. 9. Additionally, the first length may be defined as the chord length of the arc or portions of the arc 703. In an additional example, the first length may be defined as a length transverse to a chord length of 703 such that the first length may define the greatest length traverse to the chord length. Further in this example, one or a plurality of second lengths may be defined as dimensions of the structural spacing component from one edge to another such that in an example in which the first length may be defined as the arc length, the chord length or a length in a direction transverse to the chord length, the second length may be oriented to be along a radial line extending from the center of the arc.

As the triaxial braided structure of examples herein may be overbraided onto a curved mandrel, of which the shape may be reflective of that of the braided product of FIGS. 7 and 8, each axial tow comprising the braided structure may be comprised within an individual path as the braided structure may conform to the curved mandrel. In this manner, the path of an axial tow on a first surface 701 of the braided structure, illustrated in FIGS. 7 and 8, may be different than the path encountered by an axial tow on a second surface 702 of the braided structure. In a continuing example of FIGS. 7 and 8, an axial tow whose path may be defined by the first surface 701 may be longer than that of the path of an axial tow defined by the second surface 702. Additionally, the lengths of axial tows comprised on surfaces between the first surface 701 and the second surface 702 may additionally encounter different paths and may comprise a plurality of different lengths. In examples of the present subject matter, an axial tow on the first surface 701 may comprise the longest length of an axial tow comprising the braided structure while an axial tow on the second surface 702 may comprise the shortest length an axial tow may comprise within the braided structure. Therefore, axial tows between the first surface 701 and the second surface 702 may comprise a gradient of decreasing length as the tows may encounter paths of different lengths between the first surface 701 and the second surface 702. Additionally, the rate at which the axial tows may be incorporated into a curved braided structure like that illustrated in FIGS. 7 and 8 may differ just as the length may differ. An axial tow which may encounter a path of longer length may be incorporated into the braided structure of examples herein at a faster rate than axial tows which may encounter paths of shorter lengths. Therefore an axial tow on the first surface 701 may be incorporated into the braided structure faster than an axial tow comprised on the second surface 702 of the braided structure.

Figure 9:
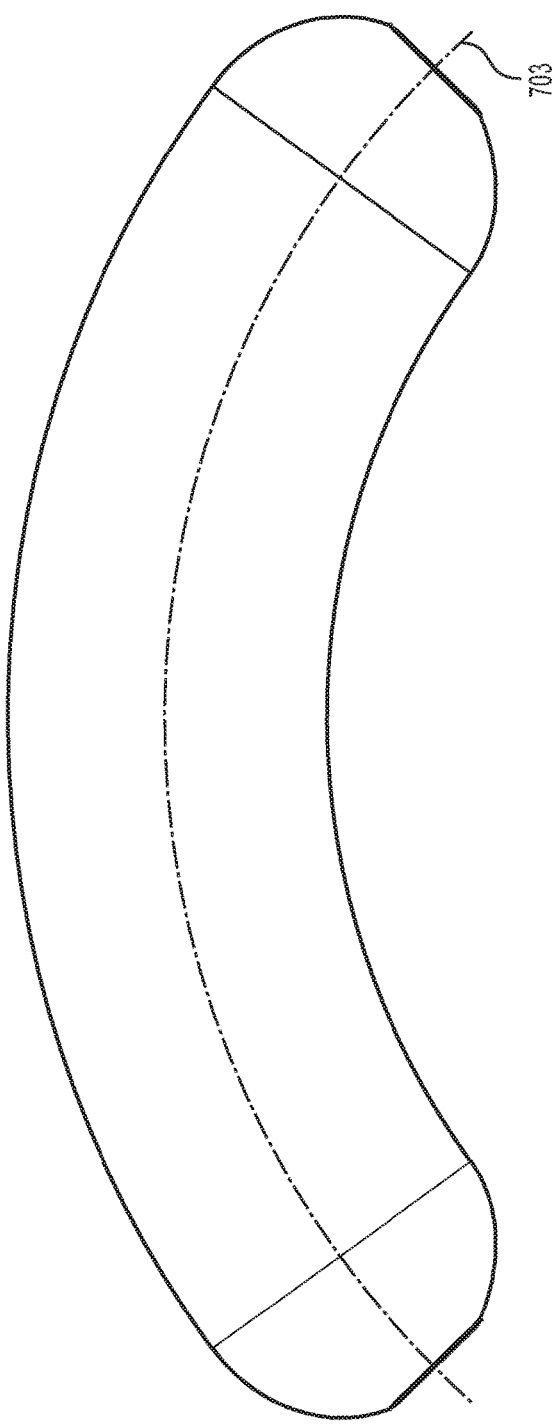
FIG. 9 is illustrative of a simplification of the braided structure of FIGS. 7 and 8 wherein portions of the braided structure may be inverted.
Figure 10:
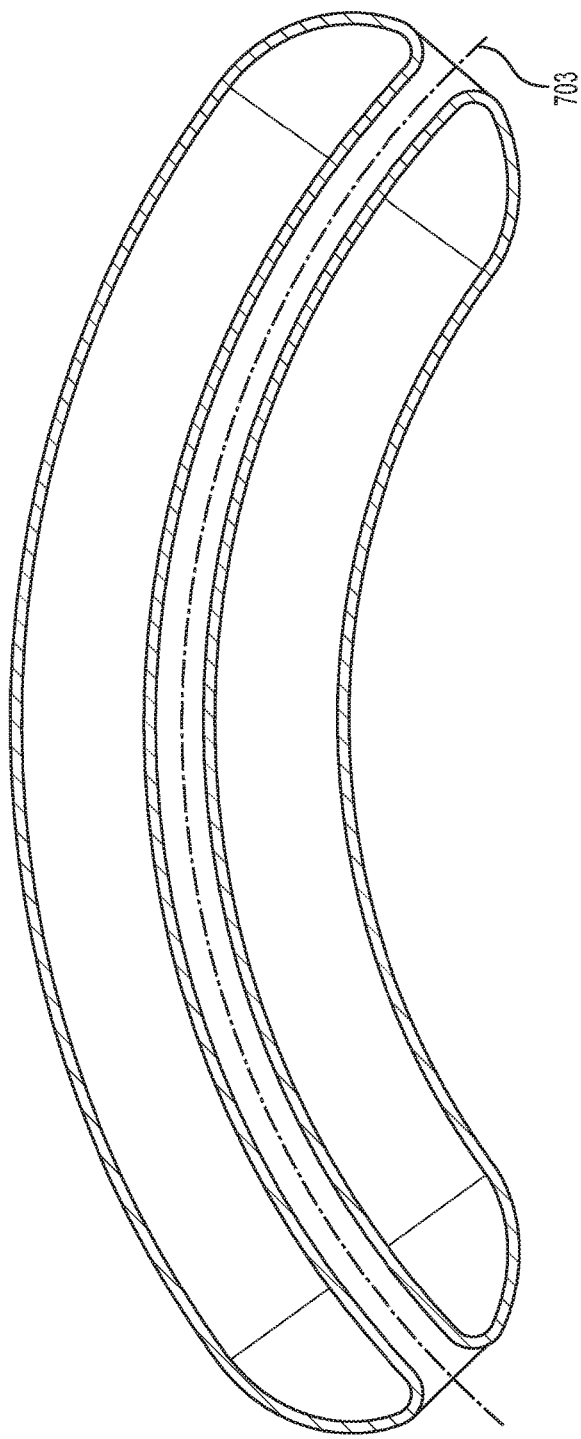
FIG. 10 is illustrative of a cross section of the braided structure of FIG. 9.

Due to differences in the lengths of axial tows comprised within a triaxial braided structure, a lasting structural shape may be induced in a braided structure which may be "locked in place" due to differences in the lengths of axial tows. Therefore, the braided structure illustrated in FIGS. 7 and 8 may maintain a curved shape as illustrated in a pre-rigidized and a rigidized state. A simplification of the final tubular restrictive layer comprising the structural spacing component of examples illustrated in FIGS. 7 and 8 herein is illustrated in FIG. 9. A cross-section of the simplified tubular restrictive layer is illustrated in FIG. 10.

In additional examples of the present subject matter in which the tubular restrictive layer may comprise a textile component, the structural spacing component may comprise a plurality of different shapes including round, ellipsoidal or other shapes. To form textile components of these shapes, the textile component may be overbraided over a plurality of mandrels of specific shape, or may be taken up by rollers of a pre-defined shape such that after the braiding and formation process may be complete, the braided structure may retain the round, ellipsoidal, or other shape due to differences in the lengths of axial tows. The mandrels on which these shaped triaxial braided structures may be overbraided may be collapsible such that the braided structure may be removed without disruption in the continuity of tow materials which may comprise the braided structure.

While examples of the tubular restrictive layer of the present subject matter have been described and illustrated herein as comprised of assemblies of parts including clamps, endcaps and affixment devices, examples of the present subject matter may be comprised of a single shell of material, or composite layer of material.

In examples herein of tubular restrictive layers comprising textile components, the tubular restrictive layers may further be coated, or embedded with an impermeable layer. An impermeable layer may be defined as a layer which may aid in the retention of a rigidizing media within the interior region of structural spacing components of examples of the present subject matter such that the rigidizing media may not escape from the interior region of the structural spacing component into the environment.

Figure 11:
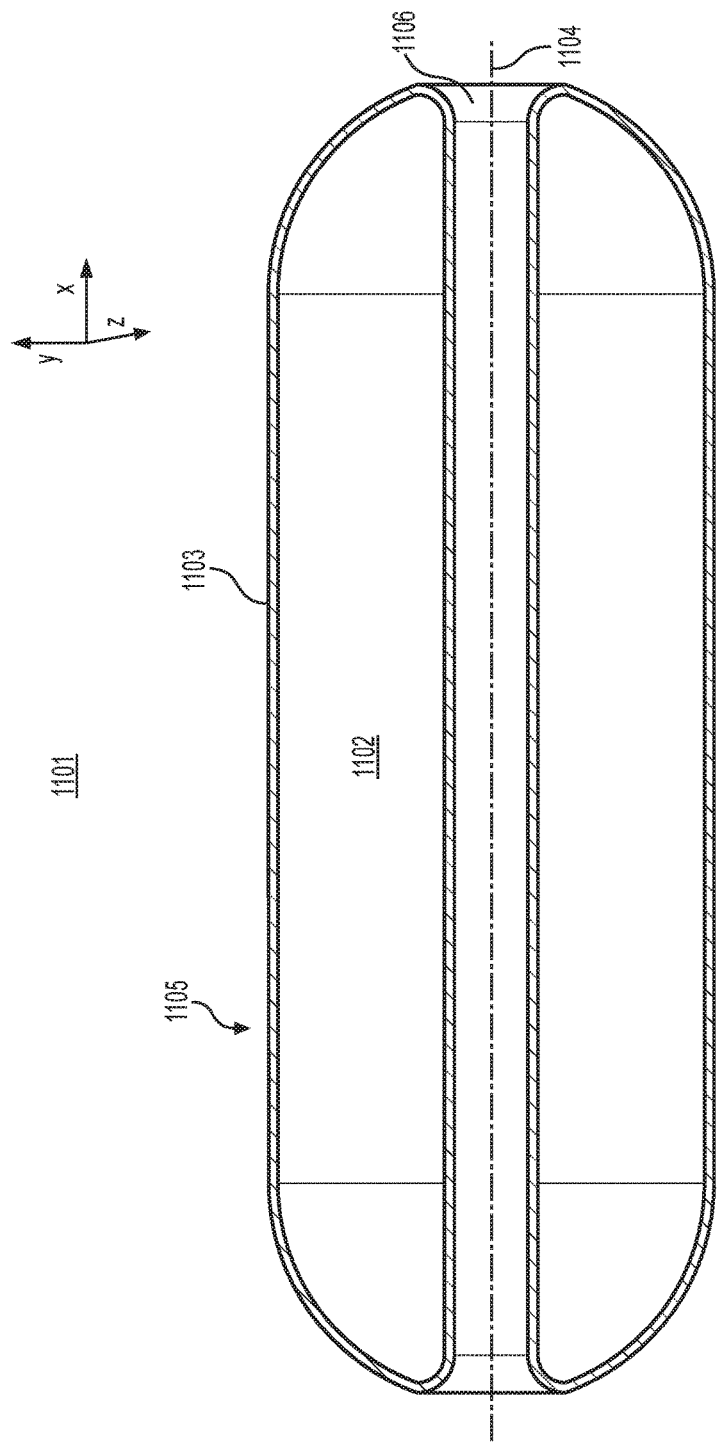
FIG. 11 is illustrative of a cross section of a structural spacing component of examples comprising an affixment feature.
Figure 12:
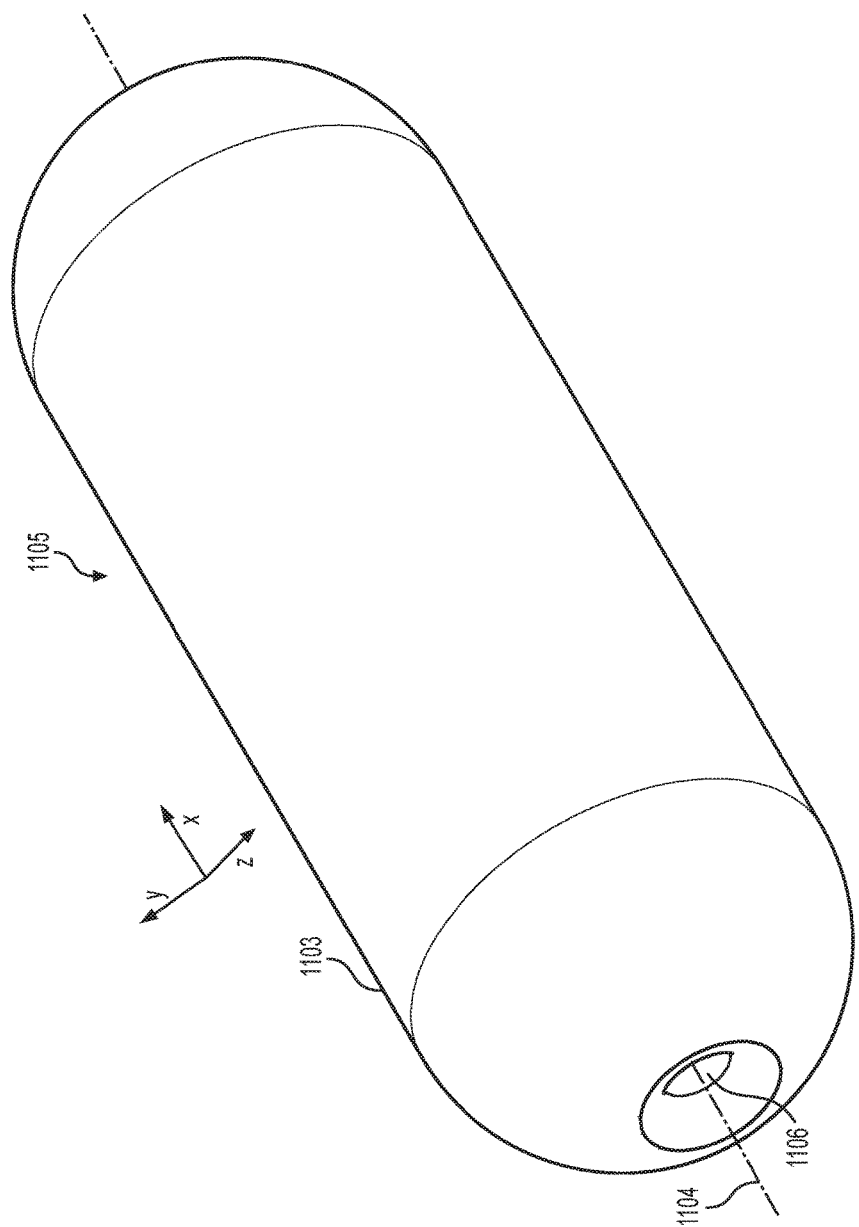
FIG. 12 is illustrative of a isometric view of the structural spacing component of FIG. 11.

In reference to FIG. 11, a simplified cross section of the structural spacing component 1105 of examples herein is provided in which the tubular restrictive layer 1103 may separate the environment 1101 from the interior region 1102 of the structural spacing component 1105. Additionally, provided in FIG. 11 are the longitudinal axis 1104 of the simplified structural spacing component 1105 and a Cartesian coordinate system with reference directions. FIG. 12 provides an isometric view of the structural spacing component 1105 of the present subject matter. FIGS. 11-12 further comprise affixment feature 1106.

In examples, the space or degree of separation defined by the structural spacing component 1105, like that illustrated in FIG. 11, may be determined by the longitudinal length, or the first length comprising the structural spacing component along the longitudinal axis 1104.

The structural spacing component of examples herein may be affixed between a plurality of articles. To facilitate the affixment of the rigidized structural spacing component between a plurality of articles, the tubular restrictive layer comprising the structural spacing component may be configured to comprise channels or affixment features 1106 through which, as illustrated in FIGS. 11-12, ropes, cords, chains or other affixment devices may pass. In an example in which an affixment device may comprise a rope, the rope may be passed through affixment feature 1106 of FIGS. 11 and 12. The first end of the rope may then be affixed to a first article and the second end of the rope may be affixed to a second article. Subsequently, the rigidized structural spacing component of FIGS. 11 and 12 may be affixed between the first and second article and may define a certain amount of space between the first and second article.

Figure 13:
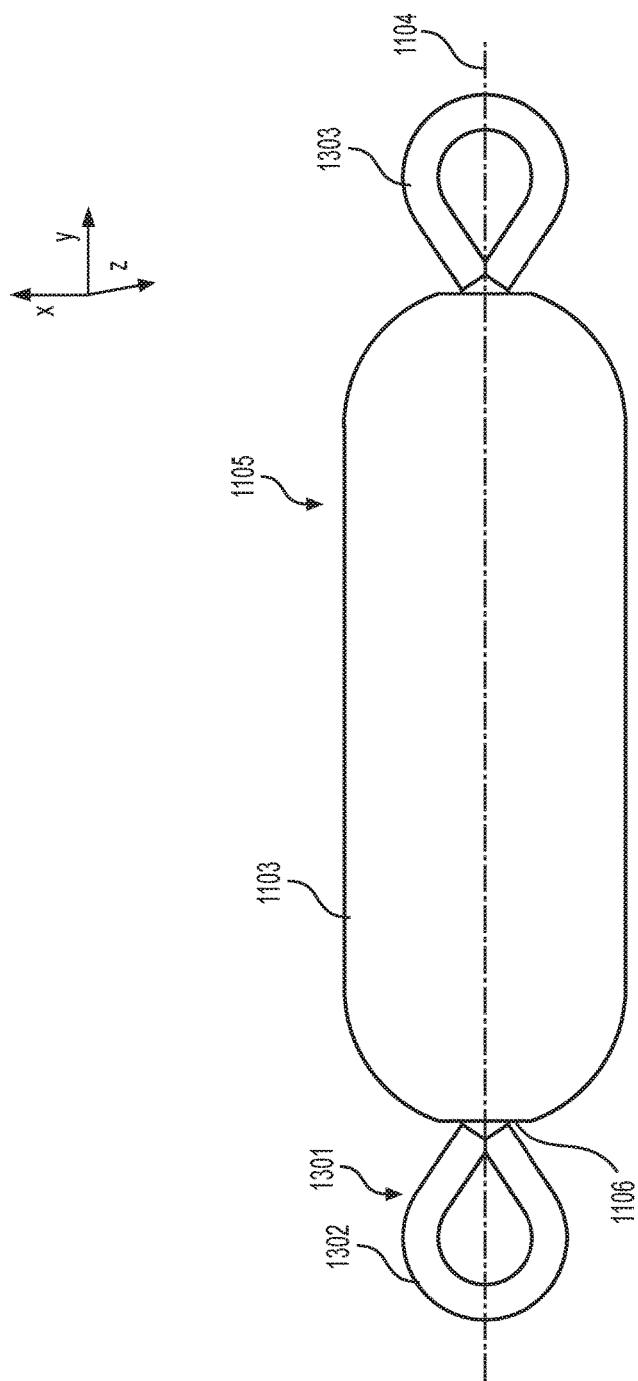
FIG. 13 is illustrative of the structural spacing component of FIGS. 11 and 12 comprising an affixment device which may be inserted through the affixment feature comprising FIGS. 11 and 12.
Figure 14:
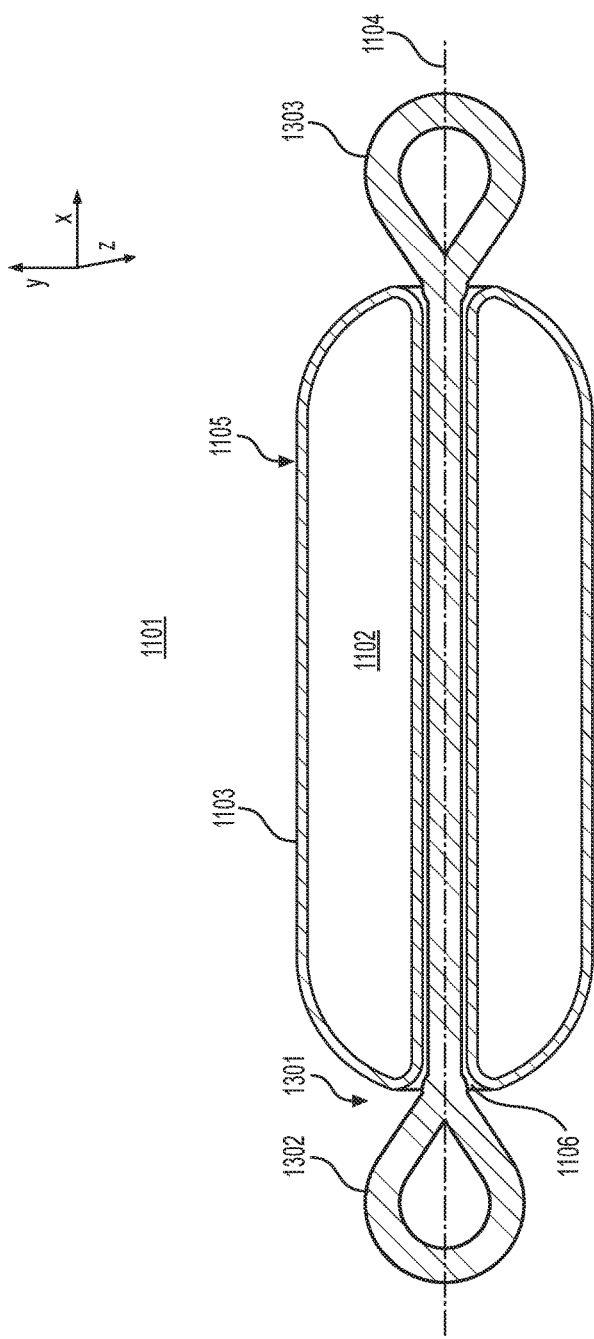
FIG. 14 is illustrative of a cross sectional view of the structural spacing component illustrated in FIG. 13.

FIGS. 13 and 14 illustrate the structural spacing component 1105 of FIGS. 11 and 12 in which an affixment device 1301 may be inserted through the affixment feature 1106 comprising the structural spacing component 1105. The affixment device 1301 further comprises loops 1302 and 1303 wherein loop 1302 may be affixed to a first article and loop 1303 may be affixed to a second article.

The tubular restrictive layer comprising the structural spacing component of additional examples of the present subject matter may comprise a solid layer comprised of molded or injection molded rubber, plastics, elastomeric material or other materials which may comprise sufficient flexural stiffness to resist bending or buckling. These materials may be molded for the creation of the desired shape and configuration of the structural spacing component of examples of the present subject matter.

In reference to FIGS. 11 and 12, interior region 1102 may be filled during the molding process with a desired material. Therefore, the structural spacing component of the present subject matter may comprise a single rigidized state and may not comprise a pre-rigidized state.

Additionally, in further reference to FIGS. 11 and 12, interior region 1102 may not be filled with material during the molding process and may therefore be produced in a pre-rigidized state in some examples of the present subject matter. Additionally, the structural spacing component may be produced in a rigidized state, based on the nature of the material used during the molding process. In an example, if the material used for the molding of a structural spacing component of an example of the present subject matter, were an elastomeric material which was not able to maintain a three dimensional form, the structural spacing component may be defined as produced in a pre-rigidized state. However, if the material used for molding the structural spacing component of an example of the present subject matter were a plastic material which may support a three dimensional form with desired characteristics for deployment, the structural spacing component may be defined as to be produced in a rigidized state.

The tubular restrictive layer of examples herein may comprise several concentric layers of different materials wherein one or more layers may comprise a textile component. As described herein the textile component may comprise a woven or braided material. A tubular restrictive layer comprised of a textile component may be produced in a pre-rigidized state or a rigidized state, such that during fabrication, the interior region of the structural spacing component may be filled with a rigidizing media which, in examples, may comprise foam cores.

As described herein a tubular restrictive layer comprising a textile component may further comprise an impermeable layer. The impermeable layer may comprise an impermeable sleeve or an impermeable coating applied to the textile component. The impermeable layer may comprise an elastomeric material in examples of the present subject matter.

In a continuing discussion of FIGS. 11-12, the tubular restrictive layer 1105 of examples described herein may comprise a textile component wherein the textile component may comprise a braided sleeve. The braided sleeve may comprise triaxial, biaxial or hybrid braided structures in examples herein. The braided sleeve of the present subject matter may comprise a first end, a second end and an interior region 1102 such that in steps during the fabrication process of a tubular restrictive layer 1105 like that illustrated in FIGS. 11-12, the first end and second end may be inverted such that the first end and second end may be comprised within the interior region 1102 of the braided structure. In subsequent steps during the fabrication process, the first end may be affixed to the second end such that upon rigidization of the structural spacing component the first end and second end may not separate.

Therefore, as illustrated in FIGS. 11-12, affixment feature 1106 may comprise a channel comprised of portions of the braided structure of the present subject matter in which the first end may be affixed to the second end and such that the first end and second end may be comprised within the interior region 1102 of the braided structure of the present subject matter.

The braided structure of examples of the present subject matter may be coated or affixed with an impermeable layer such that the impermeable layer may be comprised within the interior region 1102 of the tubular restrictive layer 1103. In an example, an impermeable coating may be applied to the outer surface of the braided structure after braiding and the whole structure may be inverted such that the impermeable coating may be comprised on the inner surface of the braided structure. Additionally, in subsequent fabrication steps the ends may be inverted such that the braided structure illustrated in FIGS. 11-12 may be obtained.

In this manner, upon rigidization of the structural spacing component of examples herein, the pressure induced by the rigidizing media may be exerted upon the tubular restrictive layer such that the impermeable layer may be confined within the braided structure and may not delaminate from the braided structure upon inflation. Subsequently, the pressure exerted by the rigidizing media comprising the structural spacing component may force the impermeable layer against the braided structure such that the braided structure may bear the force exerted by the rigidizing media.

Upon rigidization of a structural spacing component of examples herein comprising a braided structure of generally uniform cross sectional diameter, the braided structure may be rigidized such that the maximum cross sectional diameter of the structural spacing component may bear the bulk of the pressure exerted by the rigidizing media while the minimum cross sectional diameter comprising the structural spacing component as illustrated in FIGS. 11-12 may bear a minimal amount of the pressure exerted by the rigidizing media. Additionally, the portion of the braided structure comprising affixment feature 1106 as illustrated in FIGS. 11-12 may crumple, deflate, fold or otherwise change cross section such that the cross sectional diameter of the affixment feature 1106 may be minimal.

The braided sleeve of uniform cross sectional diameter comprising the tubular restrictive layer of examples of the structural spacing component of the present subject matter may be formed through the use of a conventional may-pole style braiding machine and may not require specialized equipment for the formation of the braided structure.

As described in examples herein and illustrated in FIGS. 7-10, the tubular restrictive layer may comprise a braided structure of curvilinear form. In an example, subsequent to the formation of a curvilinear braided structure, the ends of the braided structure may be inverted such that a first end of a curvilinear braided structure may be comprised within the interior region of the braided structure. Consequently, a second end of the curvilinear braided structure may be inverted such that the second end may encompass, or overlap a portion of the first end of the curvilinear braided structure. Additionally, after inversion both ends of the braided structure may be comprised within the interior region of the braided structure.

While examples of the tubular restrictive layer comprising braided structures described herein may comprise a uniform cross-sectional diameter, additional examples of the braided structure may comprise braided sleeves of variable diameter along the longitudinal length of the braided structure.

Figure 15:
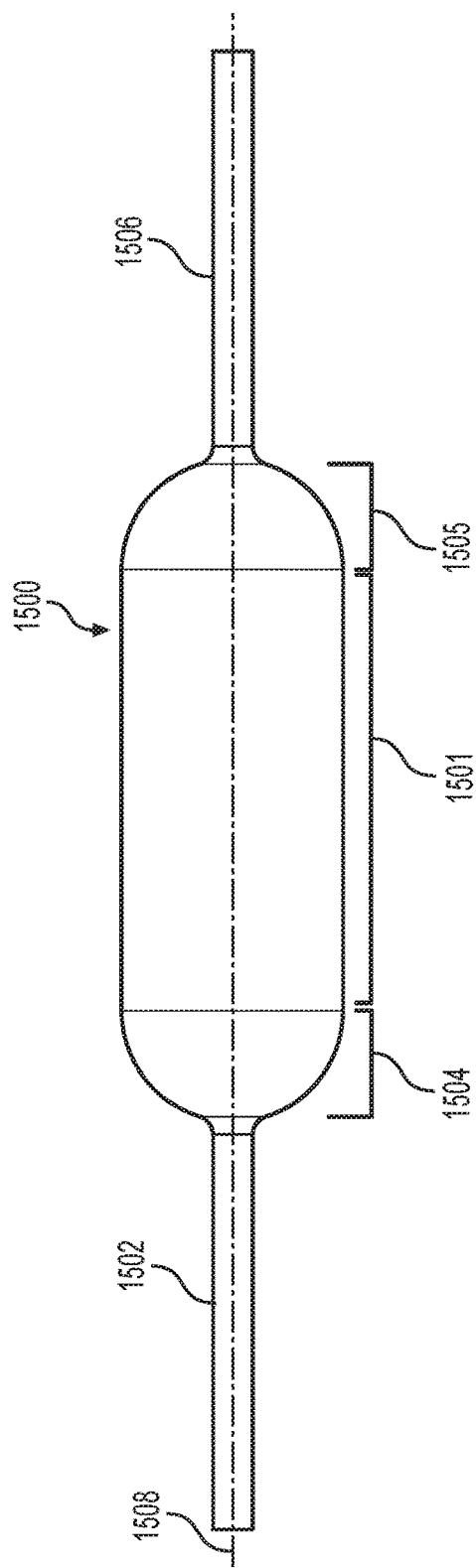
FIG. 15 is illustrative of a braided structure which may comprise a tubular restrictive layer of examples of structural spacing components herein.
Figure 16:
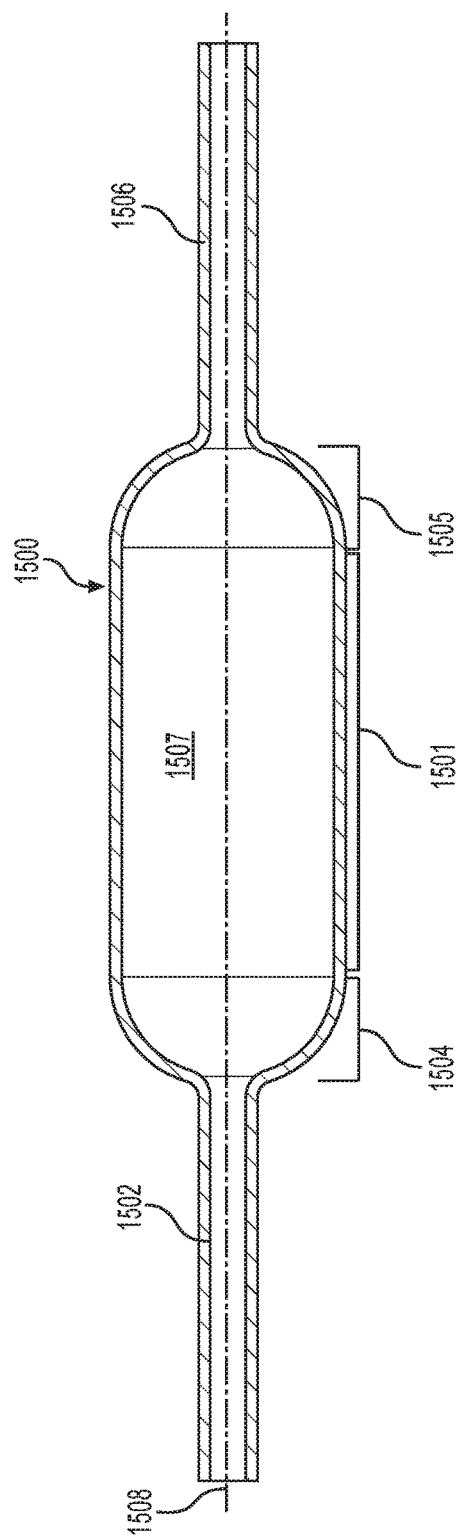
FIG. 16 is illustrative of a cross section of the braided structure of FIG. 15.

A braided structure comprising a tubular restrictive layer for the creation of examples of the structural spacing component of the present subject matter is illustrated in FIG. 15. The braided structure 1500 of FIG. 15 may comprise five main portions, a first portion 1502, a second portion 1504, a third portion 1501, a fourth portion 1505 and a fifth portion 1506; wherein, the first portion 1502 and fifth portion 1506 may be substantially the same and the second portion 1504 and the fourth portion 1505 may be substantially the same in examples of the present subject matter. In this example, the first length comprising the structural spacing component may define portion 1501 or a combination of 1501, 1504 and 1505. A cross section of the braided structure 1500 of FIG. 15 is illustrated in FIG. 16. The braided structure 1500 of FIG. 15 may be configured for the formation of a structural spacing component like that of FIGS. 11-14 wherein, in steps during the fabrication process, the first portion 1502 may be inverted such that the first portion 1502 may be comprised within the interior region 1507 of the braided structure 1500 comprised by the second 1504, third 1501, and fourth 1505 portions. Subsequently, the fifth portion 1506 may be inverted in a similar manner wherein the fifth portion 1506 may overlap a portion of the first portion 1502, or may circumferentially encompass a portion of the first portion 1502.

Figure 17:
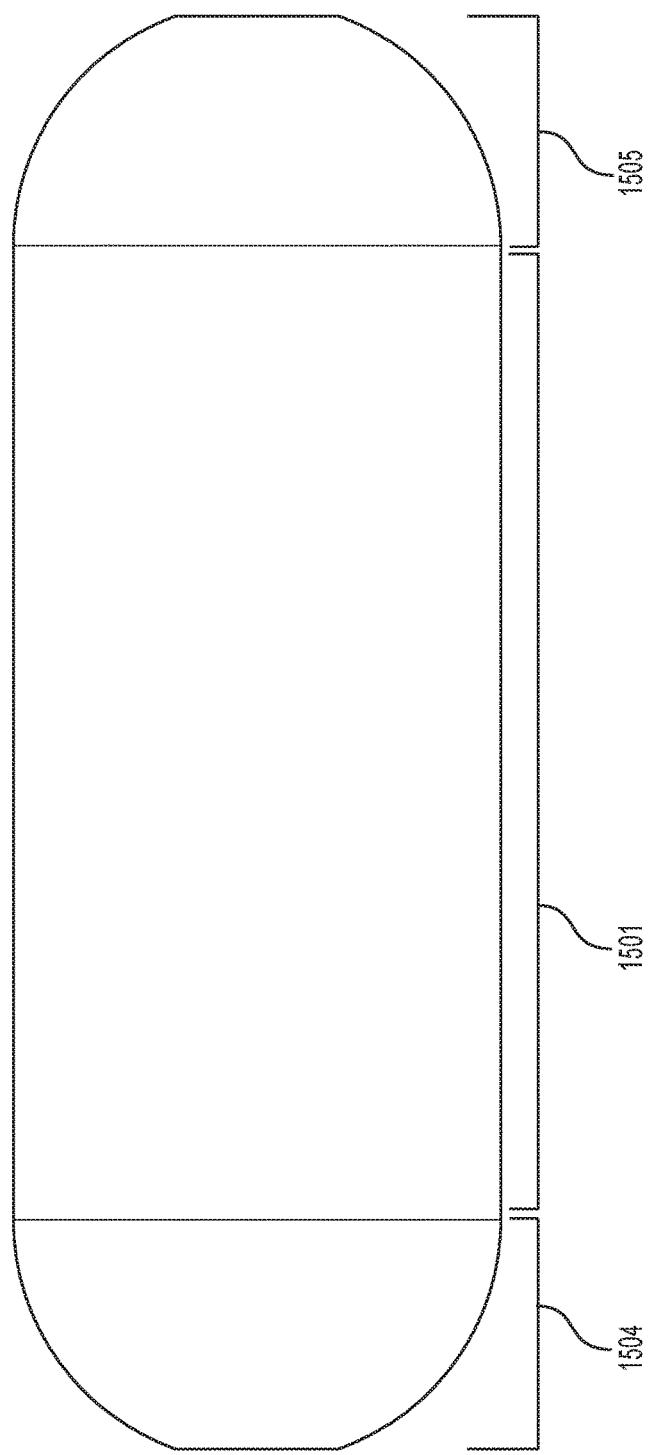
FIG. 17 is illustrative of the braided structure of FIGS. 15 and 16 wherein portions of the braided structure may be inverted.
Figure 18:
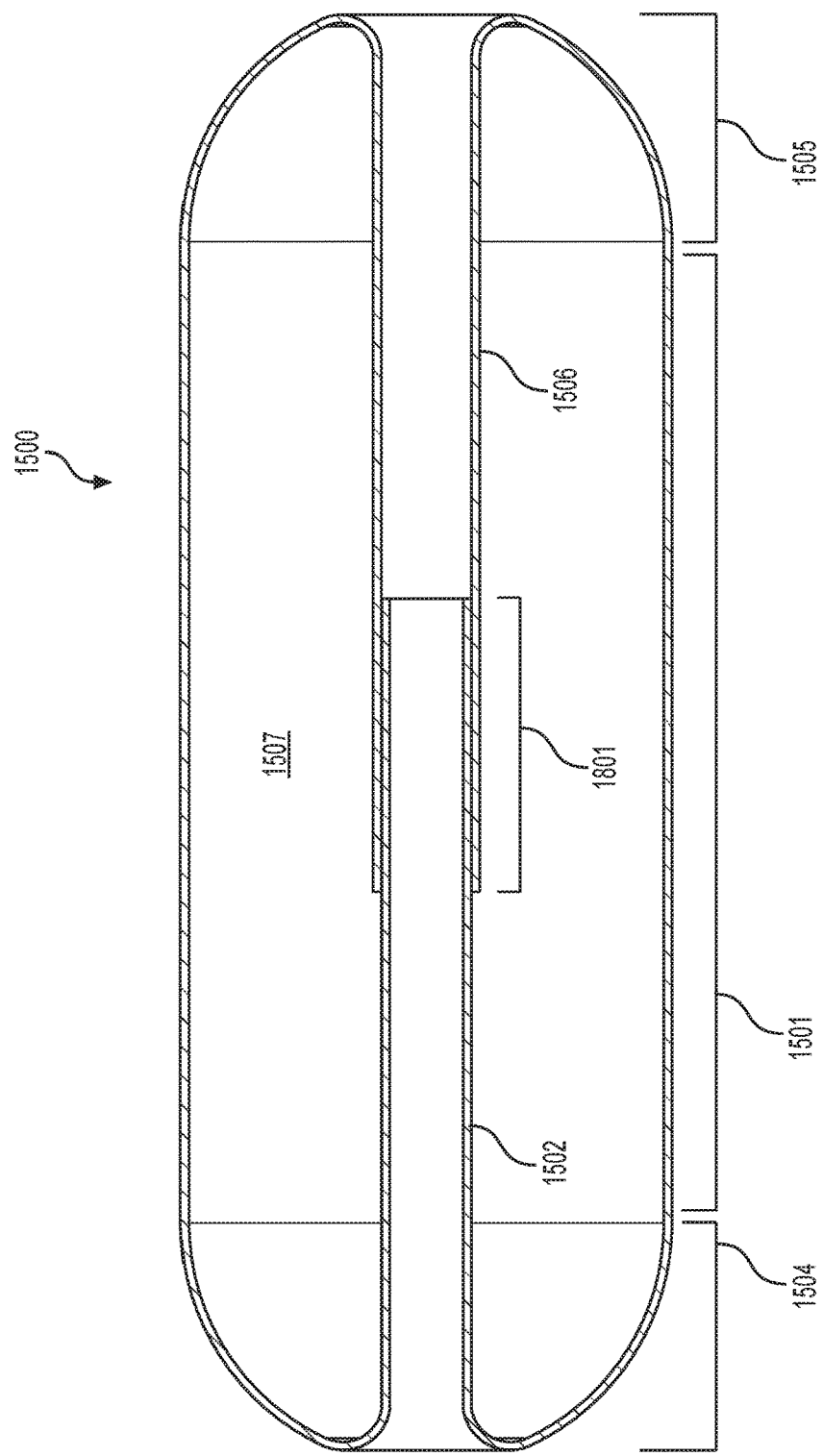
FIG. 18 is illustrative of a cross section of the braided structure comprising inverted portions of FIG. 17.

The resulting braided structure, in which the first portion 1502 and the fifth portion 1506 may be inverted such that they may be comprised within the interior region 1507 of the braided structure 1500 comprised by the second 1504, third 1501 and fourth 1505 portions, is illustrated in FIG. 17. A cross section of the braided structure 1500 illustrated in FIG. 17 is illustrated in FIG. 18. As described herein, upon the inversion of the first 1502 and fifth 1506 portions, a portion of the fifth portion 1506 may overlap, or circumferentially encompass a portion of the first portion 1502 comprising the braided structure 1500 of the present subject matter. The overlapping of the first portion 1502 with the fifth portion 1506 may result in the formation of an overlap region 1801.

In additional examples of the present subject matter, the first portion 1502 may not be overlapped, or circumferentially encompassed by the fifth portion 1506. Subsequently the first portion 1502 and the fifth portion 1506 may terminate such that upon inversion, the ends of the first 1502 and fifth 1506 portions may contact, but may not overlap such that no overlap region 1801 may exist.

Figure 19:
FIG. 19 is illustrative of a tubular restrictive layer of examples comprising a braided structure and an additional inner sleeve.
Figure 20:
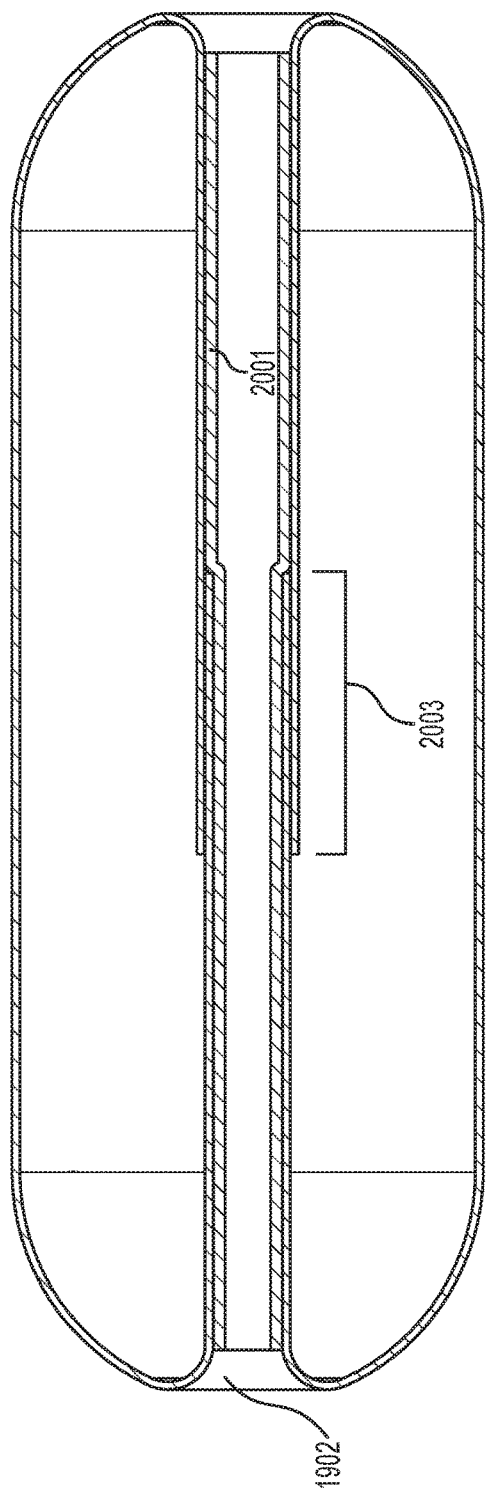
FIG. 20 is illustrative of a cross section of the tubular restrictive layer of FIG. 19.

An example of a braided structure may comprise an additional sleeve of material configured such that the sleeve of material may overlap a section of the braided structure wherein the tow materials may not be continuous. This example is illustrated in FIGS. 19 and 20. FIG. 20 is illustrative of a cross section of FIG. 19. As illustrated in FIGS. 19 and 20, the additional sleeve 2001 may be affixed within affixment feature 1902 such that the sleeve 2001 may be adjacent to the overlap region 2003 comprising the braided structure of FIGS. 19 and 20.

Figure 21:
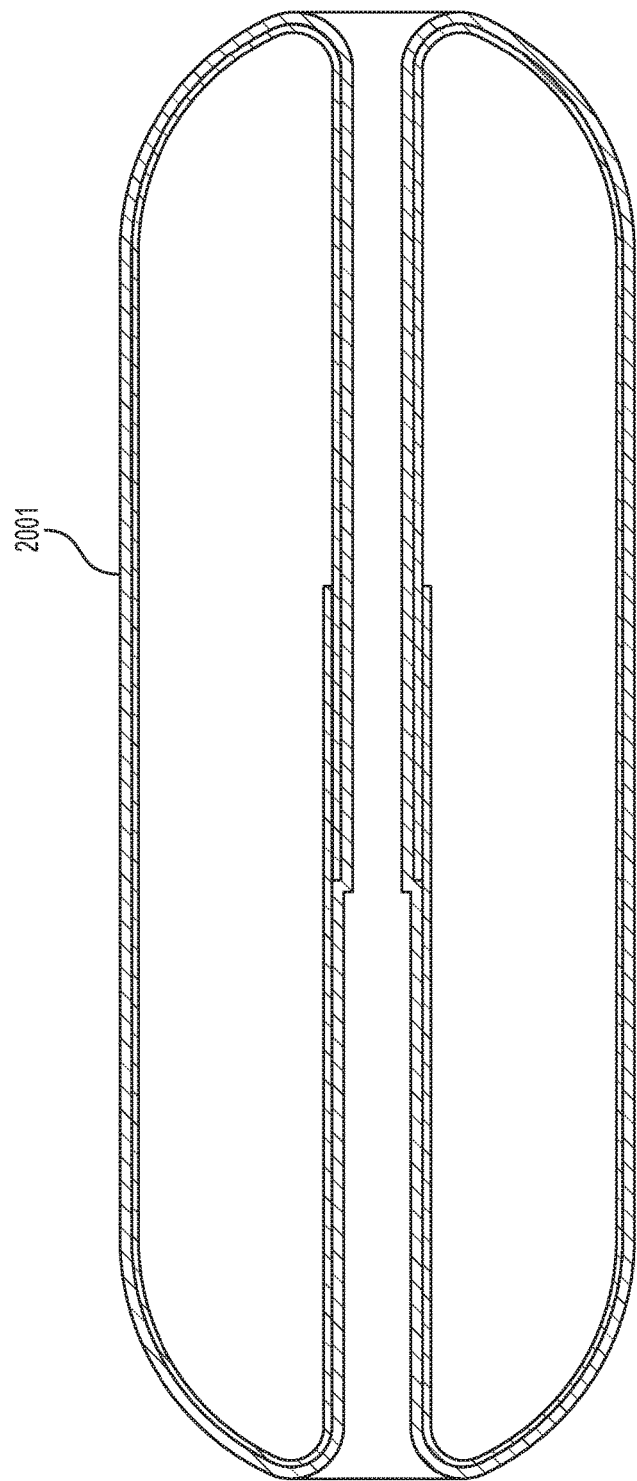
FIG. 21 is illustrative of a cross section of a tubular restrictive layer comprising an impermeable coating applied to the tubular restrictive layer of examples of the structural spacing component herein.

As described herein, a tubular restrictive layer comprising a textile component, such as a braided structure, may additionally be comprised of an impermeable layer such that the rigidizing media may not escape from the structural spacing component of the present subject matter. In examples of a tubular restrictive layer comprising a braided component, an impermeable coating may be applied to the braided structure prior to or following inversion of the desired portions and affixment of the portions which may comprise non-continuous tow materials. FIG. 21 is illustrative of a cross section of the braided structure illustrated in FIG. 17 which additionally comprises an impermeable coating 2101 applied to the braided structure after inversion. The impermeable coating of examples of the present subject matter may saturate the textile component such that the impermeable layer may be comprised on all surfaces of the braided component.

Figure 22:
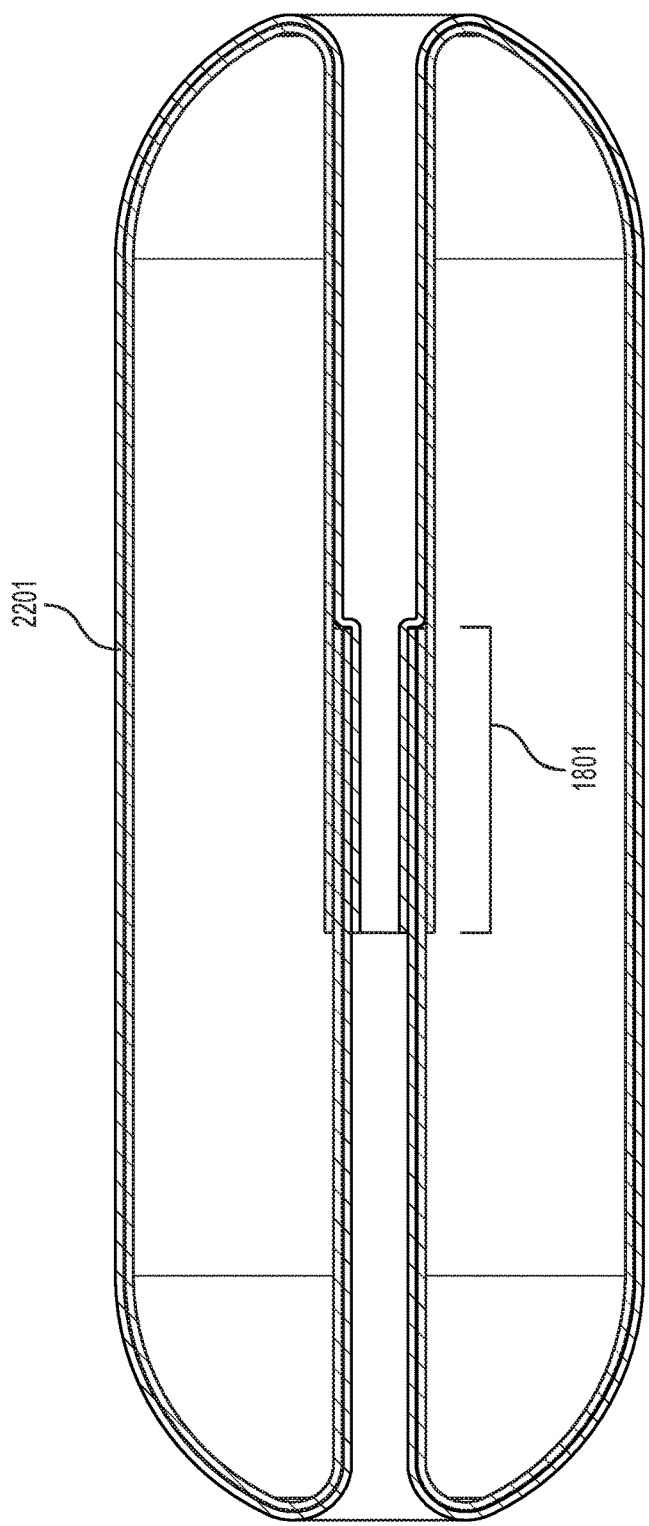
FIG. 22 is illustrative of a cross section of a tubular restrictive layer of examples wherein an impermeable sleeve may be applied after inversion of the braided structure comprising the tubular restrictive layer.

Additional examples of a tubular restrictive layer may comprise an impermeable layer comprising a sleeve of elastomeric, plastic rubber or other materials which may generally be configured to have the same shape as the braided structure of the present subject matter. An impermeable sleeve layer may be applied to the braided structure after inversion as illustrated in FIG. 22. FIG. 22 is illustrative of a cross section of the braided component illustrated in FIG. 17 to which an impermeable sleeve 2201 may be applied after inversion. As illustrated in FIG. 22, portions of the impermeable sleeve layer 2201 may form an additional layer of overlap within the overlap region 1801 comprising the braided structure of examples of the present subject matter. In additional examples of the present subject matter, the impermeable sleeve applied after inversion may not comprise an additional layer of overlap. In an example in which no overlap may be present for an impermeable sleeve after inversion, the ends of the sleeve may terminate such that the ends of the impermeable sleeve may touch. The ends of the sleeve may then be fused to create a solid impermeable layer.

Figure 23:
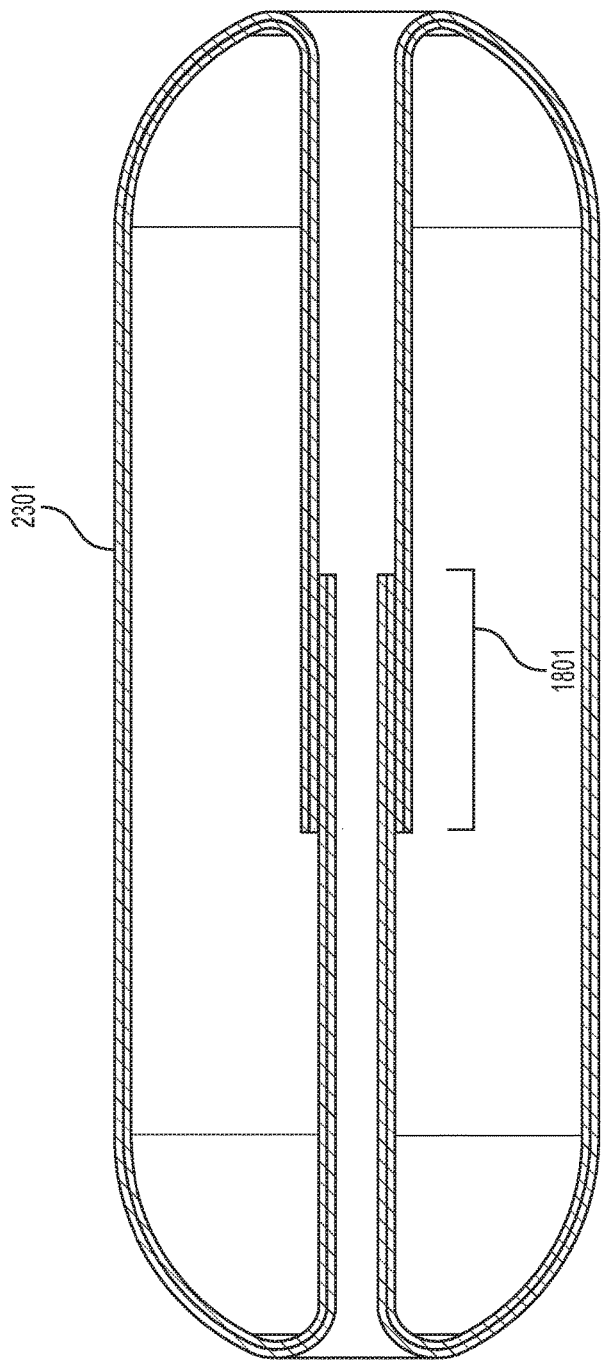
FIG. 23 is illustrative of a cross section of a tubular restrictive layer of examples wherein an impermeable layer may be applied before inversion of the braided structure comprising the tubular restrictive layer.

Additional examples of the structural spacing component of examples of the present subject matter comprising a tubular restrictive layer including a textile component may comprise an impermeable sleeve component wherein the sleeve may be applied to the braided structure before inversion of the braided structure on the outer surface of the braided structure. The portions of the braided structure which may comprise non-continuous tows may then be affixed after inversion of the braided structure and impermeable sleeve. A cross section of the braided structure of FIG. 17 to which an impermeable sleeve 2301 was applied before inversion of the braided structure is illustrated in FIG. 23. The example of the tubular restrictive layer of FIG. 23 may comprise an overlap region 1801 comprised of alternating layers of braided structure and impermeable sleeve layers.

Figure 24:
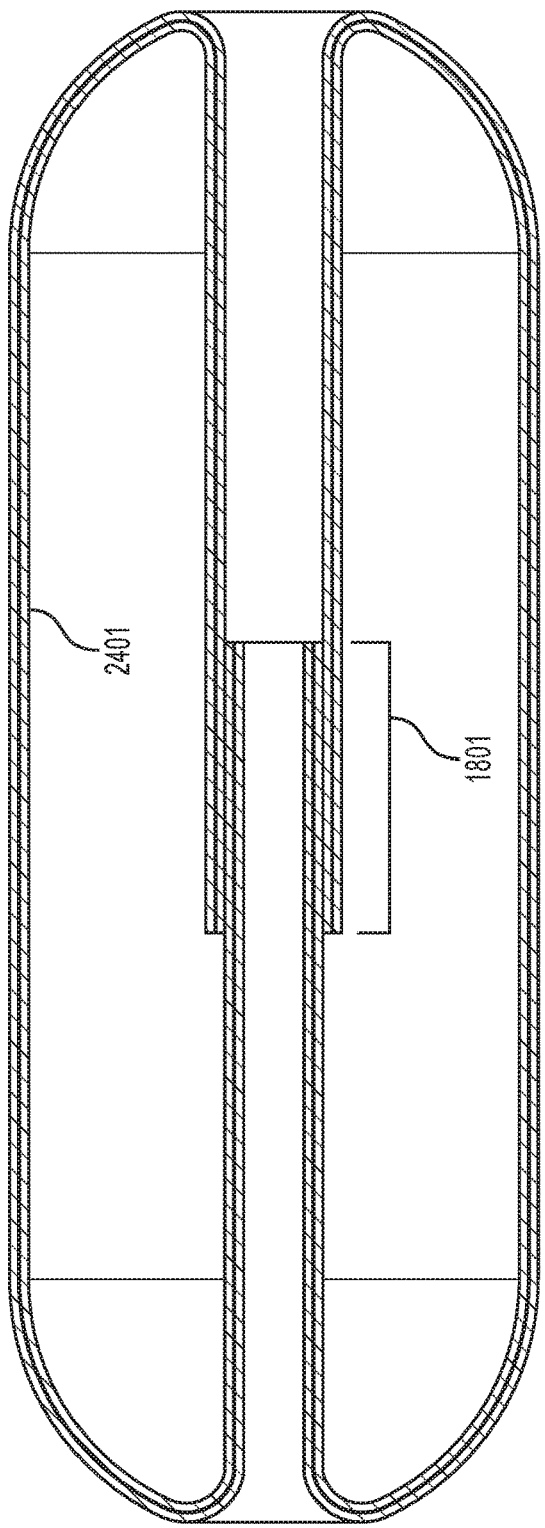
FIG. 24 is illustrative of a cross section of a tubular restrictive layer of examples wherein an impermeable layer may be applied before inversion on the interior surface of the braided structure comprising the tubular restrictive layer.

Similarly, an impermeable sleeve may be applied to the braided structure before inversion on the inner surface of the braided structure such that the braided structure may comprise the impermeable sleeve layer within the interior region of the braided structure. A cross section of the braided structure of FIG. 17 to which an impermeable sleeve 2401 layer has been applied to the inner surface of the braided sleeve before inversion is illustrated in FIG. 24.

Further, an impermeable coating may be applied to the braided structure as described herein and the whole of the braided structure may be inverted such that the impermeable coating may be comprised on the interior region of the sleeve. Subsequently, the desired portions of the braided structure may be inverted for the formation of a tubular restrictive layer of examples herein.

An impermeable layer comprised on the inner surface of a braided structure may allow for the formation of a structural spacing component wherein the braided structure may bear the force exerted by the rigidizable media comprised within the tubular restrictive layer of examples herein. As described in examples herein, an impermeable layer comprised on the interior surface of a braided structure may be forced against the braided structure upon rigidization of the structural spacing component. Therefore, the braided structure may bear the force exerted by the rigidizing media and the impermeable layer may not be prone to delamination.

Additionally, as described herein and illustrated in FIGS. 19 and 20 examples of the braided structure of the present subject matter may comprise an additional sleeve which may overlap portions of the braided structure comprising non-continuous tow materials. An impermeable sleeve or an impermeable coating may be applied to a braided structure comprising an additional sleeve in examples of the present subject matter such that the additional sleeve may be coated with the impermeable sleeve or layer as well as the braided structure on the interior or exterior surface of the sleeve.

Additional examples of the present subject matter may comprise additional layers of materials including an abrasion layer which may be comprised on the outer surface of the structural spacing component such that the braided structure comprising examples of the tubular restrictive layer of examples herein may not be subject to tear, wear, or direct contact with articles comprising the environment of the structural spacing component. The abrasion layer of examples herein may comprise elastomeric, plastic, rubber or other materials.

The braided structure 1500 illustrated in FIGS. 15-16 may be created through the use of a conventional may-pole style braiding machine wherein the braiding machine may comprise a fixed number of tow carrier devices, dispersed around a braiding machine track, which may move circumferentially as well as radially around the braiding machine track. The tow carrier devices comprising a conventional may-pole style braiding machine may generally be comprised within one of two groups of tow carrier devices; a first group which may travel clockwise circumferentially around the braiding machine track, or in the Z circumferential direction and a second group which may travel counterclockwise circumferentially around the braiding machine track, or in the S circumferential direction. Those tow carrier devices which may travel in the Z circumferential direction may be referred to as Z tow carrier devices and those which travel in the S circumferential direction may be referred to as S tow carrier devices.

Conventional braided products may comprise a two over, two under (2×2) braid architecture. A standard 2×2 braided structure may be formed over mandrels of varying geometry wherein the ratio of the largest cross sectional diameter of the mandrel to the smallest cross sectional diameter of the mandrel may not exceed a three to one ratio. In a case in which a standard 2×2 braided product may be formed over a mandrel of complex geometry in which the ratio of the largest cross sectional diameter to the smallest cross sectional diameter of the mandrel may exceed a three to one ratio, distortion within the braided product may occur wherein the 2×2 braided product may be formed over the smallest and largest cross sections of the mandrel. For example, stretching may occur over the section of largest cross sectional diameter and looseness and bunching may occur over the section of smallest cross sectional diameter. In areas of large cross sectional diameter of the mandrel in which the braid may stretch or distort, high tension, compared to the nominal, may be induced. Similarly in areas of small cross sectional diameter of the mandrel in which the braided structure may become loose, low tension may be induced.

Therefore, in an example of a braided structure like that illustrated in FIG. 15-16 comprising a 2×2 braid architecture, the diameter of the third portion 1501 may be three times larger than that of the first 1502 or fifth 1506 portions.

For the creation of a braided structure which may not experience distortion when formed over mandrels which may exceed a three to one ratio of the largest cross sectional diameter to the smallest, a braided structure comprised of longitudinally varying architecture may be formed. A braided structure comprised of longitudinally varying architecture may be formed over mandrels in which the ratio between the largest cross sectional dimeter of the mandrel to the smallest cross sectional diameter of the mandrel may be 3 to 1, 5 to 1, 9 to 1 or 10 to 1 in examples of the present subject matter.

An example of a braided structure comprised of longitudinally varying braid architecture may comprise a 1×1 braid architecture. The 1×1 braid architecture of an example of the braided structure illustrated in FIGS. 15 and 16 may comprise the first portion 1502 of the braided structure 1500 of FIGS. 15 and 16. When the desired length of the first portion 1502 may be formed, the second portion 1504 may then be formed such that the braid architecture may be sequentially increased from a 1×1 braid architecture, to a 2×2 braid architecture, a 3×3 braid architecture, a 4×4 braid architecture and finally a 5×5 braid architecture, wherein the 5×5 braid architecture may comprise the third portion 1501 of the braided structure 1500 in examples of the present subject matter. The braiding machine of an example of the present subject matter may be comprised of enlarged horn disks. In addition, specialized tow carrier devices may also be employed to reduce the effects of sawing.

The braided structure comprised of longitudinally varying braid architecture of examples herein may allow for alterations within the braid architecture along the longitudinal axis of the braided structure during the braiding process to eliminate changes in tension and bias angle due to distortions within the braid structure. Further, alterations of braid architecture along the longitudinal axis of the braided structure may be achieved while maintaining the tow materials comprising the braided structure as continuous.

Conventional braided structures may generally be comprised of singular braid architectures along the longitudinal axis of the braided product. To alter the braid architecture of a conventional braided structure along the longitudinal axis of the braided product, a plurality of individual portions of braided product comprising the desired braid architectures must be spliced, sewn, or otherwise affixed to one another to achieve a braided product comprised of longitudinally varying braid architecture. In these cases, tow materials may not be continuous within the transitory braid architecture of the braided product, resulting in sections of distorted bias angle, disruption in the braided structure and disruption in the coverage of the braided structure at transition points in which the braid architecture may be altered from one braid architecture to another. Coverage of the braided structure may be defined as fiber density or compaction of tow materials within the braided structure.

The braided structure with longitudinally varying braid architecture of the present subject matter may comprise transitory braid architectures along the longitudinal axis of the braided structure wherein; there may be a seamless transition between braid architectures and in which the tow materials may be maintained as continuous. Maintenance of the tows as continuous along the longitudinal axis of the braided structure may be achieved through the removal, or sequester, of tow carrier devices during specific intervals during the braiding process and the addition or release of tow carrier devices at specific intervals during the braiding process. Further, alterations within the braid architecture of the braided structure of examples herein may allow for transitions in the diameter of the braided product. In an example, a 1×1 braid architecture may comprise a smaller braid diameter, a smaller plurality of tow carrier devices and may conform best to smaller cross-sectional diameters of a mandrel of complex geometry, than large cross-sectional diameters of a mandrel of complex geometry. The addition, or release, of a plurality of tow carrier devices into the braiding machine of the present subject matter may result in the formation of a 5×5 braid architecture comprising a larger number of tow carrier devices and which may conform best to larger areas of cross-sectional geometry, as opposed to smaller areas of cross-sectional geometry.

In a non-limiting example, the braiding machine of the present subject matter may comprise a maximum total of 120 tow carrier devices at any point during the braiding process. At the beginning of the braiding process ⅕ of the total 120 tow carrier devices, or 24 tow carrier devices, may be dispersed around the braiding machine track for the formation of a 1×1 braid architecture; the remaining ⅘, or 96 tow carrier devices, of the total 120 tow carrier devices may be sequestered. During the manufacturing process, ¼ of the sequestered tow carrier devices may be released, resulting in the creation of a 2×2 braid architecture comprised of 48 tow carrier devices while 72 tow carrier devices may remain sequestered. Subsequently, ⅓ of the remaining sequestered tow carrier devices may be released, resulting in the creation of a 3×3 braid architecture comprised of 72 tow carrier devices while 48 may remain sequestered. Consequently, the release of tow carrier devices may continue until all tow carrier devices may be released and a 5×5 braid architecture may be achieved. Accordingly, each instance in which tow carrier devices may be released may result in an increase in the diameter of the braided structure comprised of longitudinally varying architecture. Therefore, it may be understood in examples of the present subject matter that large braid architectures may correspond with large diameters of the braided structure and small braid architectures may correspond with small diameters of the braided structure. Further, the transition in braid architecture, and diameter, along the longitudinal length of the braided product may allow for the same bias angle, tension and braid coverage along the length of the braided structure to be maintained as no distortion within the braided structure may occur.

Additionally, the transitory braid architecture of the braided structure described herein may allow for greater ratios of the largest cross-sectional diameter of a mandrel to the smallest cross-sectional diameter of a mandrel to be overbraided without distortion within the braided structure, than the three to one ratio for conventional braided structures. Therefore, a greater variety of mandrels with complex geometry may be overbraided than may be achieved with conventional braided structures. In an example of the present subject matter in which the braid architecture may be altered from a 1×1 to a 5×5 braid architecture, a mandrel comprised of a ratio of the largest cross-sectional diameter to the smallest cross-sectional diameter of the mandrel of at least five to one ratio may be overbraided without distortion in the braided structure.

As described herein, the braided structure comprised of longitudinally varying braid architecture of examples, may allow for the creation of a braided structure comprising consistent bias angle, consistent tension, the maintenance of tow materials comprising the braided structure as continuous between transitions in braid architecture, maintaining tows as continuous along the longitudinal axis of the braided structure and the overbraiding of more complex and widely variable mandrels of complex geometry. Further, the braided structure described herein may additionally allow for uniform braid coverage to be achieved along the longitudinal length of the braided structure.

Figure 25:
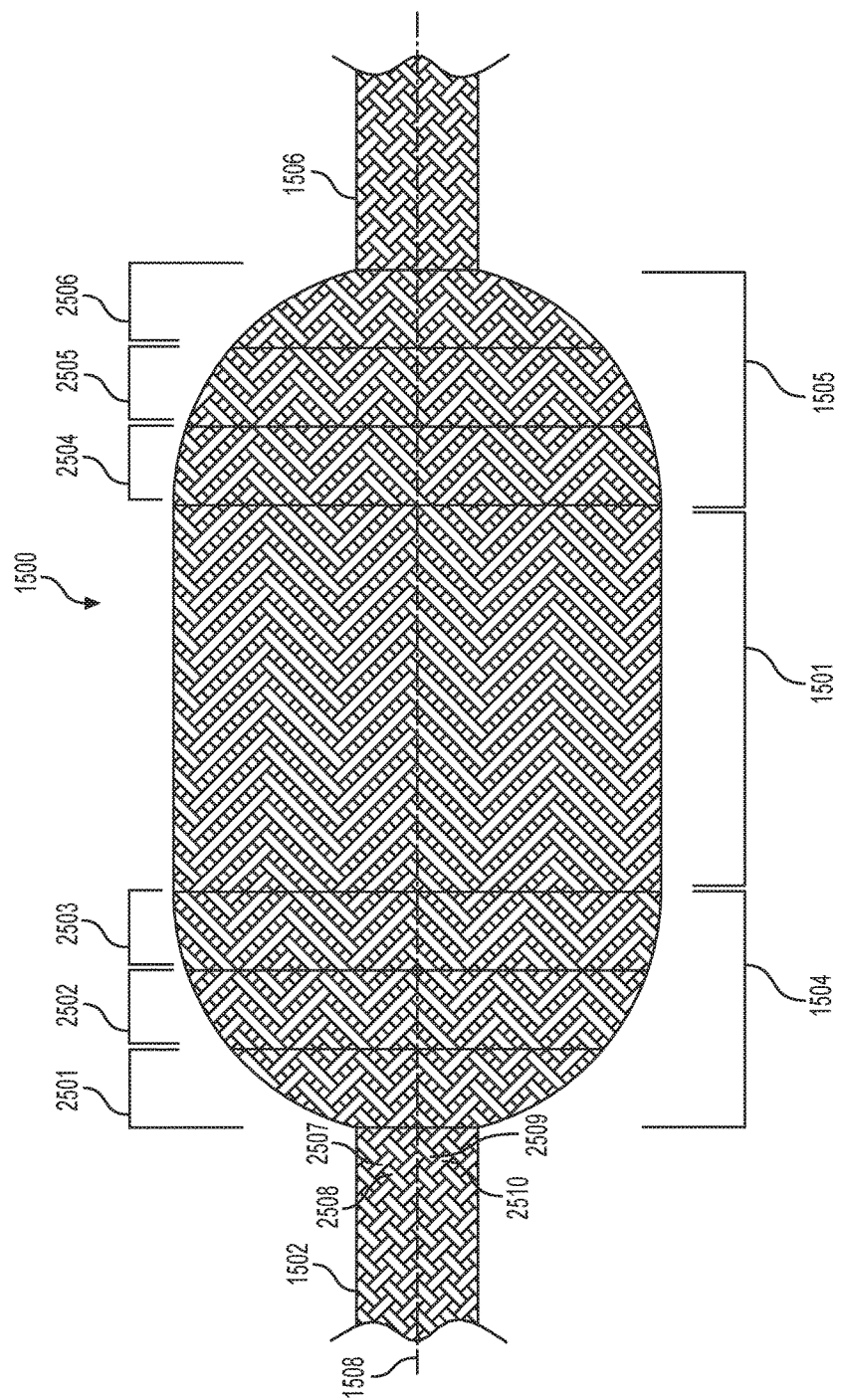
FIG. 25 is illustrative of a braided structure of examples comprised of a longitudinally varying braid architecture.
Figure 26:
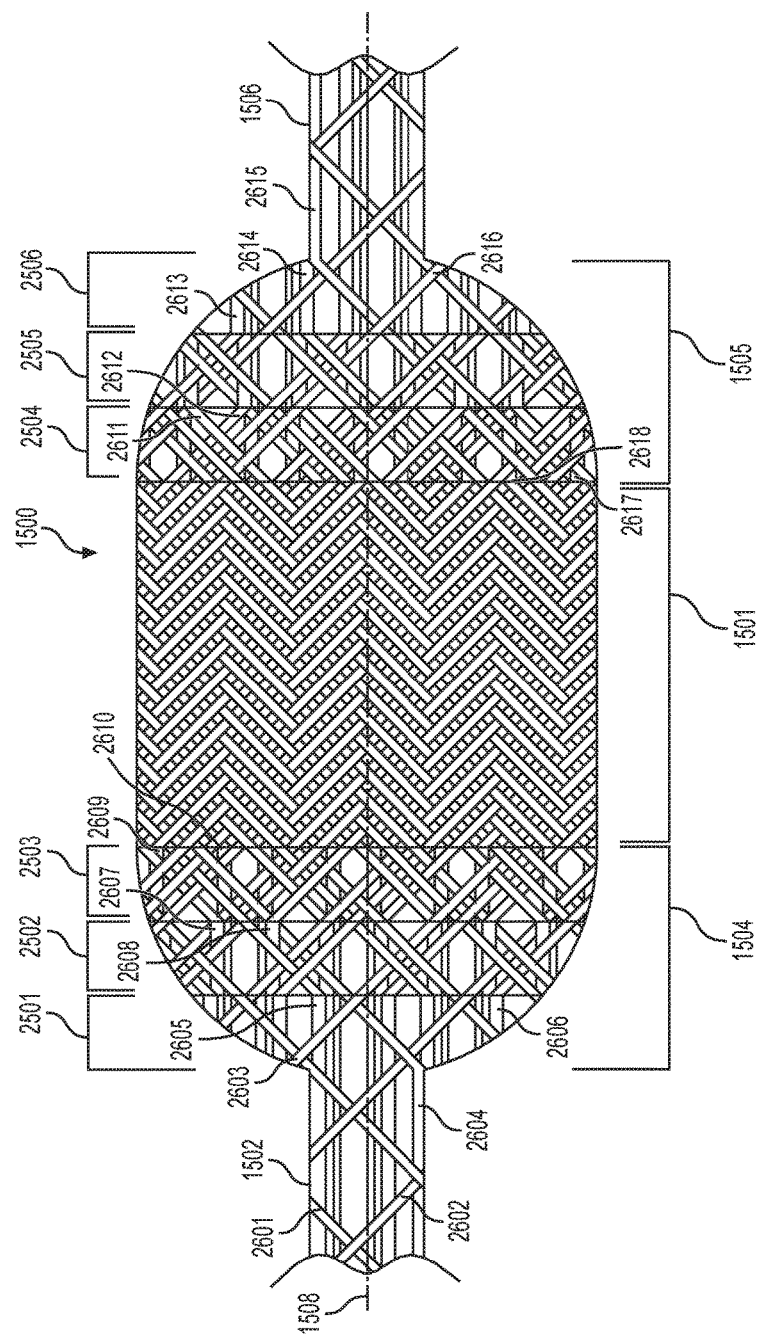
FIG. 26 is illustrative of the addition and sequester of tow materials from the braided structure of examples comprised of longitudinally varying braid architecture.

An example of the braided structure of the present subject matter comprised of longitudinally varying architecture is illustrated in FIG. 25. FIG. 25 illustrates a minimal transition between braid architectures along the longitudinal axis of the braided product as may be achieved in examples of the braided structure of the present subject matter. FIG. 26 illustrates in exaggerated detail the release, or addition of tows, and the sequester of tows comprising the braided structure during specific intervals during the braiding process for the formation of a braided structure like that illustrated in FIG. 25.

The braided structure of examples of the present subject matter as illustrated in FIG. 25 may comprise a 1×1 braid architecture. At the beginning of the braiding process, the 1×1 braid architecture may comprise the first portion 1502 of the braided structure. When the desired length of the first portion 1502 may be formed, the second portion 1504 may be formed such that the braid architecture may be increased in stages through the release of tow materials into the braided structure.

As illustrated in FIG. 25 the second portion may comprise three sub-portions, a primary sub-portion 2501, a secondary sub-portion 2502 and a tertiary sub-portion 2503 wherein each sub-portion may comprise a specific braid architecture, such that the braid architectures may be increased from the primary sub-portion 2501 to the tertiary sub-portion 2503. Subsequently, in examples of the braided structure of the present subject matter, after the first portion 1502 may be braided, such that the first portion 1502 may comprise a 1×1 braid architecture, the second portion 1504 may be formed such that tow materials may be released into the braided structure for the formation of a 2×2 braid architecture comprising the primary sub-portion 2501 of the second portion 1504. Following the formation of the primary sub-portion 2501, the secondary sub-portion 2502 may be braided with a 3×3 braid architecture resulting from an additional release of tow materials into the braided structure. Consequently, following a third release of tow materials into the braided structure, the tertiary sub-portion 2503 comprising the second portion 1504 may be braided such that the tertiary sub-portion 2503 may comprise a 4×4 braid architecture. After the second portion 1504 may be completed, the third portion 1501 may be formed wherein a final release of tow materials may take place for the formation of a 5×5 braid architecture which may comprise the third portion 1501.

Following the formation of the third portion 1501 of the braided structure 1500 illustrated in FIG. 25, the fourth portion 1505 of the braided structure 1500 may be formed. Like the second portion 1504, the fourth portion 1505 may comprise three sub-portions, a quaternary sub-portion 2504, a quinary sub-portion 2505 and a senary sub-portion 2506. In opposition to the second portion 1504, the braid architecture may decrease, as a result of the sequester of tow materials within the quaternary sub-portion 2504 to the senary sub-portion 2506.

Therefore, as illustrated in FIG. 25, following the formation of the third portion 1501, the fourth portion 1505 comprising the braided structure 1500 may be formed in which the braid architecture may be decreased from the 5×5 braid architecture comprising the third portion 1501 to a 4×4 braid architecture comprising the quaternary sub-portion 2504 through the sequester of tow materials. Subsequently, tow material may again be sequestered for the formation of the quinary sub-portion 2505 of the fourth portion 1505 of the braided structure 1500 for the formation of a 3×3 braid architecture. The sequester of tow materials may continue for the formation of the senary sub-portion 2506 comprising a 2×2 braid architecture. Finally, after the fourth portion 1505 may be completed, a final sequester of tow material may take place such that the fifth portion 1506 may comprise a 1×1 braid architecture.

As described in examples herein, the first portion 1502 of the braided structure illustrated in FIG. 25, may comprise a 1×1 braid architecture. This repeating pattern may be achieved through the movement of tow carrier devices along a braiding machine track circumferentially as well as radially inwards and outwards from the center of the braiding machine. A brief discussion of FIG. 27 follows to provide reference for the movement of tow carrier devices around a braiding machine track for the formation of a braided structure of the present subject matter.

Figure 27:
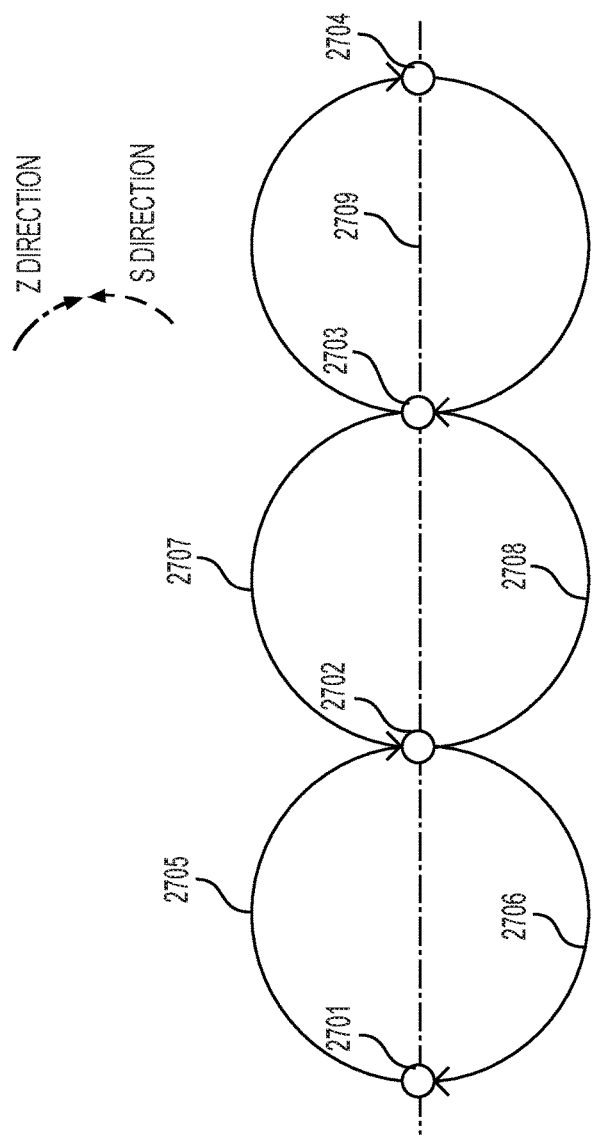
FIG. 27 is illustrative of a simplification of a braiding machine described herein.

A simplification of the braiding machine of an example of the present subject matter may be illustrated in FIG. 27. A braiding machine may be comprised of a plurality of nodes 2701, 2702, 2703 and 2704, equally dispersed around a braiding machine track, or ring 2709. Tracks traveled by S and Z tow carrier devices may intersect, forming source nodes 2701 and sink nodes 2702. A single node may be a source for one or more S and Z tracks and a sink node for one or more S and Z tracks. A source node 2701 may be described as an event in which a tow carrier device may travel around the outermost track of a braiding machine, farthest from the braiding machine center and a sink node 2702 may be described as an event in which a tow carrier device may travel along the innermost track of the braiding machine, closest to the braiding machine center.

A typical 2×2 braiding machine comprised of 120 tow carrier devices may generally be comprised of 60 nodes with an S and Z track intersecting each node. For a first set of two nodes, 2702 and 2703, there may be an S edge 2707 in the S direction and a Z edge 2708 in the Z direction. Between nodes 2702 and 2701, S and Z edges may interchange in such a manner that an S edge 2706 may occur on the inner surface of the braided structure and a Z edge 2705 may occur on the outer surface of the braided structure. Between nodes 2702 and 2703, the S edge 2707 may occur on the outer surface of the braided structure and the Z edge 2708 may occur on the inner surface of the braided structure.

A continued discussion of FIG. 25 with respect to FIG. 27 follows. A single S traveling tow carrier device affixed with a spool of tow material may be transferred along inner 2706 and outer 2707 S edges of a braiding machine track. As a single S traveling tow carrier device may travel along an outer S edge 2707 of a braiding machine track for the formation of a 1×1 braid architecture, one Z traveling tow carrier device affixed with a spool of tow material may travel along an inner Z edge 2708 of the braiding machine track. The S tow carrier device on the outer S edge 2707 may pay out material in the bias direction as it may pass over the Z traveling tow carrier device traveling on an inner Z edge 2708, resulting in the creation of a portion of the tow material 2507 affixed to the spool on the S traveling tow carrier device on the outer surface of the braided structure. Further this may result in a portion of the tow material 2508 affixed to the spool of the Z traveling tow carrier device on the inner surface of the braided structure. Conversely, as a single Z traveling tow carrier device may travel along an outer Z edge 2705 of a braiding machine track, one S traveling tow carrier device affixed with a spool of tow material may travel along an inner S edge 2706 of the braiding machine track. The Z tow carrier device on the outer Z edge 2705 may pay out material as it may pass over the S traveling tow carrier device traveling on the inner S edge 2706, resulting in the creation of a portion of the tow material 2510 affixed to the spool of the Z traveling tow carrier device on the outer surface of the braided structure. This may further result in a portion of the tow material 2509 affixed to the spool of the S traveling tow carrier device on the inner surface of the braided structure. The pattern of exchange of portions of tow material on the inner and outer surface of the braided structure, or the intertwining of tow materials in a one over and one under pattern may result in the formation of a 1×1 braid architecture along the first portion 1502 of the braided structure.

The bias angle of a braided structure may be defined by the angle between any S traveling tow and the longitudinal axis and any Z traveling tow and the longitudinal axis along which the braided structure may be formed wherein the angle between any Z traveling tow and the longitudinal axis may be a positive angle and the angle between any S traveling tow and the longitudinal axis may be a negative angle. In examples of the braided structure comprising the tubular restrictive layer of the structural spacing component described herein, the bias angle along any of the portions 1502, 1504, 1501, 1505 and 1506 may be transitory along the longitudinal axis 1508 of the braided structure. An example of the braided structure of the present subject matter in which the bias angle along the third portion 1501 may be transitory is illustrated in FIG. 28.

Figure 28:
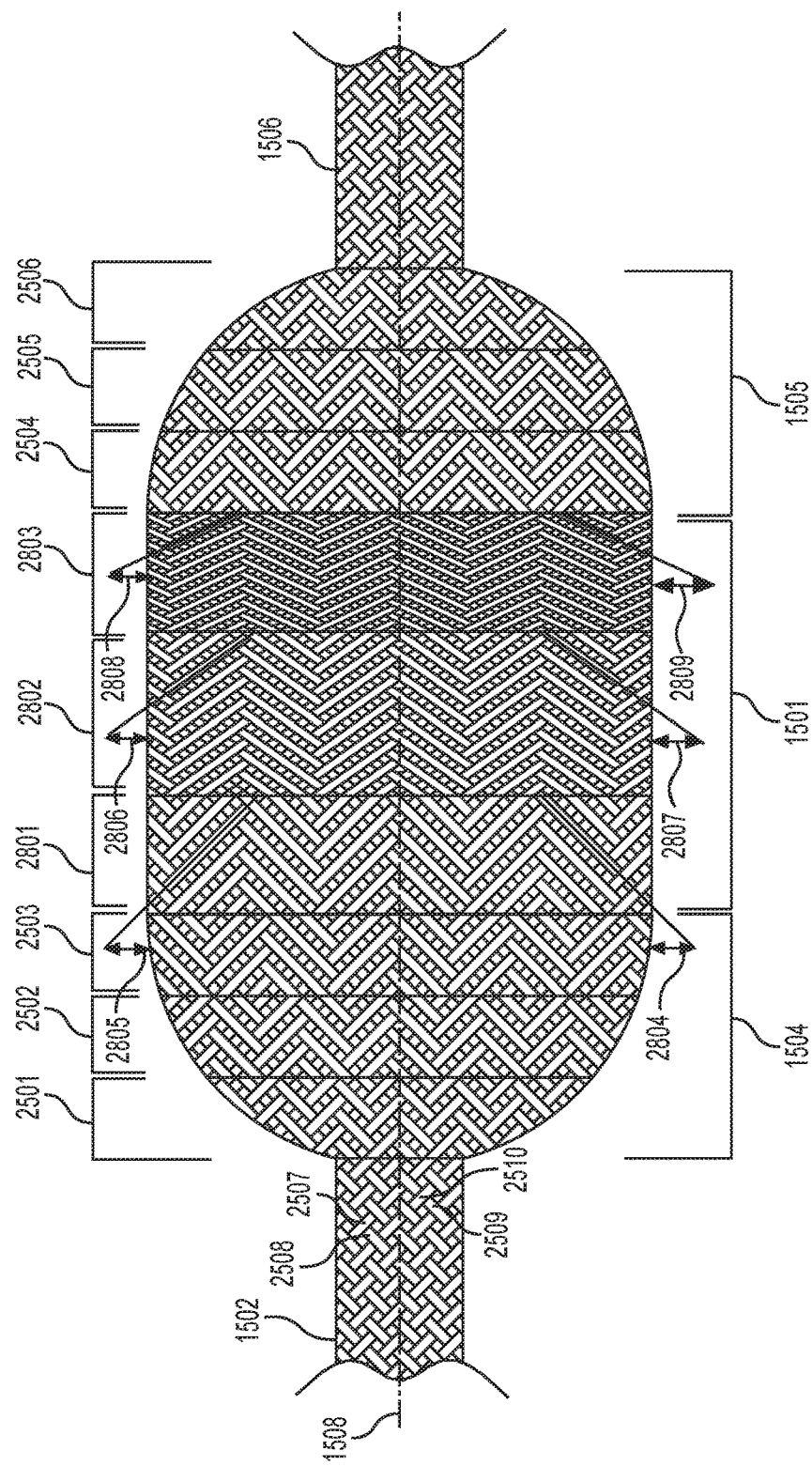
FIG. 28 is illustrative of a braided structure comprised of longitudinally varying braid architecture wherein the bias angle along specific portions of the braided structure may be varied.

The third portion 1501 illustrated in FIG. 28 may be divided into three different sub-portions, a primary sub-portion 2801, a secondary sub-portion 2802 and a tertiary sub-portion 2803; each which may comprise a different bias angle, 2804, 2805, 2806, 2807, 2808 and 2809 with respect to the longitudinal axis 1508 along which the braided structure may be formed. The bias angles, as described herein, comprising the primary 2801, secondary 2802 and tertiary 2803 sub-portions of the third portion 1501, may be divided into two groups; a first group comprising negative bias angles 2804, 2807 and 2809, and a second group comprising positive bias angles 2805, 2806 and 2808. The primary sub-portion 2801 may comprise the lowest bias angles, 2804 and 2805, along the longitudinal length of the braided structure wherein the bias angle may be defined by the angle 2805 between any S traveling tow and the longitudinal axis 1508 of the braided structure or the angle 2804 between any Z traveling tow and the longitudinal axis 1508 of the braided product. Subsequently, the secondary sub-portion 2802 comprising the third portion 1501 may comprise increased bias angles 2807 and 2806 compared to the primary sub-portion 2801 which, may lie between the bias angles of the primary sub-portion 2801 and the tertiary sub-portion 2803. As defined for the primary sub-portion 2801 comprising the third portion of the braided structure, the bias angles of the secondary sub-portion 2802 may be defined by the angle 2806 between any S traveling tow and the longitudinal axis 1508 of the braided product and the angle 2807 between any Z traveling tow and the longitudinal axis 1508 of the braided structure. Finally, the tertiary sub-portion 2803 may comprise bias angles 2809 and 2808, further increased compared to the primary 2801 and secondary 2802 sub-portions comprising the third portion 1501 of the braided structure of the present subject matter.

The bias angles comprising the braided structure of the present subject matter may vary along the longitudinal axis of the braided structure, or the same bias angle may be maintained along the longitudinal axis of the braided structure 1500 as illustrated in FIG. 25 and FIG. 26.

A discussion of FIGS. 25 and 26 resumes. Following the formation of the first portion 1502 comprising a 1×1 braid architecture, the second portion 1504 comprising transitory braid architecture may be braided such that the braid architecture may be increased from a 1×1 braid architecture to a 4×4 braid architecture.

In examples of the present subject matter in which the braid architecture may comprise a 1×1 braid architecture, tow carrier devices affixed with spools of tow materials may be sequestered such that the material affixed to the sequestered tow carrier devices may pay out material in the axial direction of the braided structure, or parallel with the longitudinal axis along which the braided structure was formed. While sequestered, tow materials may not participate in the formation of the braided structure of the present subject matter. Consequently tow carrier devices participating in the formation of the 1×1 braid architecture may be dispersed around the braiding machine track on S and Z edges as illustrated in FIG. 27. When the desired length of the first portion 1502 may be formed, the second portion 1504 may be formed such that sequestered tow carrier devices may be released into the braiding machine track which may result in an increase in the total number of tow carrier devices which may participate in the formation of the braided structure and which may also result in the alteration of the braid architecture from a 1×1 braid architecture to a 2×2 braid architecture. Further, the addition of sequestered tow carrier devices into the braiding machine track may result in an increase in diameter of the braided structure.

FIG. 26 is illustrative of the release of sequestered tows into the braided structure to achieve the transitory braid architecture of the braided structure 1500 of examples herein. In examples of the braided structure of the present subject matter, gaps illustrated in the braided structure of FIG. 26 may not be present, additionally; a greater plurality of tow materials may participate in the formation of the braided structure of the present subject matter.

To transition the 1×1 braid architecture of the first portion 1502 to the 2×2 braid architecture of the primary sub-portion 2501 comprising the second portion, tow carrier devices may be released into the braiding machine track, and therefore a greater plurality of tow materials may participate in the creation of the braided structure for the formation of the 2×2 braid architecture. The release of tow materials into the braided structure of the present subject matter may result in the transition of sequestered tow materials from axial tows paying out material in the longitudinal direction of the braided structure to bias tows which may participate in the formation of the braided structure and which may be comprised at bias angles with respect to the longitudinal axis of the braided structure. As illustrated in FIG. 26 the 1×1 braid architecture comprising the first portion 1502 may be formed by S traveling bias tow 2602 and Z traveling bias tow 2601. Upon the transition between the first portion 1502 and the second portion 1504 axial tows 2603 and 2604 may be released such that axial tow 2603 may be transitioned from an axial tow to an S traveling bias tow. Additionally, axial tow 2604 may be transitioned from an axial tow to a Z traveling bias tow. All other sequestered tow materials may continue to pay out tow material along the interior surface of the braided structure. In examples of the braided structure, axial tow materials may be paid out on the exterior surface of the braided structure or may pay out material on the exterior and interior surface of the braided structure.

Following the formation of the primary sub-portion 2501 of the second portion 1504 comprising the braided structure of the present subject matter, additional tow materials may be released into the braided structure which may result in an additional increase in the diameter of the braided product and which may increase the braid architecture from a 2×2 braid architecture to a 3×3 braid architecture. The 3×3 braid architecture may comprise the secondary sub-portion 2502 of the second portion 1504 comprising the braided structure of the present subject matter as illustrated in FIGS. 25 and 26. In examples of the present subject matter, bias angles may be maintained throughout the first portion 1502 and all sub-portions 2501, 2502 and 2503 of the second portion while in other examples each portion or sub-portion may comprise a specific bias angle.

Upon the release of tow materials following the formation of the braided structure of the secondary sub-portion 2501 comprising a 2×2 braid architecture a 3×3 braid architecture may be achieved wherein additional axial tows may be transitioned into bias tows. As illustrated in FIG. 26 a plurality of axial tows including axial tows 2605 and 2606 may be transitioned from axial tows to bias tows. As illustrated in FIG. 26 axial tow 2605 may be transitioned into a Z traveling bias tow while axial tow 2606 may be transitioned into an S traveling bias tow. During the formation of the 3×3 braid architecture axial tows may continue to pay out material along the longitudinal axis 1508 of the braided structure.

Following the braiding of the secondary sub-portion 2502 of the second portion 1504 of the braided structure illustrated in FIGS. 25 and 26, the tertiary sub-portion 2503 comprising the second portion 1504 of the braided structure may be formed. As described herein, tow materials may be released into the braided structure of the present subject matter such that the braid architecture may be increased from a 3×3 braid architecture to a 4×4 braid architecture such that the diameter of the braided product may be increased and such that additional tow carrier device may participate in the formation of the braided structure of examples herein. As illustrated in FIG. 26 a plurality of tow materials may be released into the braided structure for the formation of the 4×4 braid architecture comprising the tertiary sub-portion 2503 of the braided structure of the present subject matter, such that axial tow materials may be transitioned into bias tow materials. As illustrated in FIG. 26 axial tow 2607 may be transitioned into a Z traveling bias tow while axial tow 2608 may be transitioned into an S traveling bias tow.

Following the formation of the tertiary sub-portion 2503 comprising the second section 1504 of the braided structure, the remaining sequestered tow materials may be released such that all tow materials may participate in the formation of the third portion 1501 comprising the braided structure 1500 of examples of the present subject matter.

The release of the remaining sequestered tow carrier devices is illustrated in FIG. 26 in which all axial tows may be transitioned into bias tows. As illustrated in FIG. 26 axial tow 2609 may be transitioned into an S traveling bias tow while axial tow 2610 may be transitioned into a Z traveling bias tow.

Upon the final release of tow carrier devices following the completion of the second portion 1504 of the braided structure of examples herein, the third portion 1501 of the braided structure of 5×5 braid architecture may be braided.

Once a 5×5 braid architecture comprising the third portion 1501 of the braided structure may be achieved, the braiding process may continue until the desired length of the third portion 1501 may be achieved and the fourth portion 1505 may be desired to be formed. At this interval as illustrated in FIGS. 25 and 26, the braid architecture may be decreased from the 5×5 braid architecture comprising the third portion 1501 to a 1×1 braid architecture comprising the fifth portion 1506, such that the fourth portion 1505 may comprise a transitory braid architecture like that of the second portion 1504 and such that the fourth portion 1505 may comprise 4×4, 3×3 and 2×2 braid architectures. As the transitory braid architecture comprising the fourth portion 1505 may be braided, tow materials may be sequestered from the braided structure 1500 such that bias tow materials may be transitioned from bias tows to axial tows, in opposition to the transition of axial tows to bias tows as described for the formation of the second portion 1504 of the braided structure 1500 of examples of the present subject matter.

In this manner, during the transition in braid architecture from the 5×5 braid architecture of the third portion 1501 to the 4×4 braid architecture comprising the quaternary sub-portion 2504 of the fourth portion 1505, a plurality of bias tows including S traveling bias tow 2617 and Z traveling bias tow 2618 may be converted to axial tows. Additionally, upon the decrease in braid architecture from the 4×4 braid architecture of the quaternary sub-portion 2504 to the quinary sub-portion 2505 comprised of a 3×3 braid architecture, an additional plurality of bias tows including S traveling bias tow 2612 and Z traveling bias tow 2611 may be transitioned into axial tows. Subsequently upon the transition in braid architecture from the 3×3 braid architecture of the quinary sub-portion 2505 to the senary sub-portion 2506 comprising the fourth portion 1505, a plurality of bias tows including S traveling bias tow 2613 and Z traveling bias tow 2614 may be transitioned to axial tows. Finally, upon the completion of the senary sub-portion 2506 comprising the fourth portion 1505, the fifth portion 1506 may be formed such that a final set of tow material may be sequestered which may result in the transition in braid architecture from a 2×2 braid architecture comprising the senary sub-portion 2506 of the fourth portion 1505 comprising the braided structure of examples herein to the 1×1 braid architecture of the fifth portion 1506. Upon the transition in braid architecture from a 2×2 braid architecture to a 1×1 braid architecture, a final plurality of tow materials may be sequestered including S traveling bias tow 2616 and Z traveling bias tow 2615.

Additional examples of the braided structure with longitudinally varying architecture described herein may be comprised of different braid architectures. In a non-limiting example, an additional example may be comprised of alternating 2×2 and 4×4 regions with corresponding transition architectures between each architecture. Further alternate examples may be comprised of varying patterns of braid architectures and the corresponding transitions. For example, one alternate braid structure may be comprised of a 3×3 region transitioned to a 5×5 region transitioned to a 3×3 region to a 1×1 region and so on in any pattern required by the final deployment of the braid structure.

An alternate example of the present subject matter may include tow carrier devices comprised of a plurality of tow materials such that a material gradient may be obtained along the braided structure of longitudinally varying architecture as well as a gradient in braid architecture of the braided structure described herein.

Further, in additional examples of the present subject matter each sequestered group of tow carrier devices may be comprised of a plurality of tow materials such that the removal of one set of tow carrier devices may sequester a particular material from the braided structure until it is desired to reintroduce the material at another predetermined interval.

An additional example of the present subject matter may be comprised of a braided structure with longitudinally varying architecture which may incorporate a combination of a plurality of tow materials in which the ratio of the plurality of tow materials may be dictated by the sequester of specific sets of tow carrier devices at specific intervals during the manufacturing process.

In an additional example of the present subject matter, upon the sequester of tow carrier devices comprising a specific tow material, an additional set of tow carrier devices comprising a specific tow material may be introduced back into the outer braiding machine track. In this manner, the braid architecture of the braided structure may be maintained but the material of which the braided structure may be comprised may be altered. This process may be continued with the removal and addition of specific tow materials at intervals in which tow carrier devices may be sequestered. Further, at chosen intervals the braid architecture may be altered and no exchange of tow carrier devices may take place.

An additional example of the present subject matter may allow for the creation of a braided structure comprised of a constant ratio of specific tow materials. In a non-limiting example, an example of a braiding machine may be comprised of 120 tow carrier devices comprised of four sets of different tow materials. Of the 120 tow carrier devices, four sets of 30 tow carrier devices may comprise different tow materials. Upon the sequester of 24 tow carrier devices to transition from a 5×5 braid architecture to a 4×4 braid architecture, the tow carrier devices may be sequestered in such a way that six of each of the tow carrier devices of the four different tow materials may be removed. Tow carrier devices may be sequestered in such a fashion that each sequester of tow carrier devices may maintain the same ratio of tow carrier devices with different tow materials such that when the 1×1 braid architecture may be achieved and 24 tow carrier devices may remain un-sequestered, four sets of six tow carrier devices comprising different tow materials may remain.

Additional examples of the present subject matter may comprise braiding machines of greater pluralities of tow carrier devices to allow for additional variations of annular cross-sectional sized braided structures to be manufactured and a variety of different braid architectures to be achieved. For example, a braiding machine comprised of 144 tow carrier devices may be employed to result in the transition of braid architecture from a 6×6 braid architecture to a 1×1 braid architecture. In opposition, an additional example may be comprised of fewer tow carrier devices to achieve similar braid architectures with smaller annular cross-sectional diameters.

Examples of the braiding machine for the formation of the braided structure with longitudinally varying architecture comprising examples of the tubular restrictive layer of the present subject matter may comprise a sequester ring such that the braiding machine track may be circumferentially encompassed by the sequester ring and such that tow carrier devices may be sequestered such that sequestered tow materials may pay out material on the outer surface of the braided structure.

Figure 29:
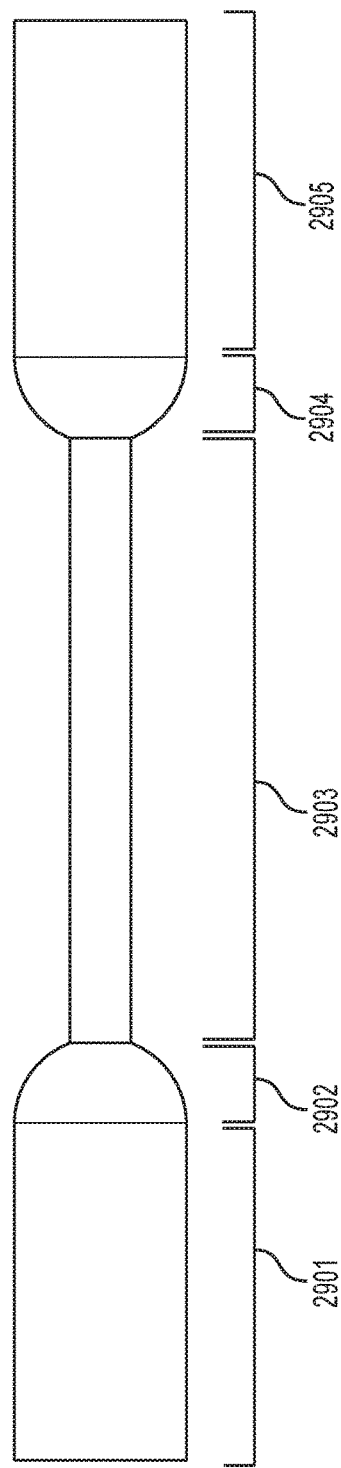
FIG. 29 is illustrative of an example of a braided structure comprised of longitudinally varying braid architecture of examples of the tubular restrictive layer herein.
Figure 30:
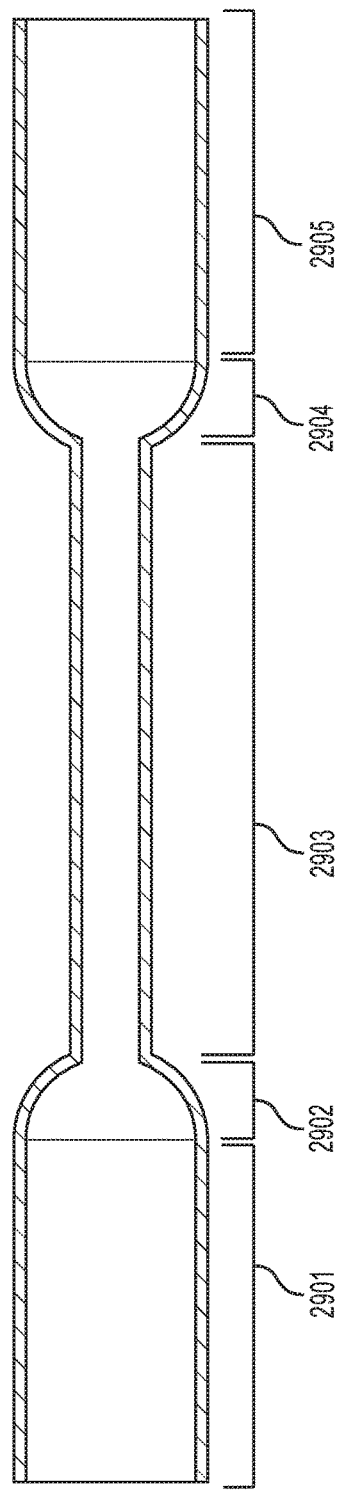
FIG. 30 is illustrative of a cross section of a braided structure of FIG. 29.

Examples of the braiding machine of the present subject matter which may comprise a sequester ring circumferentially encompassing the braiding machine track may be used for the formation of a braided structure like that illustrated in FIGS. 29 and 30. While an example of the braided structure of the present subject matter may be configured such that the starting and ending braid architectures of the first portion 1502 and the fifth portion 1505 may comprise 1×1 braid architectures, additional examples of the braided structure of examples of the present subject matter may comprise starting and ending 5×5 braid architectures like that illustrated in FIGS. 29 and 30. Therefore, as illustrated in FIGS. 29 and 30, the first portion 2901 of the braided structure may comprise a 5×5 braid architecture; the second portion 2902 may comprise a section of decreasing transitory braid architecture comprising 4×4, 3×3 and 2×2 braid architectures; the third portion 2903 may comprise a 1×1 braid architecture; the fourth portion 2904 may comprise a portion of increasing transitory braid architecture comprising 2×2, 3×3 and 4×4 braid architectures; and the fifth portion 2905 may comprise a 5×5 braid architecture.

Figure 31:
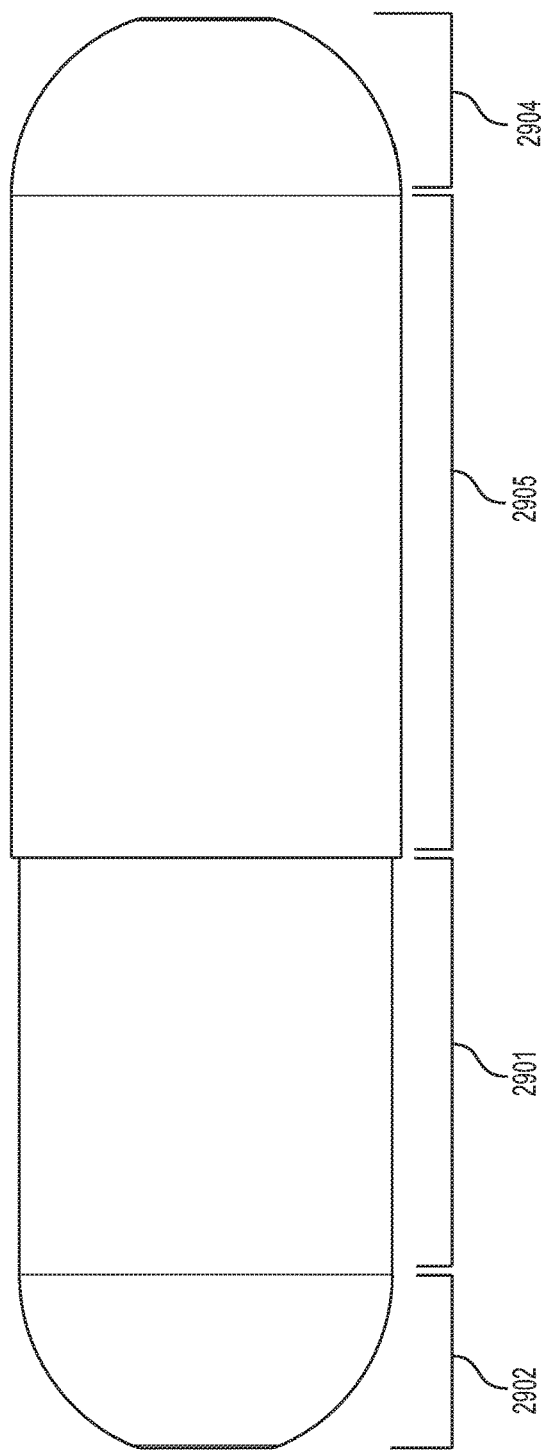
FIG. 31 is illustrative of the braided structure of FIGS. 29 and 30 wherein portions of the braided structure may be inverted.
Figure 32:
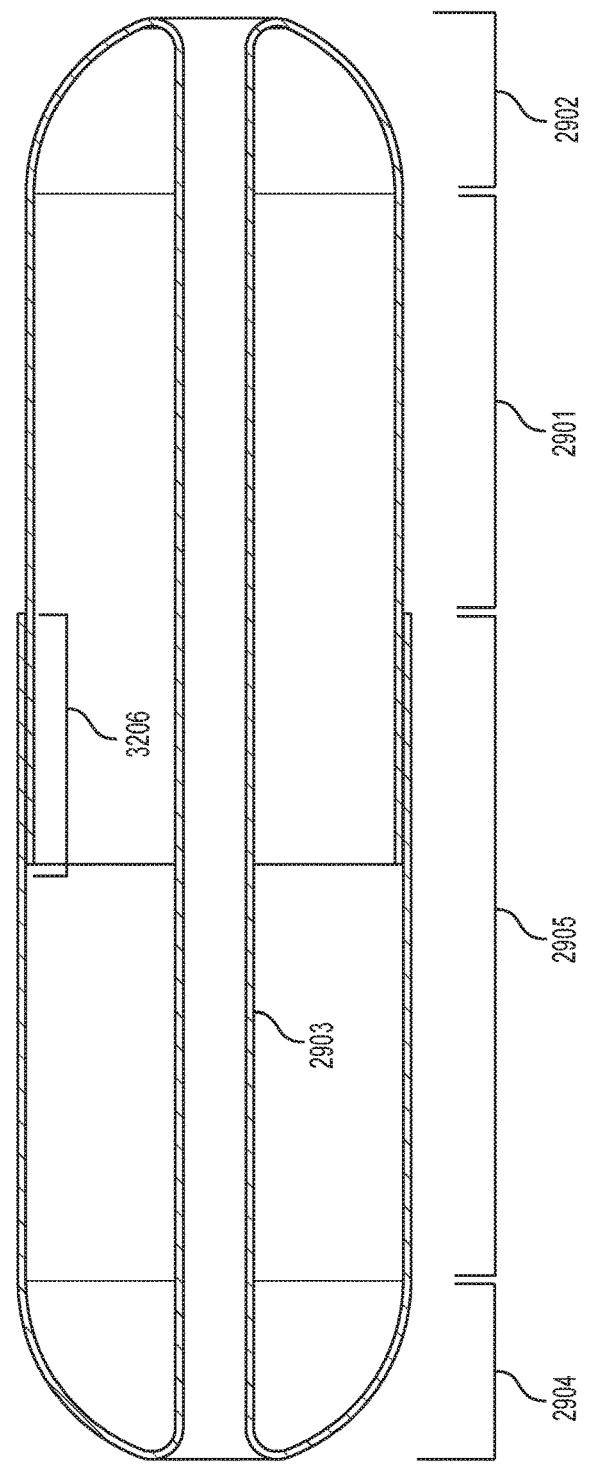
FIG. 32 is illustrative of a cross section of the braided structure of FIG. 31.

Therefore, the braided structure comprising the tubular restrictive layer of examples of the structural spacing component described herein, illustrated in FIGS. 31 and 32, may be fabricated in steps wherein the first portion 2901 and the second portion 2902 may be inverted such that the first portion 2901 and the second portion 2902 may encompass a portion of the third portion 2903. In a subsequent step for the fabrication of the braided structure, the fifth portion 2905 and the fourth portion 2904 may be inverted such that the fourth 2904 and fifth 2905 portions may encompass both a portion of the third portion 2903, and such that the fifth portion 2905 may circumferentially encompass a portion of the first portion 2901 such that an overlap region 3206 may be formed.

An example of the braided structure comprising the tubular restrictive layer of structural spacing components of examples of the present subject matter may comprise sequestered axial tow materials on the outer surface of the braided structure during formation such that upon inversion, sequestered axial tow materials may be comprised within the interior region of the tubular restrictive layer.

The formation of examples of the braided structure comprising the tubular restrictive layer of the structural spacing component of the present subject matter may be facilitated by the incorporation of collapsible mandrels into the braiding process.

Conventional braided products formed through the use of conventional may-pole style braiding machines may further comprise mandrels on which braided products may be formed which may aid in defining the final shape of the braided product especially in the case of triaxial braided products. Mandrels may generally reflect the shape, geometry and features of a final braided product. Due to the complex shape of the braided product illustrated in FIGS. 25 and 26, a collapsible mandrel may be employed such that the braided product may be formed over the mandrel during the braiding process and such that upon completion of the braided product, the mandrel may be removed without slitting or inducing disruption within the continuity of the tows comprising the braided structure of examples herein. The collapsible mandrel of the present subject matter may comprise inflatable bladders, collapsible metal structures, collapsible wireframes and other forms.

The braided structure comprising tubular restrictive layers of examples of the present subject matter may comprise additional features which may have particular utility for the construction, or which may provide additional structural features for deployment of the structural spacing component.

Figure 33:
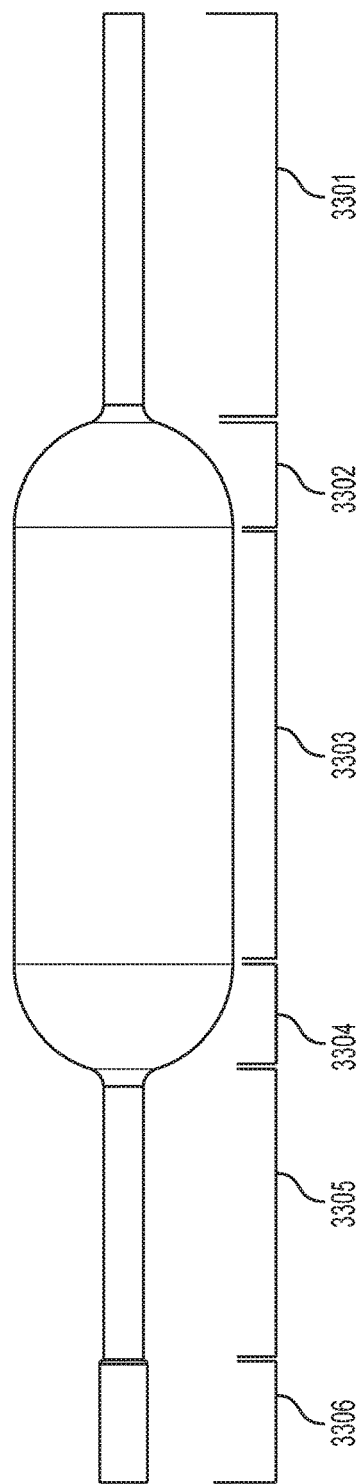
FIG. 33 is illustrative of a braided structure of examples of the present subject matter which may comprise additional structural features.
Figure 34:
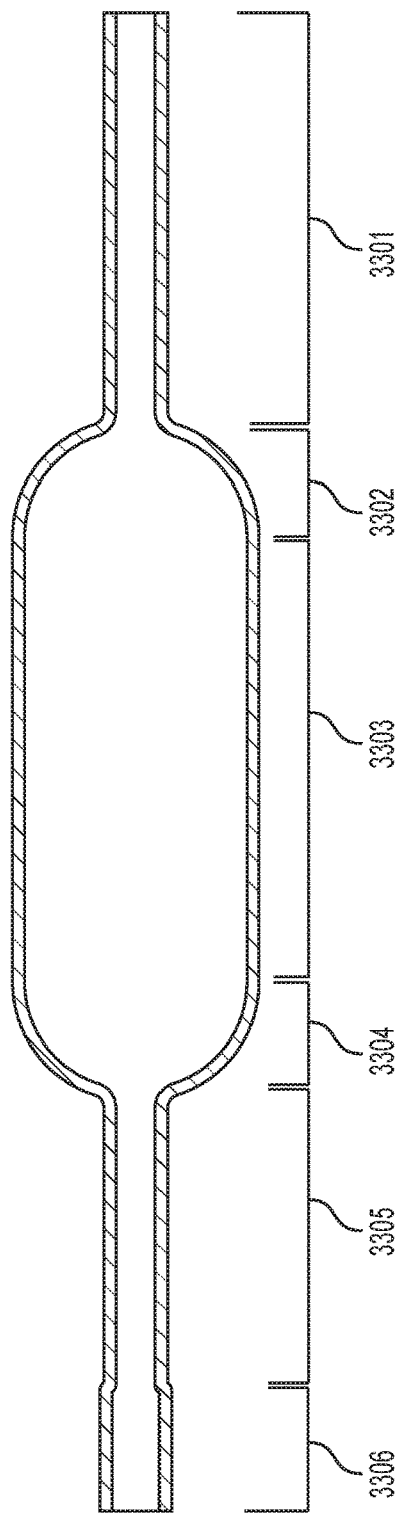
FIG. 34 is illustrative of a cross section of FIG. 33.

An example of the braided structure of examples of the present subject matter comprising additional features with particular utility for construction of the tubular restrictive layer is illustrated in FIGS. 33 and 34. The braided structure of the present subject matter may comprise six different portions, of which five may be comparable to the five portions comprising the braided structures of FIGS. 25 and 26. The first portion 3301 may comprise a 1×1 braid architecture and may be similar to the first portion 1502 of FIGS. 25 and 26; the second portion 3302 may comprise a portion of increasing transitory braid architecture including 2×2, 3×3 and 4×4 braid architectures, like that of the second portion 1504 of FIGS. 25 and 26; the third portion 3303 may comprise a 5×5 braid architecture like that of the third portion 1501 of FIGS. 25 and 26; similarly the fourth portion 3304 may comprise a section of transitory braid architecture wherein the braid architecture may decrease from a 4×4, 3×3 and to a 2×2 braid architecture like that of the fourth portion 1505 of FIGS. 25 and 26; a fifth portion 3305 which may comprise a 1×1 braid architecture like that of the fifth portion 1506 of FIGS. 25 and 26; and finally a sixth portion 3306 which may additionally be comprised of a 1×1 braid architecture. The fifth 3305 and sixth 3306 portions comprising the braided structure illustrated in FIGS. 33 and 34 may comprise the same braid architecture, but may differ in the cross sectional diameter of the braided structure. As illustrated in FIGS. 33 and 34, the fifth portion 3305 may comprise a smaller cross sectional diameter than the sixth portion 3306. The increased cross sectional diameter of the sixth portion 3306 may aid in the fabrication of the tubular restrictive layer of examples of the present subject matter as illustrated in FIGS. 35 and 36.

Figure 35:
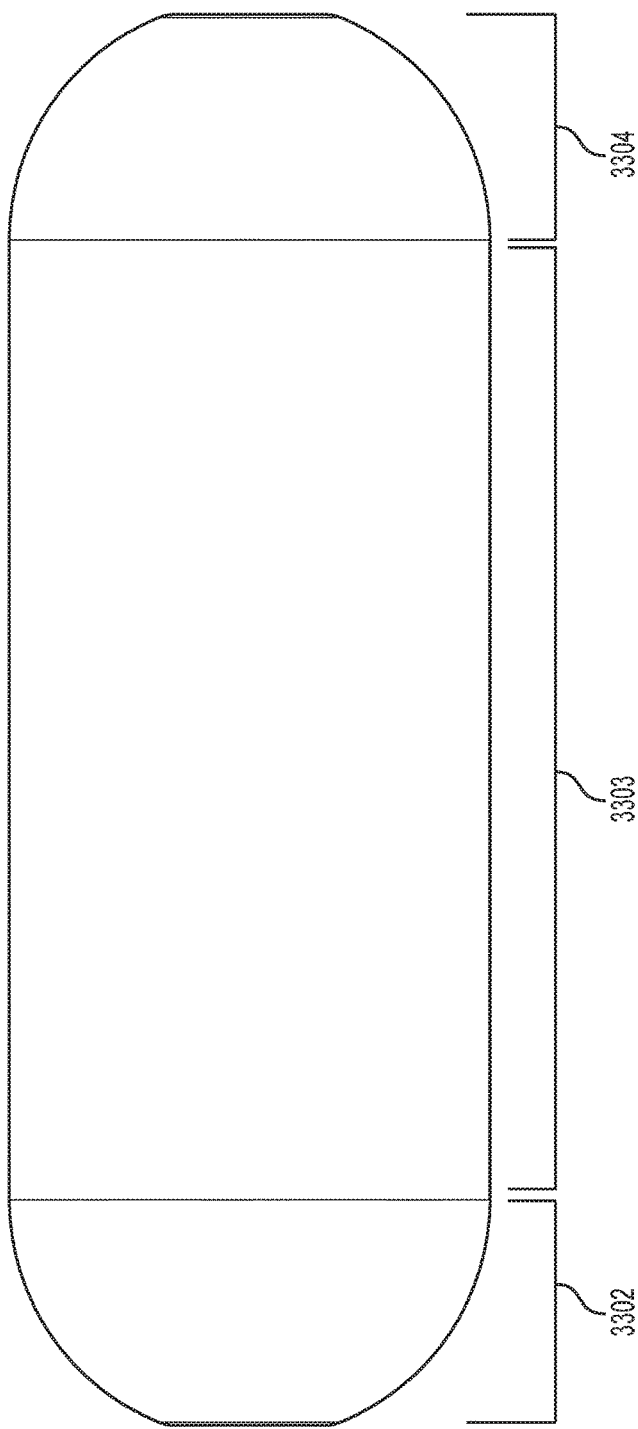
FIG. 35 is illustrative of the braided structure of FIGS. 33 and 34 in which portions of the braided structure may be inverted.
Figure 36:
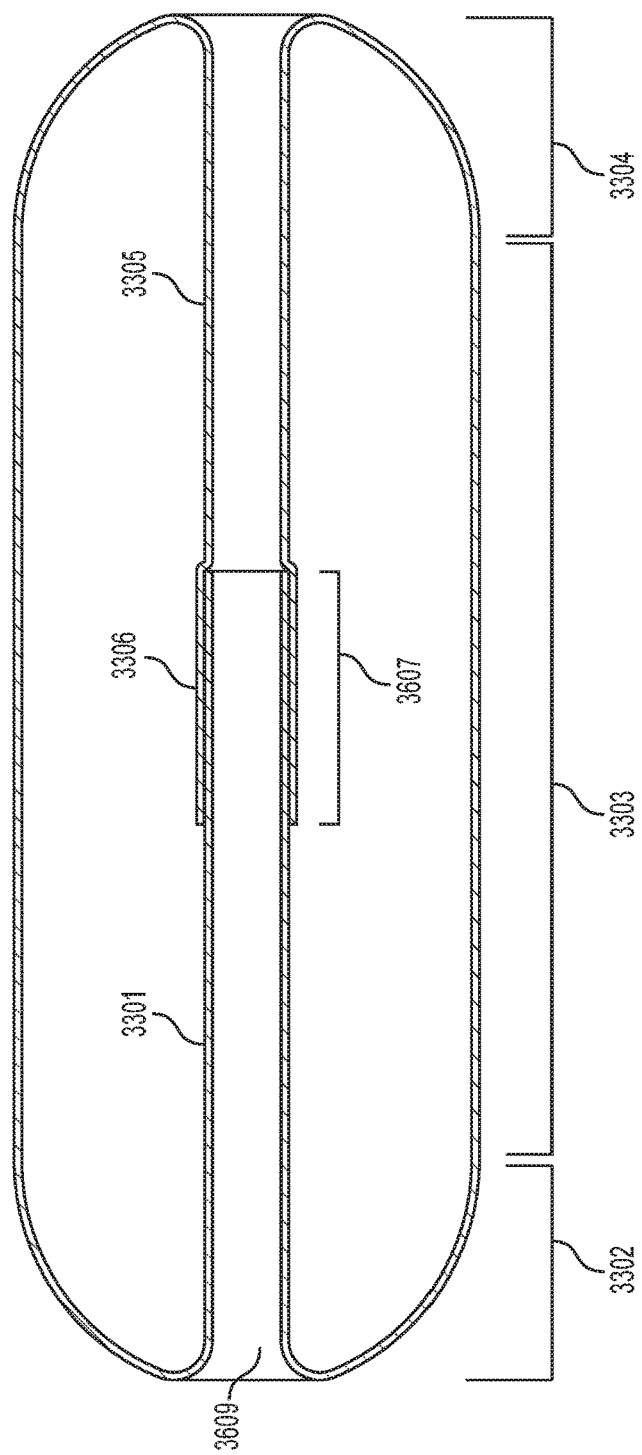
FIG. 36 is illustrative of a cross section of the braided structure illustrated in FIG. 35.

The formation of the braided structure illustrated in FIGS. 35 and 36 may begin with the inversion of the first portion 3301 of the braided structure such that the first portion 3301 may be comprised within the interior region of the braided structure comprised by the second portion 3302, the third portion 3303 and the fourth portion 3304. Subsequent to the inversion of the first portion 3301, the fifth 3305 and sixth 3306 portions may be inverted such that the fifth 3305 and sixth 3306 portions may be comprised within the interior region of the braided structure comprised by the second portion 3302, the third portion 3303 and the fourth portion 3304. Further, the sixth portion 3306 may circumferentially encompass a portion of the first portion 3301 such that an overlap region 3607 may be created.

The increased cross sectional diameter of the sixth portion 3306 during the braiding process may allow for a constant diameter of affixment feature 3609 and may allow for decreased disruption within the braided structure during the fabrication of the tubular restrictive layer.

While examples of the braided structure described herein may comprise features which may aid in the fabrication of the tubular restrictive layer, in additional examples, features may be included which may have particular utility for deployment of the structural spacing component, may be employed for aesthetic purposes or which may provide additional functional utility. A braided structure of examples of the present subject matter which may comprise additional functional or aesthetic features is illustrated in FIGS. 37 and 38.

Figure 37:
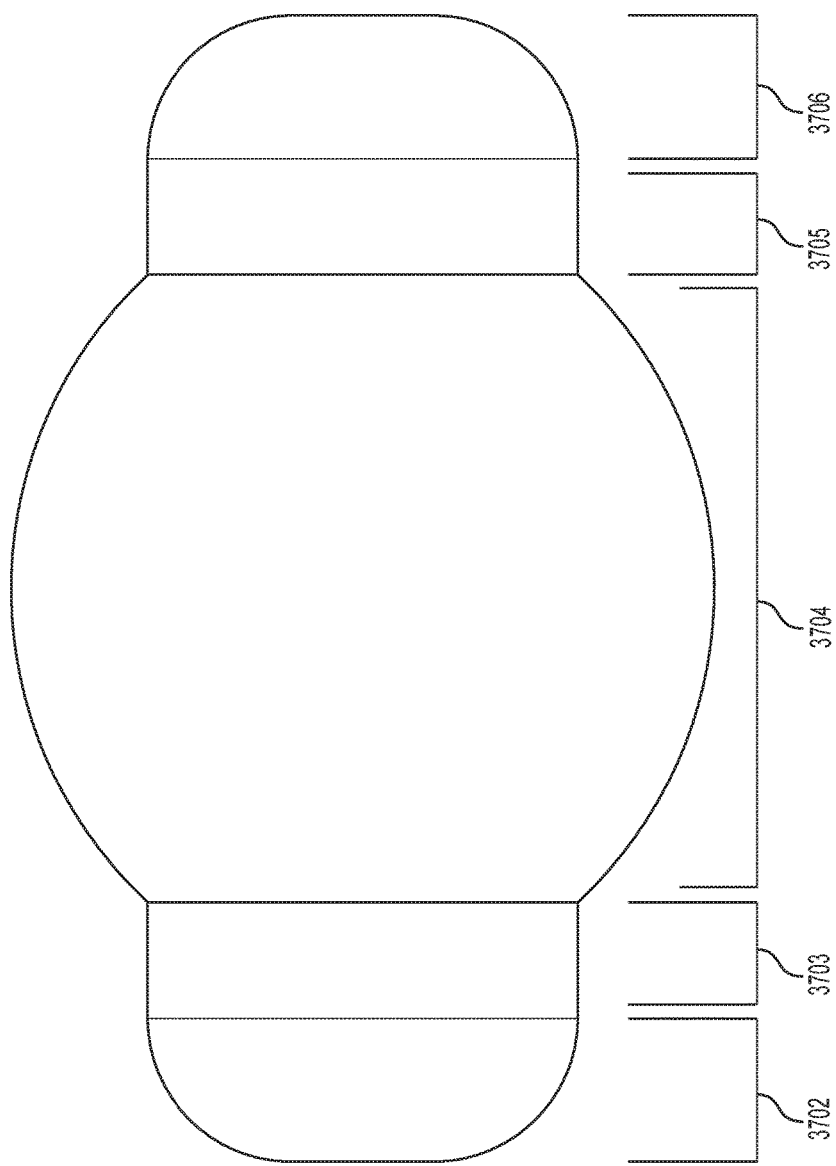
FIG. 37 is illustrative of an example of a tubular restrictive layer which may comprise a braided structure of an example of a structural spacing component herein.
Figure 38:
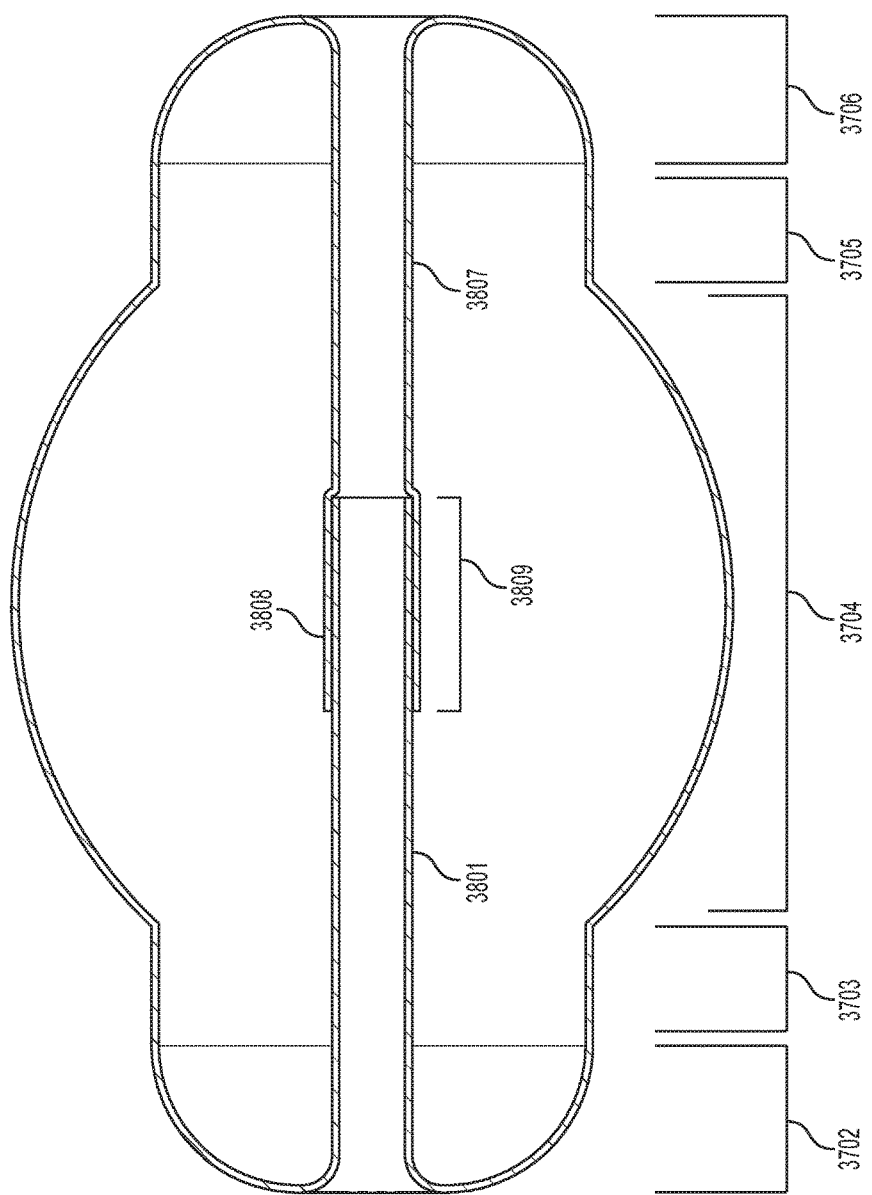
FIG. 38 is illustrative of a cross section of the braided structure of FIG. 37.

The braided structure illustrated in FIGS. 37 and 38, wherein the desired portions have been inverted, may be comprised of eight portions. The first portion 3801 may comprise a 1×1 braid architecture; the second portion 3702 may comprise a section of increasing transitory braid architecture which may comprise 2×2, 3×3 and 4×4 braid architectures; the third portion 3703 may comprise a 5×5 braid architecture; the fourth portion 3704 may comprise a 5×5 braid architecture wherein the cross sectional diameter may be at least three times larger than that of the cross sectional diameter of the third portion 3703; the fifth portion 3705 may comprise a 5×5 braid architecture; the sixth portion 3706 may comprise a section of transitory braid architecture wherein the braid architecture may be decreased from a 4×4 braid architecture to a 3×3 and 2×2 braid architecture; a seventh portion 3807 which may comprise a 1×1 braid architecture; and an eighth portion 3808 which may comprise a 1×1 braid architecture. Further in examples, the fourth portion 3704 may additionally comprise an additional region of transitory braid architecture wherein the braid architecture may be increased from a 5×5 braid architecture comprising the third portion 3703 to an N×N braid architecture and from the N×N braid architecture back to a 5×5 braid architecture for the formation of the fifth portion 3705. As illustrated in FIGS. 37 and 38, the first portion 3801, the seventh 3807 portion and the eighth portion 3808 may be inverted such that the eighth portion 3808 may circumferentially encompass a portion of the first portion 3801 and an overlap region 3809 may be formed.

Additional examples of the braided structure which may comprise tubular restrictive layers of structural spacing components of the present subject matter may comprise a plurality of portions for the formation of structural spacing components of a plurality of different shapes, like that illustrated in FIGS. 37-38 and additionally illustrated in FIGS. 39-43.

Figure 39:
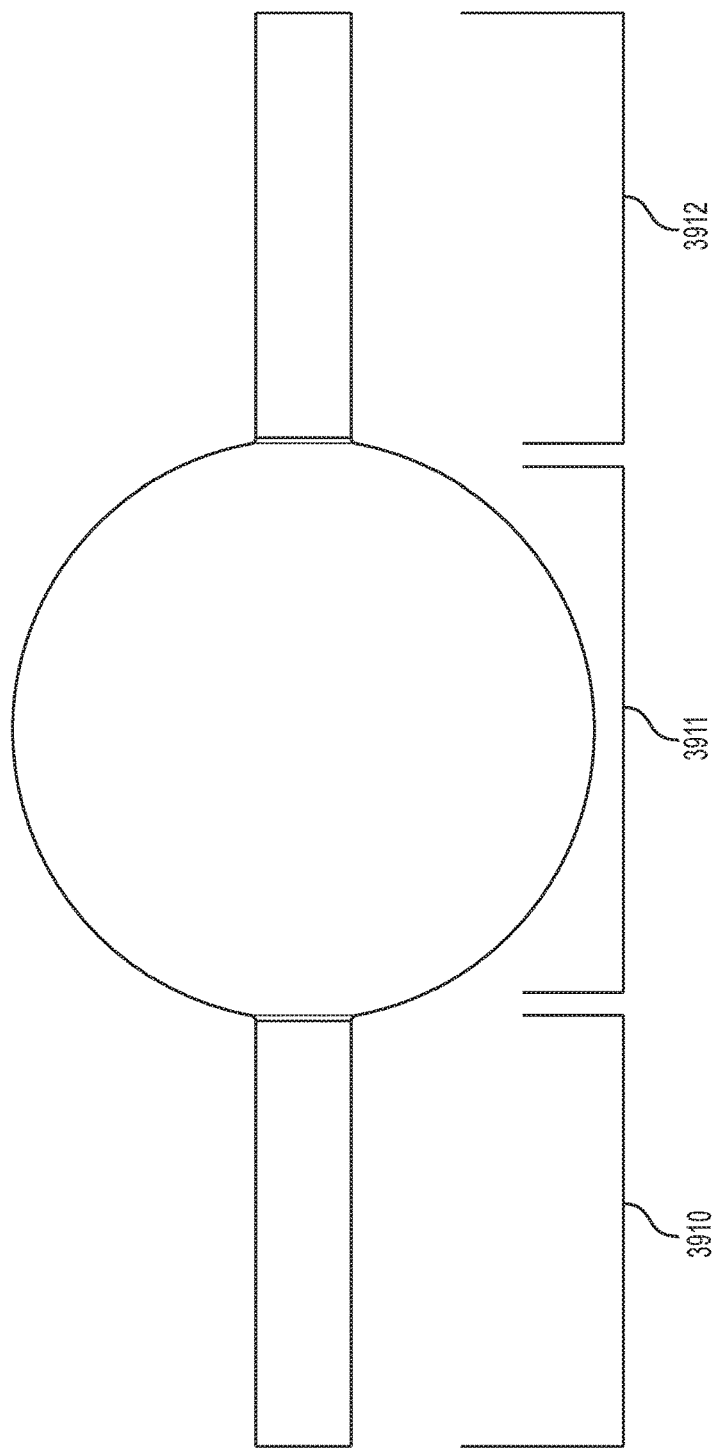
FIG. 39 is illustrative of a braided structure which may comprise an example of a tubular restrictive layer comprising a structural spacing component of the present subject matter.
Figure 40:
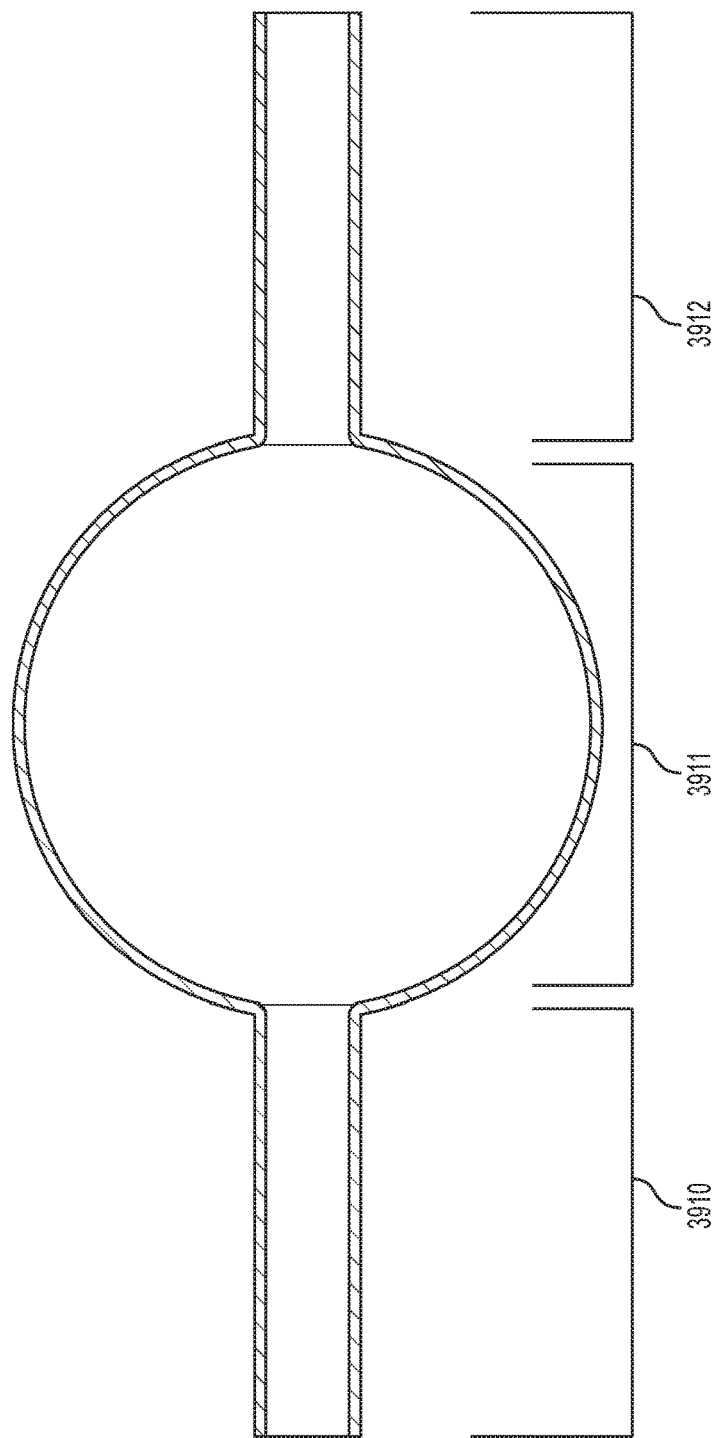
FIG. 40 is illustrative of a cross section of the braided structure of FIG. 39.

FIG. 39 is illustrative of a braided structure which may comprise a tubular restrictive layer in examples of the present subject matter wherein the braided structure may comprise three portions; a first portion 3910 which may comprise a 1×1 braid architecture, a second portion 3911 which may comprise a section of transitory braid architecture and a third portion 3912 which may additionally comprise a 1×1 braid architecture in examples of the present subject matter as illustrated in FIGS. 39 and 40.

Figure 41:
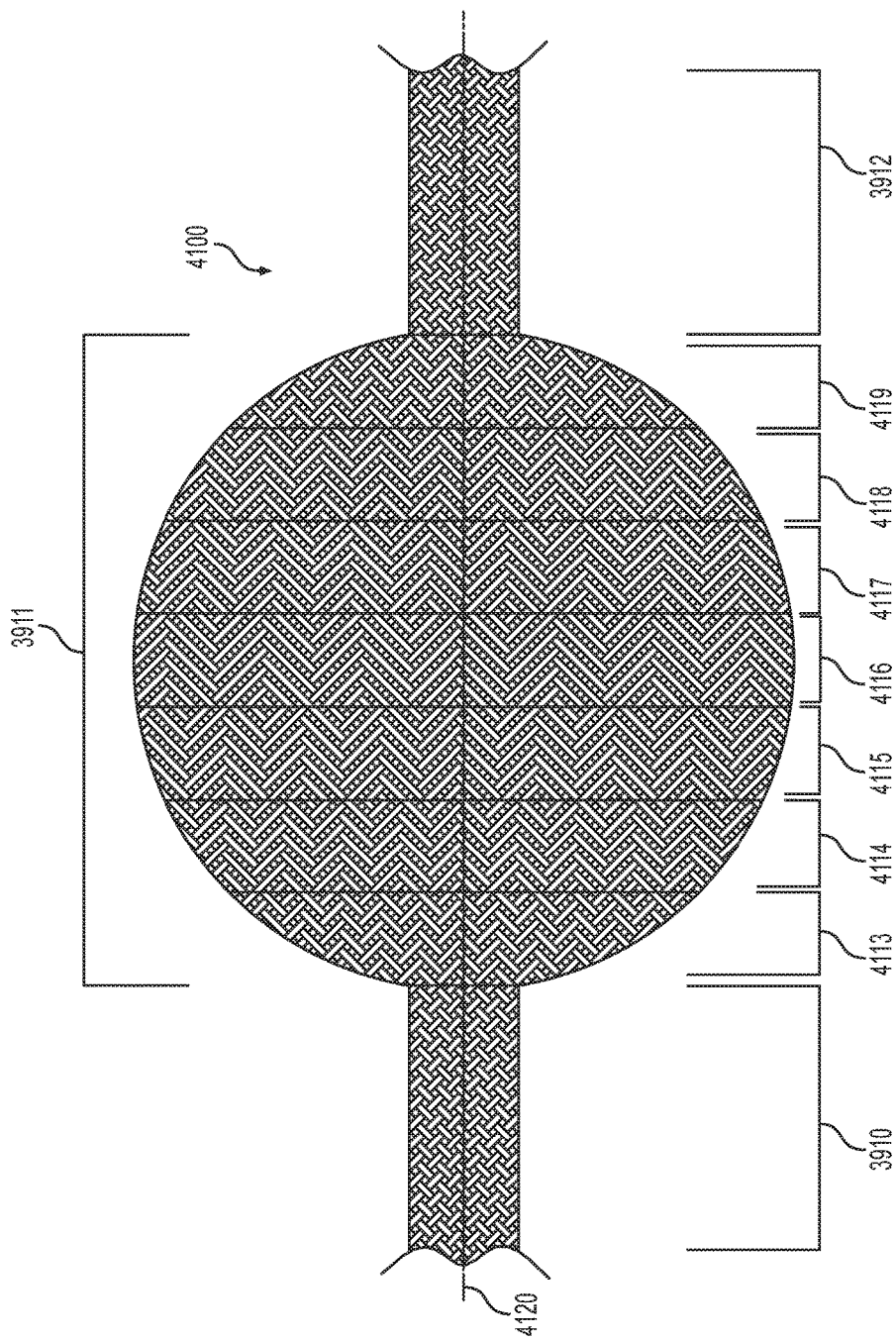
FIG. 41 is illustrative of the braided structure of FIGS. 39 and 40 which may comprise a longitudinally varying braid architecture.

FIG. 41 is additionally illustrative of the braided structure of FIGS. 39 and 40 wherein the braid architectures which may comprise each portion are additionally illustrated for examples of the braided structure of the present subject matter. As described herein, the first portion 3910 comprising the braided structure 4100 may be comprised of a 1×1 braid architecture such that when the desired length of the first portion 3910 may be formed, the second portion 3911 may be formed. As described herein, the second portion 3911 comprising the braided structure 4100 may comprise transitory braid architecture along the longitudinal axis 4120 of the braided structure. In examples of the present subject matter, the second portion may comprise seven sub-portions; a primary sub-portion 4113 which may be comprised of 2×2 braid architecture; a secondary sub-portion 4114 which may be comprised of a 3×3 braid architecture; a tertiary sub-portion 4115 which may be comprised of a 4×4 braid architecture; a quaternary sub-portion 4116 which may be comprised of a 5×5 braid architecture; a quinary sub-portion 4117 which may be comprised of a 4×4 braid architecture; a senary sub-portion 4118 which may be comprised of a 3×3 braid architecture; and a septenary sub-portion 4119 which may comprise a 2×2 braid architecture. Subsequent to the completion of the second portion 3911 comprising the braided structure of examples of the present subject matter, the third portion 3912 may be formed which may comprise a 1×1 braid architecture. Additional examples of the braided structure 4100 illustrated in FIG. 41 may comprise additional or fewer sub-portions comprising the second portion 3911 of the braided structure.

Figure 42:
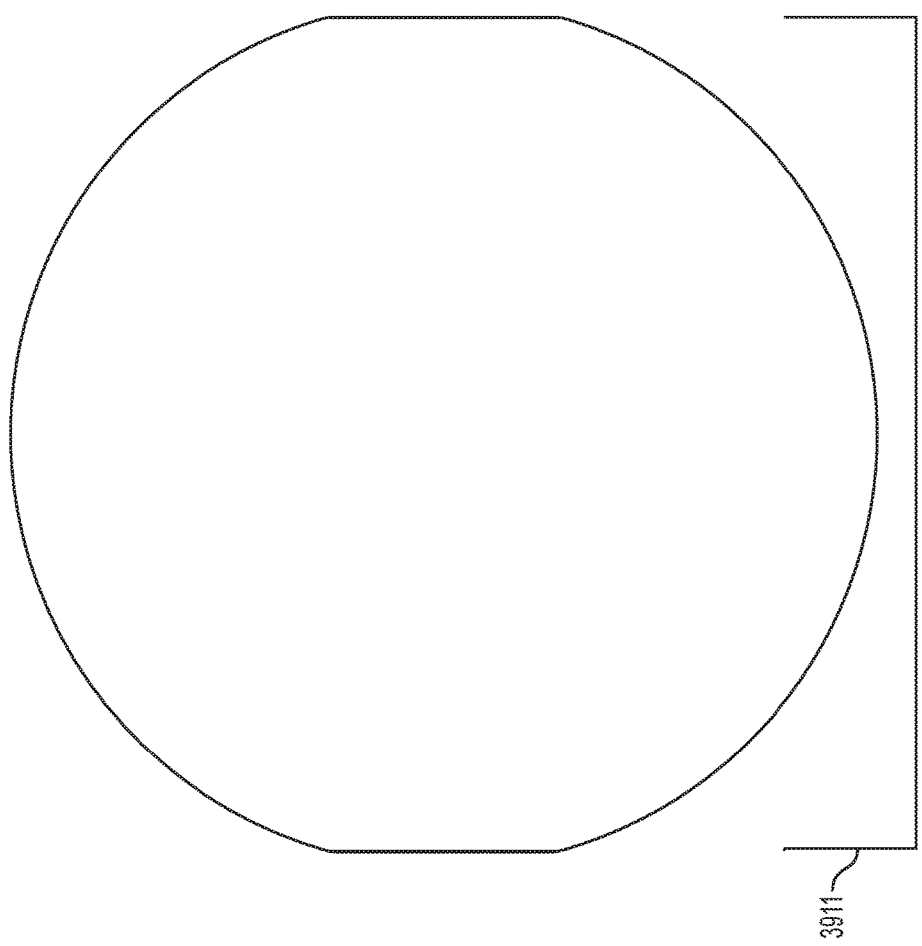
FIG. 42 is illustrative of the braided structure of FIGS. 39-41 in which portions of the braided structure may be inverted.
Figure 43:
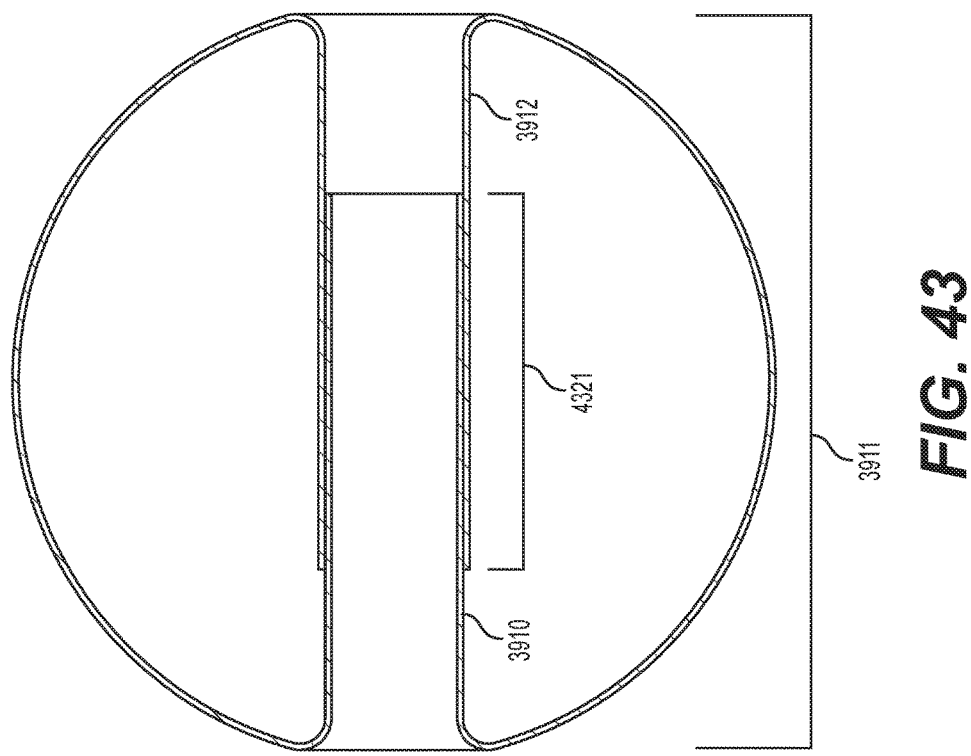
FIG. 43 is illustrative of a cross section of the braided structure of FIG. 42.

An additional example of the braided structure depicted in FIGS. 39-41 is illustrated in FIGS. 42 and 43 wherein the first portion 3910 and third portion 3912 may be inverted such that the first portion 3910 and third portion 3912 may be comprised within the interior region of the second portion 3911 and such that a portion of the third portion 3912 may circumferentially encompass a portion of the first portion 3910. The overlapping of the third portion 3912 over the first portion 3910 may result in the formation of overlap region 4321.

The examples of the braided structure illustrated in FIGS. 39-43 may comprise a first length which may comprise the length of portion 3911 wherein there may be a plurality of second lengths transverse to the first length, of which, in a rigidized form, one may be equal to the first length due to the spherical nature of the braided structure, and a plurality may be less than the first length comprising the braided structure.

While examples of the braided structure of longitudinally varying architecture have been described herein as designed for the formation of tubular restrictive layers comprising affixment features, in additional examples of the present subject matter, the braided structures of longitudinally varying architecture may additionally comprise tubular restrictive layers of structural components herein of alternate shapes which may comprise structural spacing components like that illustrated in FIGS. 2-5 which may not comprise affixment features. In an example, the braided structure illustrated in FIG. 39 may be formed without portions 3910 and 3912 such that the braided structure may only comprise portion 3911. In this example the ends of the braided structure may be sealed with endcaps, like the structural component illustrated in FIGS. 4 and 5.

While the braided structures comprising FIGS. 15-26, 28 and 29-43 have been described herein as comprised of various combinations of 1×1, 2×2, 3×3, 4×4 and 5×5 braid architectures it may be understood that these braided structures may additionally be comprised of a plurality of additional braid architectures including 6×6, 7×7, 8×8, 10×10 or other braid architectures and the corresponding transitions in between braid architectures. Additionally, each portion may comprise suitable braid architectures to form a braided structure which may promote the formation of the desired diameter for each portion of braided structure.

As described herein, portions of examples of the braided structure which may comprise the tubular restrictive layer of structural spacing components of the present subject matter may circumferentially encompass other portions comprising the braided structure such that an overlap region may be formed like that illustrated in FIG. 18. The overlapping portions comprising the overlap region may be fused, sewn, riveted or otherwise affixed such that the overlapped portions may not separate when the structural spacing component may be comprised in a rigidized state and which may not be separated during deployment.

In additional examples of the present subject matter, following inversion of the braided structure, an additional sleeve of material may be affixed to the tubular restrictive layer such that the sleeve may overlap two portions of the braided structure wherein the tow material may not be continuous. This sleeve of material may comprise a textile component or may comprise a plastic, rubber or metal sleeve. This sleeve may be employed to aid in the affixment of two portions of the braided structure wherein the tows may not be continuous to provide additional support such that the portions of non-continuous tows may not separate upon rigidization of the tubular restrictive layer of examples of the present subject matter.

Further examples of the structural spacing component of the present subject matter may comprise ports which may allow for the introduction of a rigidizing media into the interior region of the structural spacing component such that the structural spacing component may be converted from a pre-rigidized state to a rigidized state for deployment. Further, the port may allow for the expulsion of the rigidizing media from the interior region of the tubular restrictive layer for the conversion of the structural member from a rigidized to a pre-rigidized state.

Figure 44:
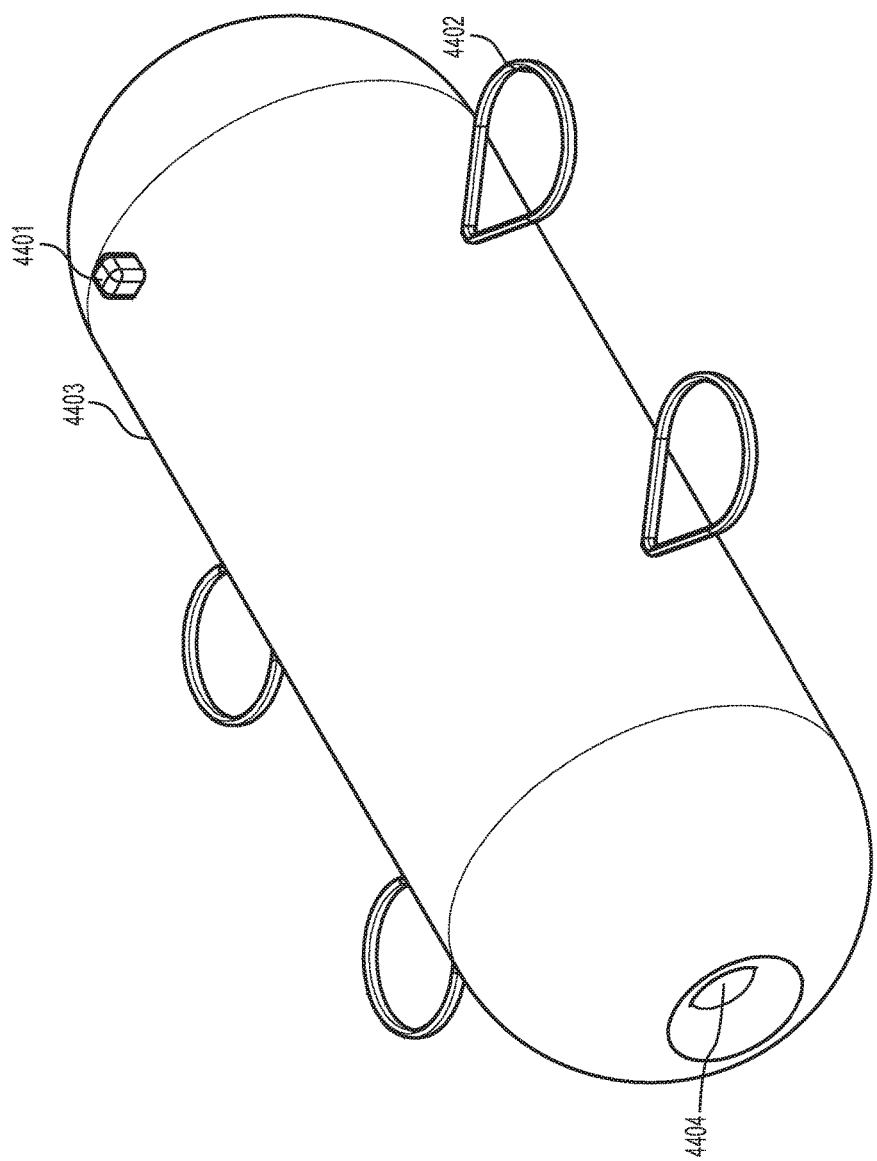
FIG. 44 is illustrative of a structural spacing component of examples comprised of affixment devices, an affixment feature and a port.
Figure 45:
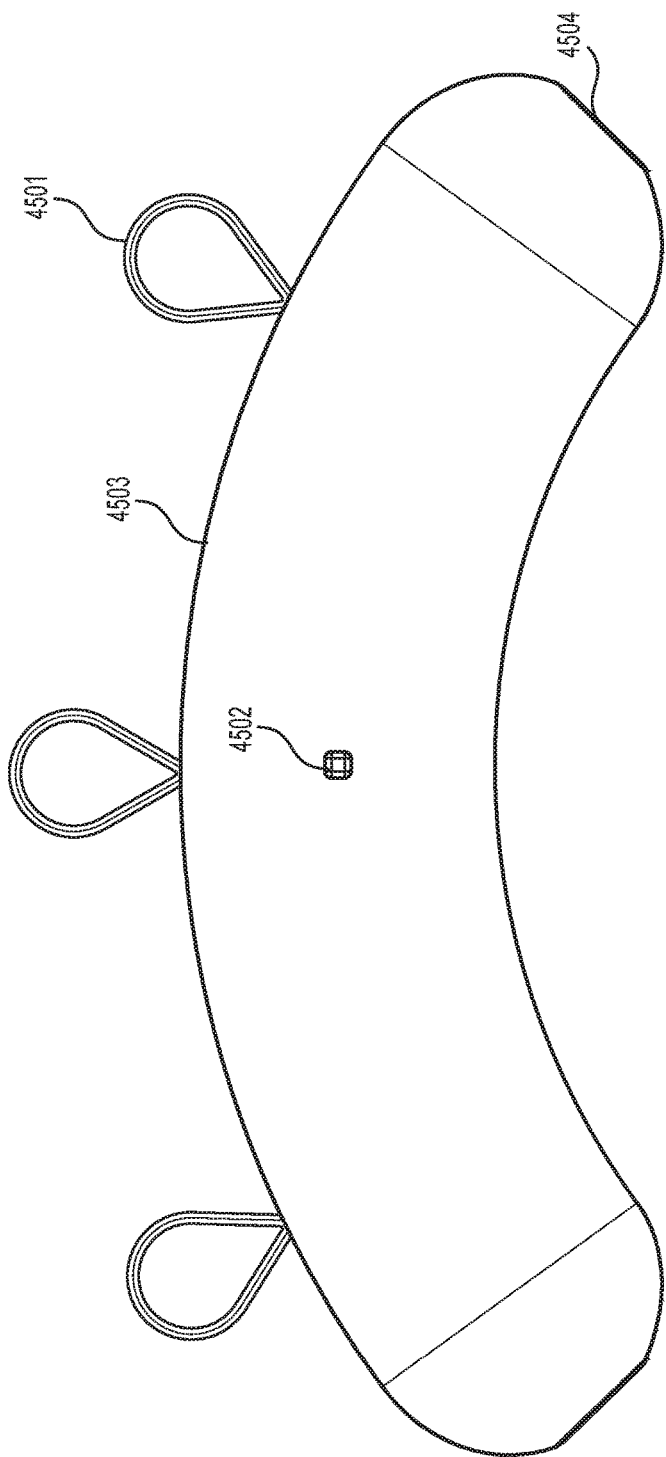
FIG. 45 is illustrative of a structural spacing component of examples comprised of affixment devices, a port and an affixment feature.
Figure 46:
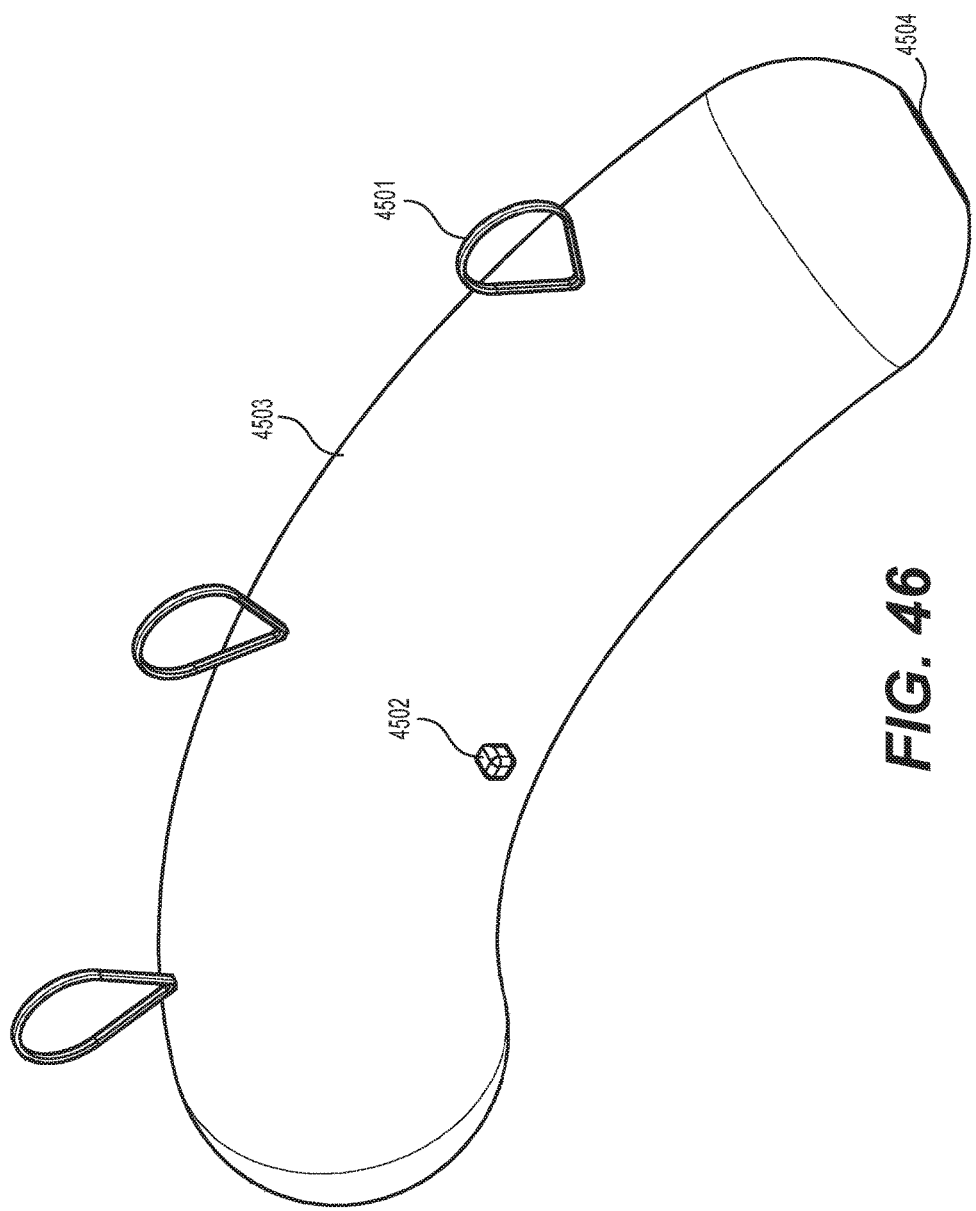
FIG. 46 is illustrative of an isometric view of FIG. 45.

Additionally, examples of the structural spacing component of the present subject matter may comprise affixment devices which may be affixed to the tubular restrictive layer of the structural spacing component and which may be comprised on the outer surface of the structural spacing component. Affixment devices of the present subject matter may comprise hooks, loops, ties or other affixment methods. FIG. 44 is illustrative of an example of the present subject matter comprising an affixment feature 4404, loops 4402 affixed to the outer surface of the tubular restrictive layer 4403 and a port 4401 through which a rigidizing media may be introduced and expelled from the interior region of the tubular restrictive layer 4403. FIGS. 45 and 46 are illustrative of additional examples of the structural spacing component of the present subject matter comprised of a curvilinear tubular restrictive layer 4503, a port 4502 through which a rigidizing media may be introduced to and expelled from the interior region of the tubular restrictive layer 4503, affixment feature 4504 and loops 4501.

Figure 47A:
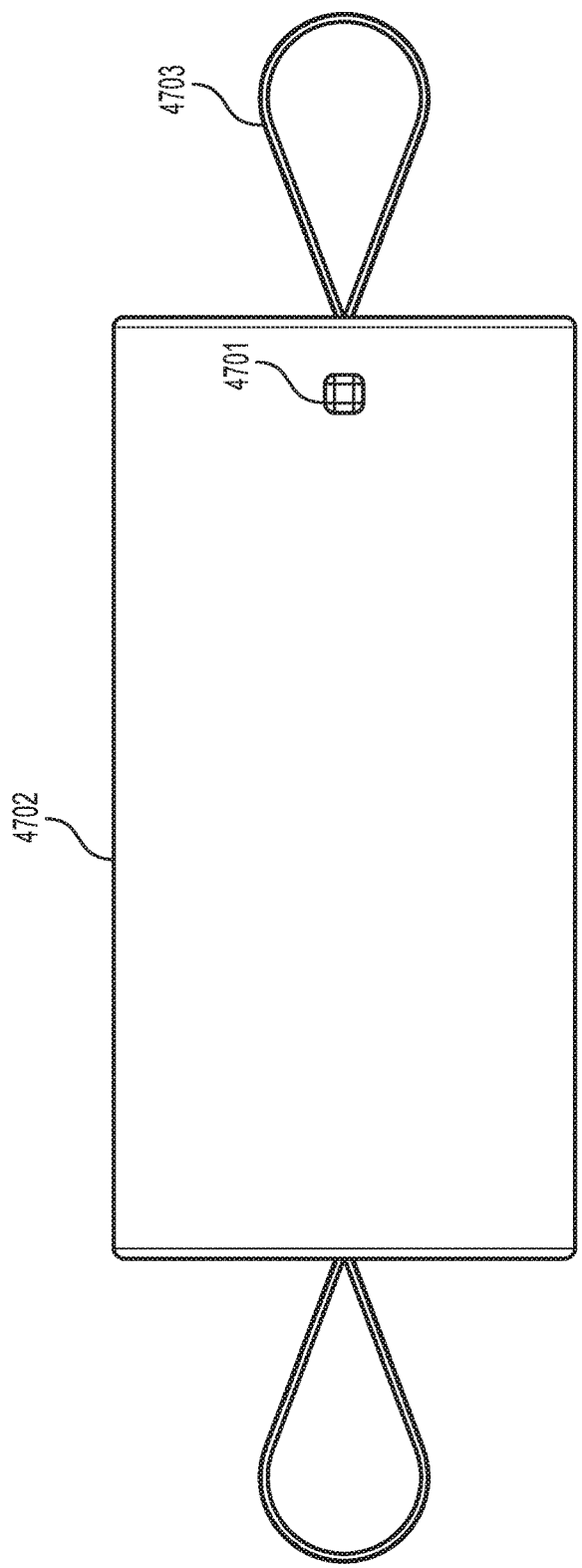
FIG. 47A is illustrative of an example of a structural spacing component comprising a port and affixment features.
Figure 47B:
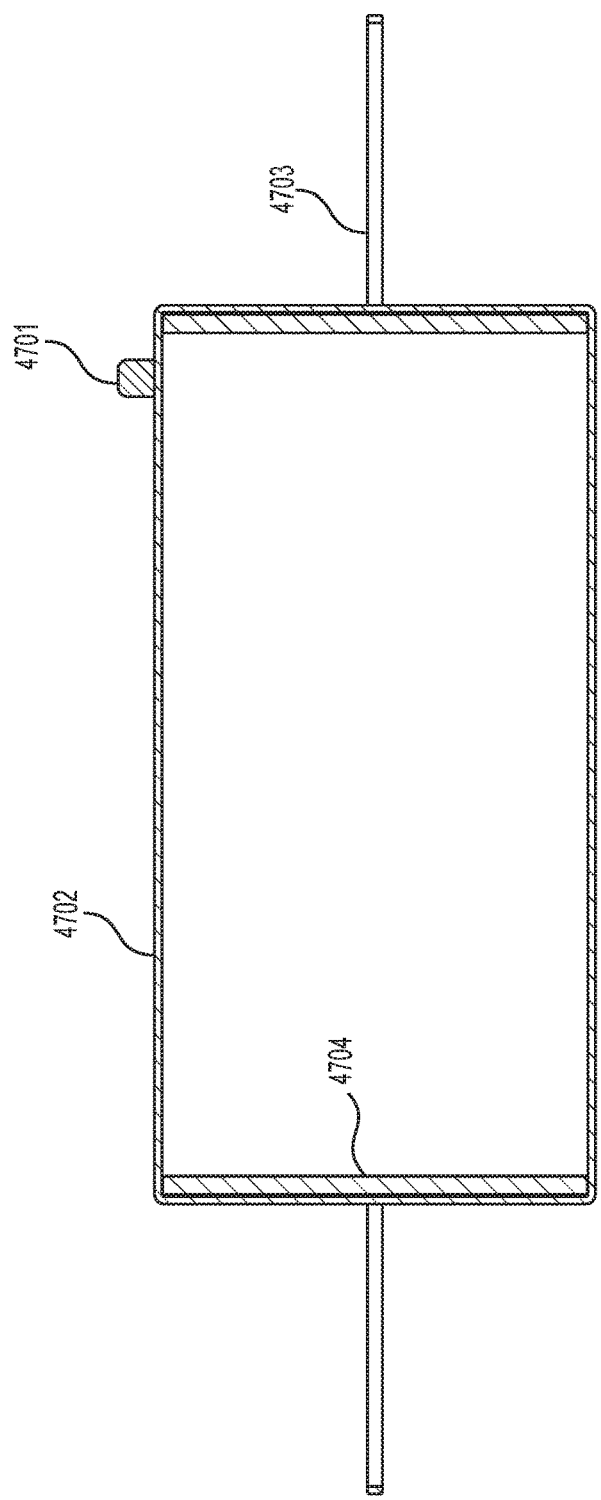
FIG. 47B is illustrative of a cross section of an example of a structural spacing component comprising a port and affixment features illustrated in FIG. 47A.
Figure 48A:
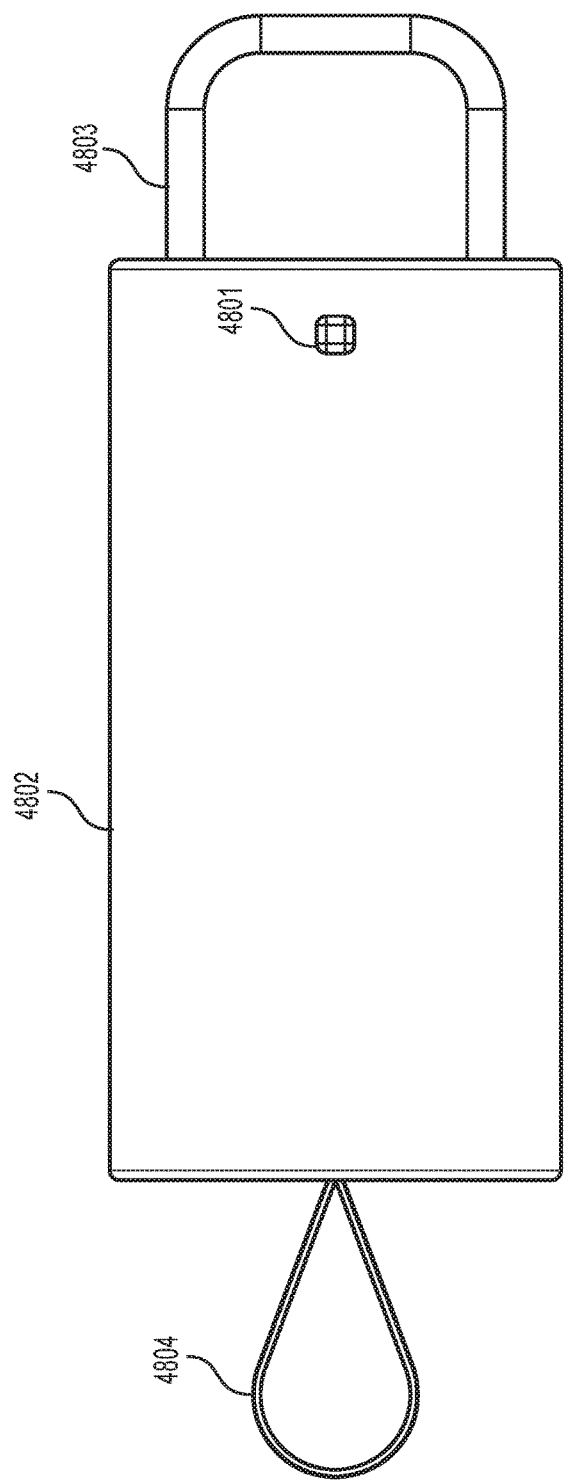
FIG. 48A is illustrative of an example of the structural spacing component of FIGS. 47A and 47B wherein one of the affixment features may be replaced with a handle.
Figure 48B:
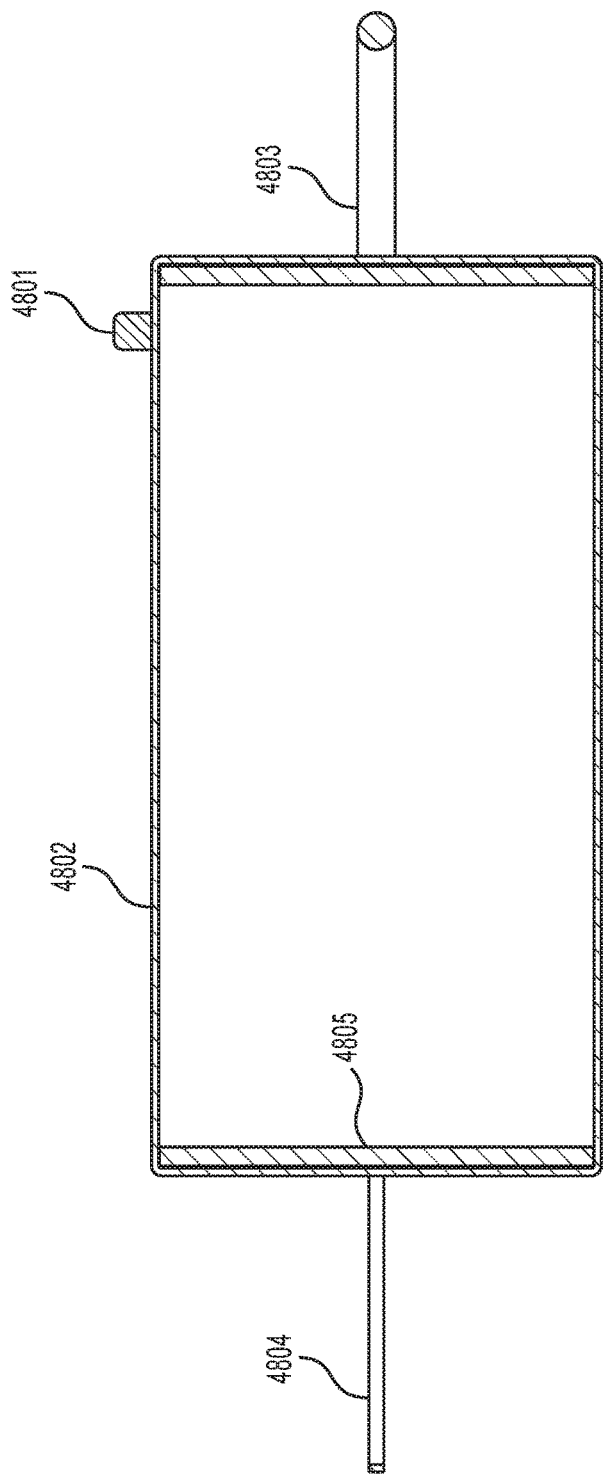
FIG. 48B is illustrative of a cross section of the example illustrated in FIG. 48A.

FIGS. 47A-47B and 48A-48B are additionally illustrative of structural spacing components of the present subject matter which may comprise affixment devices. FIGS. 47A and 47B are illustrative of an example of a structural spacing component of the present subject matter comprised of a tubular restrictive layer 4702, a port 4701 and affixment devices which, as illustrated, may comprise loops 4703. Additionally, as illustrated in FIG. 47B, the structural spacing component may comprise endcaps 4704. FIGS. 48A and 48B are illustrative of an additional example of the structural spacing component of FIGS. 47A and 47B wherein one of the loops comprising the structural spacing component of FIGS. 47A and 47B may be replaced with a handle 4803. In summary, FIGS. 48A and 48B are illustrative of a tubular restrictive layer 4802 comprising affixment devices 4803 and 4804 and which may further comprise a port 4801. Additionally, the structural spacing component illustrated in FIGS. 48A and 48B may comprise endcaps 4805.

In reference to FIGS. 48A and 48B, as described herein, the structural spacing component of examples of the present subject matter may be comprised between a first article and a second article wherein the first article may comprise a boat and the second article may comprise an individual standing a certain distance away from the boat. Structural spacing components of examples of the present subject manner may comprise affixment devices which may be gripped by an individual and which may be used to guide the boat to a constraint. These affixment devices may comprise handles, ropes, loops grips or other features which may be grasped by an individual.

The structural spacing component of examples of the present subject matter may be stored in either a rigidized or pre-rigidized state when not deployed for use. In examples in which the structural spacing component may be stored in a pre-rigidized state, the structural spacing component may be folded, rolled, or otherwise condensed to minimize the size of the structural spacing component for storage.

The storage method and location of a structural spacing component of the present subject matter may be dependent on the intended application of the structural spacing component of the present subject matter. In an example of the structural spacing component herein in which the structural spacing component may have utility for boating applications, the structural spacing component may be stored on a boat. Additionally, in examples of the present subject matter, a portion of the structural spacing component may be affixed to the boat such that the structural spacing component may be permanently attached to the boat.

Figure 49:
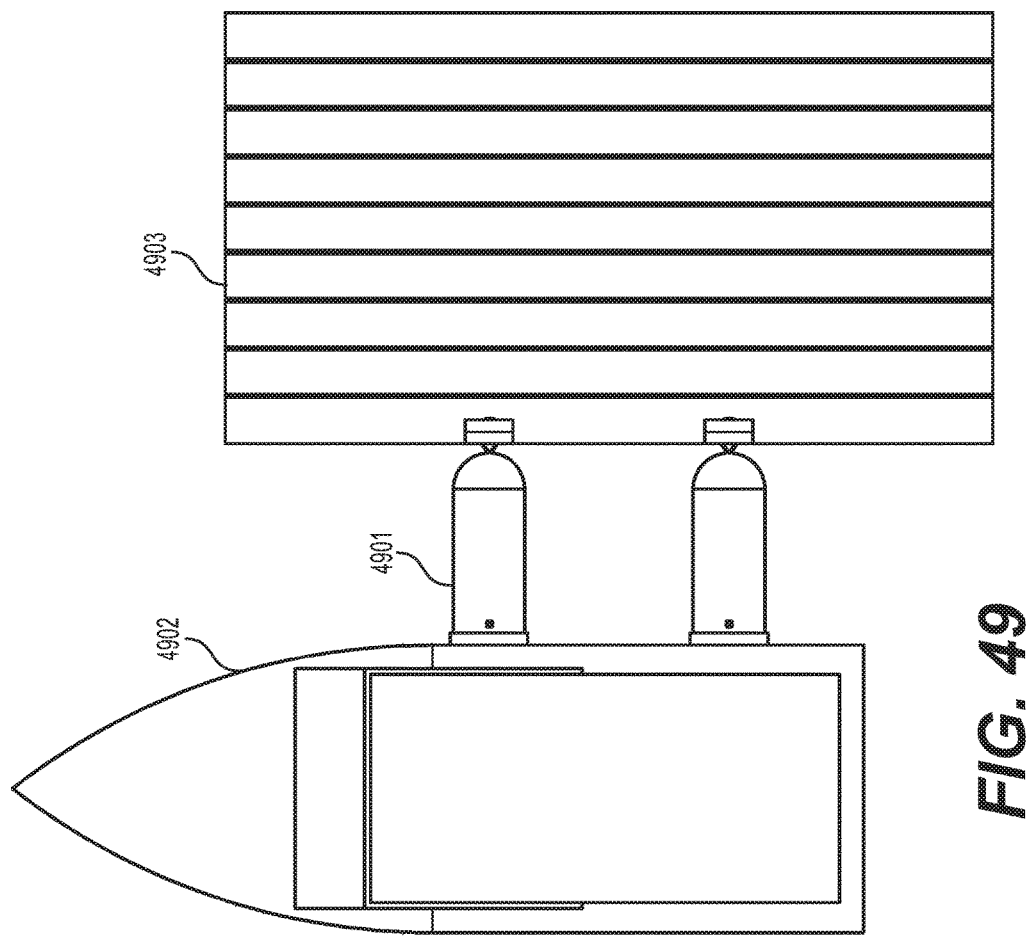
FIG. 49 is illustrative of a plurality of structural spacing components of examples herein permanently affixed to a boat wherein the boat may be affixed to a dock.

A structural spacing component permanently attached to a boat may be stored within an interior cavity of the boat, may be condensed and stored on the boat floor, or may be stored in a plurality of additional manners. In an example in which the structural spacing component may be stored in the cavity of a boat, upon deployment, the structural spacing component may extend from the side of the boat towards a constraint such that the un-affixed end of the structural spacing component may be affixed to a constraint. A structural spacing component 4901 permanently affixed to a boat 4902 is illustrated in FIG. 49. FIG. 49 is additionally illustrative of a structural spacing component 4901 of examples comprised between a boat 4902 and a dock 4903.

The structural spacing component of the present subject matter may be permanently affixed to other articles such that upon deployment, the structural spacing component may be affixed to a second article, and may not require additional affixment to the first article.

Examples of the structural spacing component herein may comprise features which may aid in the deployment and the condensing of the structural spacing component for storage. Examples of the structural spacing component herein may comprise self-rolling or self-coiling features such that in a pre-rigidized state the structural member may comprise a condensed coiled or spiral form which may be configured for storage. Consequently, in steps during deployment, a rigidizing media may be introduced into the interior region of the structural spacing component. The pressure the rigidizing media may exert within the interior region of the structural spacing component may overcome the inert state of the coil such that the structural spacing component may comprise the shape of the tubular restrictive layer upon deployment.

Figure 50:
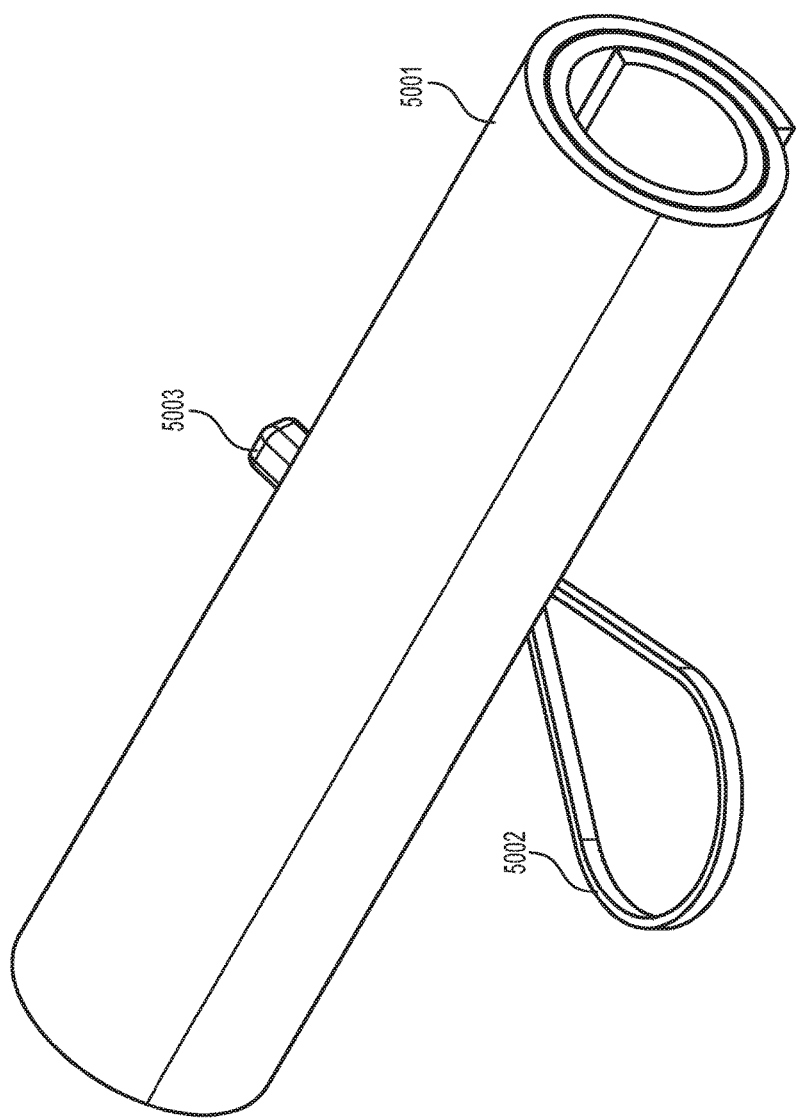
FIG. 50 is illustrative of a pre-rigidized structural spacing component of examples wherein the structural spacing component may comprise a self-coiling device.
Figure 51:
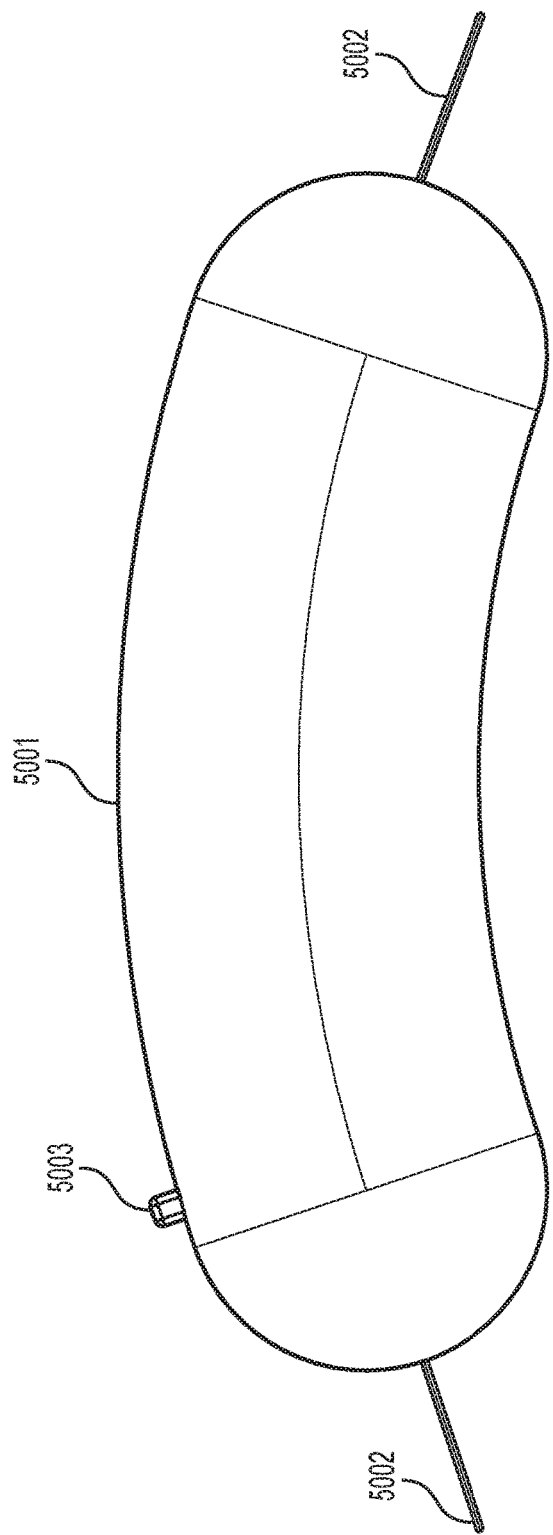
FIG. 51 is illustrative of the rigidized state of the structural spacing component illustrated in FIG. 50.

In an example illustrated in FIGS. 50 and 51, the tubular restrictive layer comprising the structural spacing component may comprise a curvilinear shape and may comprise a self-coiling feature. In a pre-rigidized state, illustrated in FIG. 50 the structural spacing component may be configured for storage in a coiled form. The coiled structural spacing component illustrated in FIG. 50 comprises affixment features 5002, a port 5003 and a tubular restrictive layer 5001. Upon deployment of the structural spacing component as illustrated in FIG. 51, the pressure the rigidizing media may exert within the interior region of the tubular restrictive layer may result in the un-coiling of the structural spacing component from the pre-rigidized state to a rigidized state wherein the structural spacing component may be curvilinear in shape. In an additional example of the structural spacing component, the tubular restrictive layer comprising the structural spacing component may be generally spherical in shape and may comprise a self-coiling feature. Therefore in a pre-rigidized state, the circular tubular restrictive layer may be coiled and in steps during deployment, the structural spacing component may un-coil such that the tubular restrictive layer may be spherical in shape.

The self-coiling feature of examples of the present subject matter may comprise thin metal wires, sheets, plastic coils, composite coils or bi-stable materials.

A bi-stable material may be defined as a material which may be comprised in one of two stable mechanical states, or in two states in which the material may comprise a minimal amount of potential energy. Conventional materials, such as in an example, a piece of sheet metal, may only comprise one mechanical state or may only be in equilibrium in one state. In a continuing example of a piece of sheet metal, if the sheet metal were to be flexed, but not bent, the sheet metal in a flexed state may have a large amount of potential energy and when released may seek an equilibrium state. Because the sheet metal may be at an equilibrium state when flat, the sheet metal may seek to return to the flat equilibrium state and may not seek another state.

In an example, a bi-stable material may comprise a "snap-bracelet" wherein the bi-stable material may comprise a thin sheet of metal or plastic which may be configured to form a bi-stable spring which may reach equilibrium in one of two states but which may not be retained in a state or mechanical position in-between without additional components to hold the bracelet within an in-between state. The snap bracelet may comprise a first state in which the bi-stable spring may be in equilibrium wherein the snap bracelet may be coiled. Additionally, the snap bracelet may comprise a second state in which the bi-stable spring may be in equilibrium wherein the snap bracelet may be flat. However, the snap bracelet may not reach an equilibrium state in-between the coiled and flat states. Therefore, when a snap bracelet in the first state may be flexed, the bi-stable spring comprising the snap bracelet may seek to reach equilibrium in either the first or second state. Further a snap bracelet in the second state when flexed may seek equilibrium in either the first or second state.

Structural spacing components of examples of the present subject matter may comprise bi-stable materials which, as described herein, may be configured to aid in the deployment and the condensing of structural members herein for storage. Bi-stable materials as described herein may comprise plastic, metal, composites, braided fabrics, woven fabrics or other materials.

Examples of the structural spacing component described herein may additionally comprise features which may allow for alterations in the rigidized, or deployed, length of the structural spacing component. These features may comprise clamps, ratchets, or other devices which may be affixed to the tubular restrictive layer comprising the structural spacing component to alter the deployed length of the structural spacing component.

In reference to the structural spacing component illustrated FIG. 1 which comprises clamps 108 affixed to the ends of the tubular shaped article 107 comprising the tubular restrictive layer, the deployed length of the structural spacing component may be altered by rolling additional lengths of the tubular shaped article into the clamps 108 affixed to the tubular restrictive layer.

Figure 52:
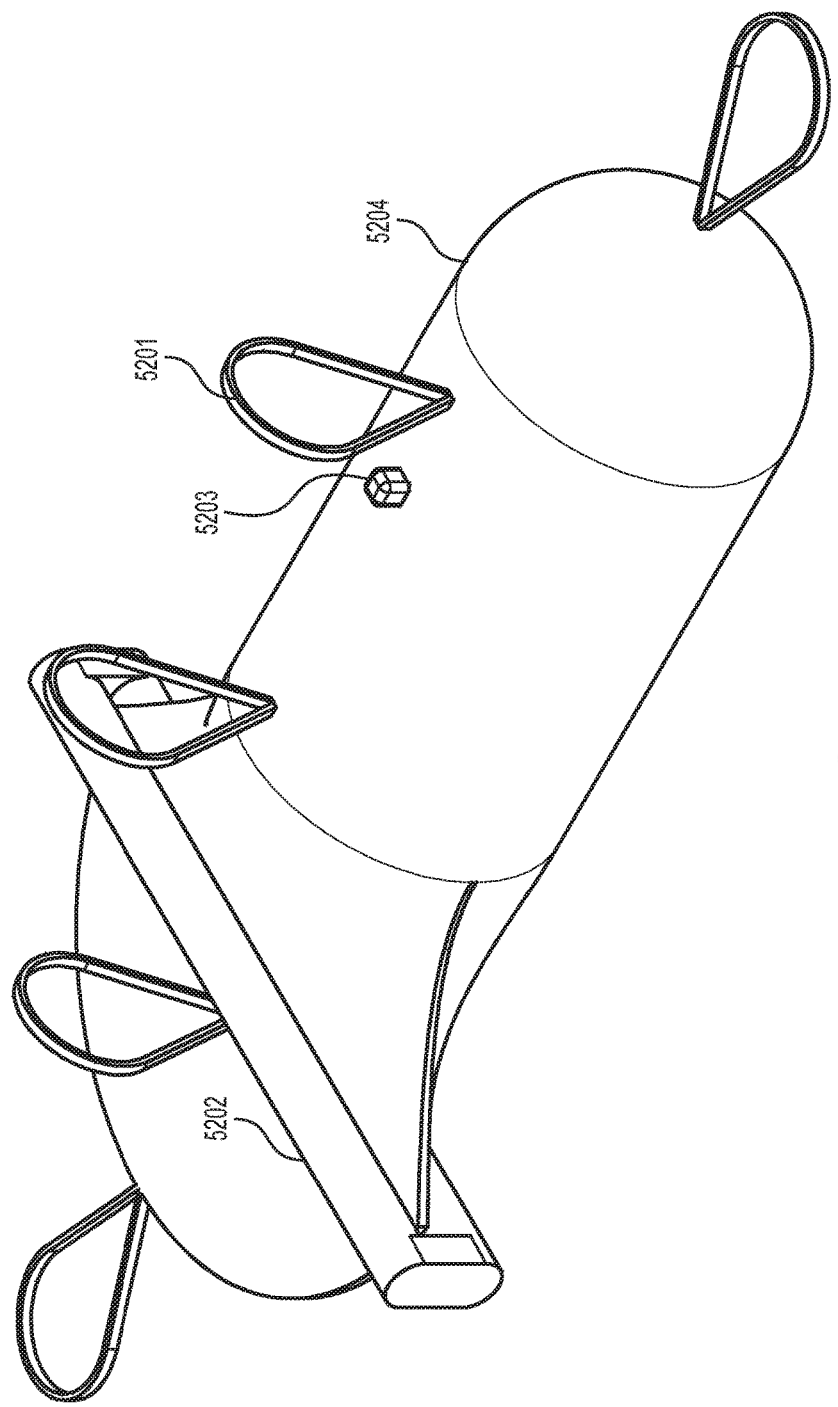
FIG. 52 is illustrative of a structural spacing component of examples comprising a clamp which may affect the deployed length of the tubular restrictive layer.

FIG. 52 additionally illustrates a structural spacing component of examples of the present subject matter wherein the deployed length of the tubular restrictive layer may be altered. As illustrated in FIG. 52, clamp 5202 is configured to affect the deployed length, or the first length comprising the structural spacing component, of the tubular restrictive layer 5204 such that the clamp 5202 may be affixed to the tubular restrictive layer 5204 and such that the deployable length of the tubular restrictive layer 5204 may be less than that of the whole length of the tubular restrictive layer 5204. In an example, clamps may be employed such that only a portion of the first length may be configured to be rigidized. The structural spacing component of FIG. 52 additionally illustrates a plurality of affixment devices 5201 as well as a port 5203.

As described herein, the structural spacing component of the present subject matter may be affixed between a plurality of articles, may be used to constrain the motion of a plurality of articles relative to one another and may be used to create a certain amount of space between the first article and the second article. Additionally, the structural spacing component of examples may allow for some angular displacement between the first article and the second article and may further comprise sufficient flexural stiffness to resist buckling or bending.

Figure 53:
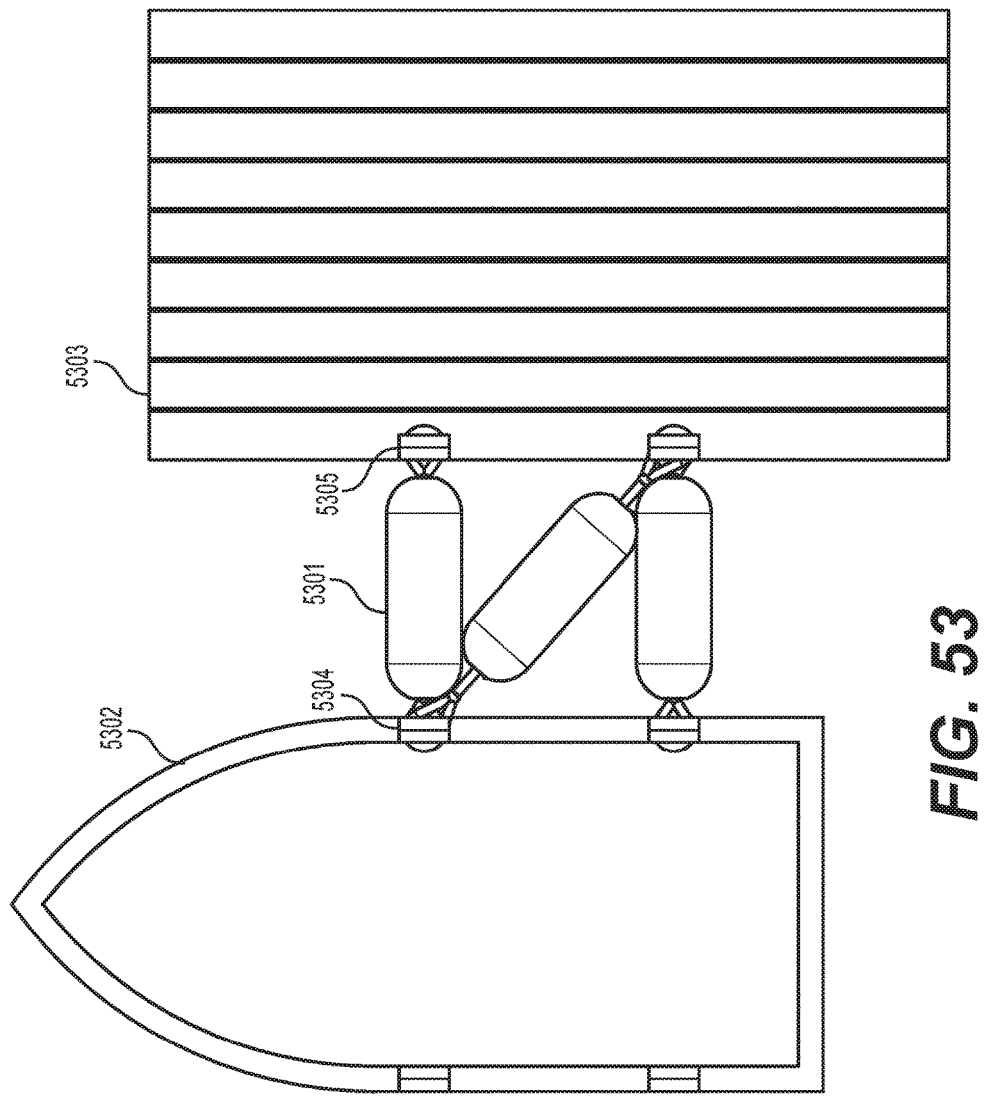
FIG. 53 is illustrative of a plurality of structural spacing components of examples affixed between a boat and a dock.
Figure 54:
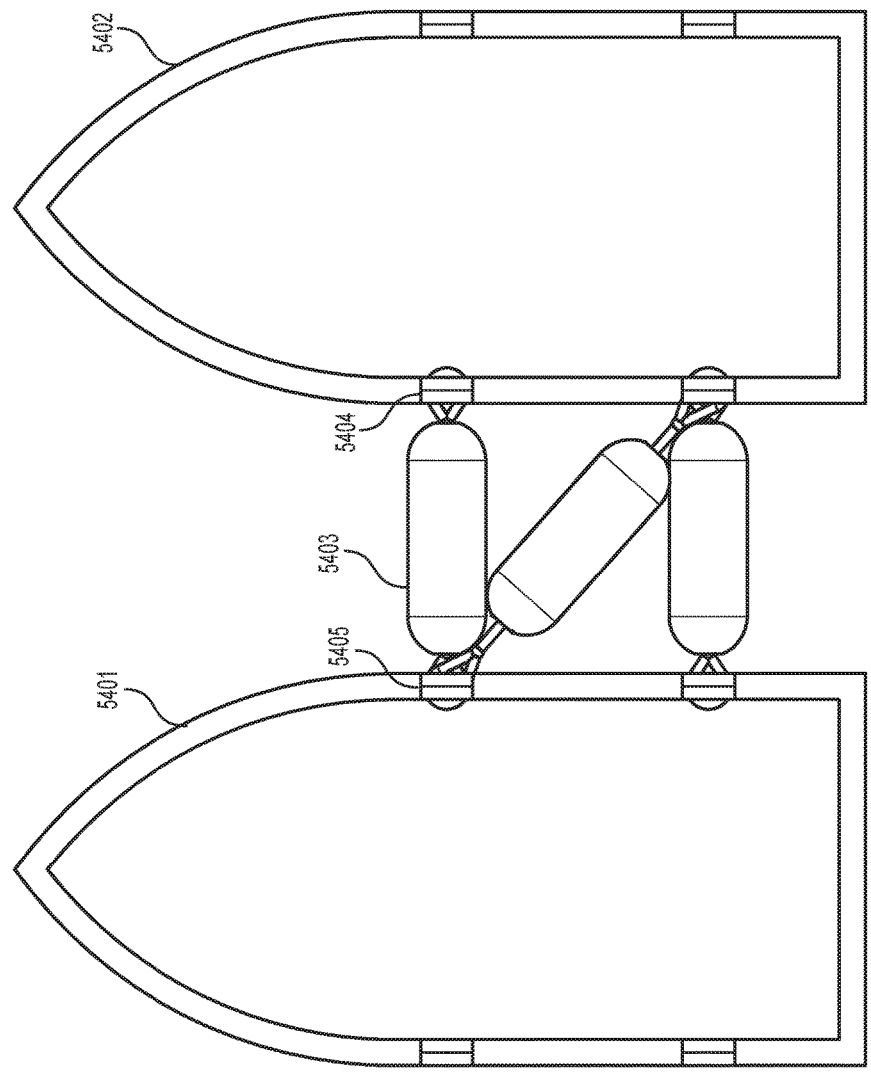
FIG. 54 is illustrative of a plurality of structural spacing components of examples affixed between two boats.
Figure 55:
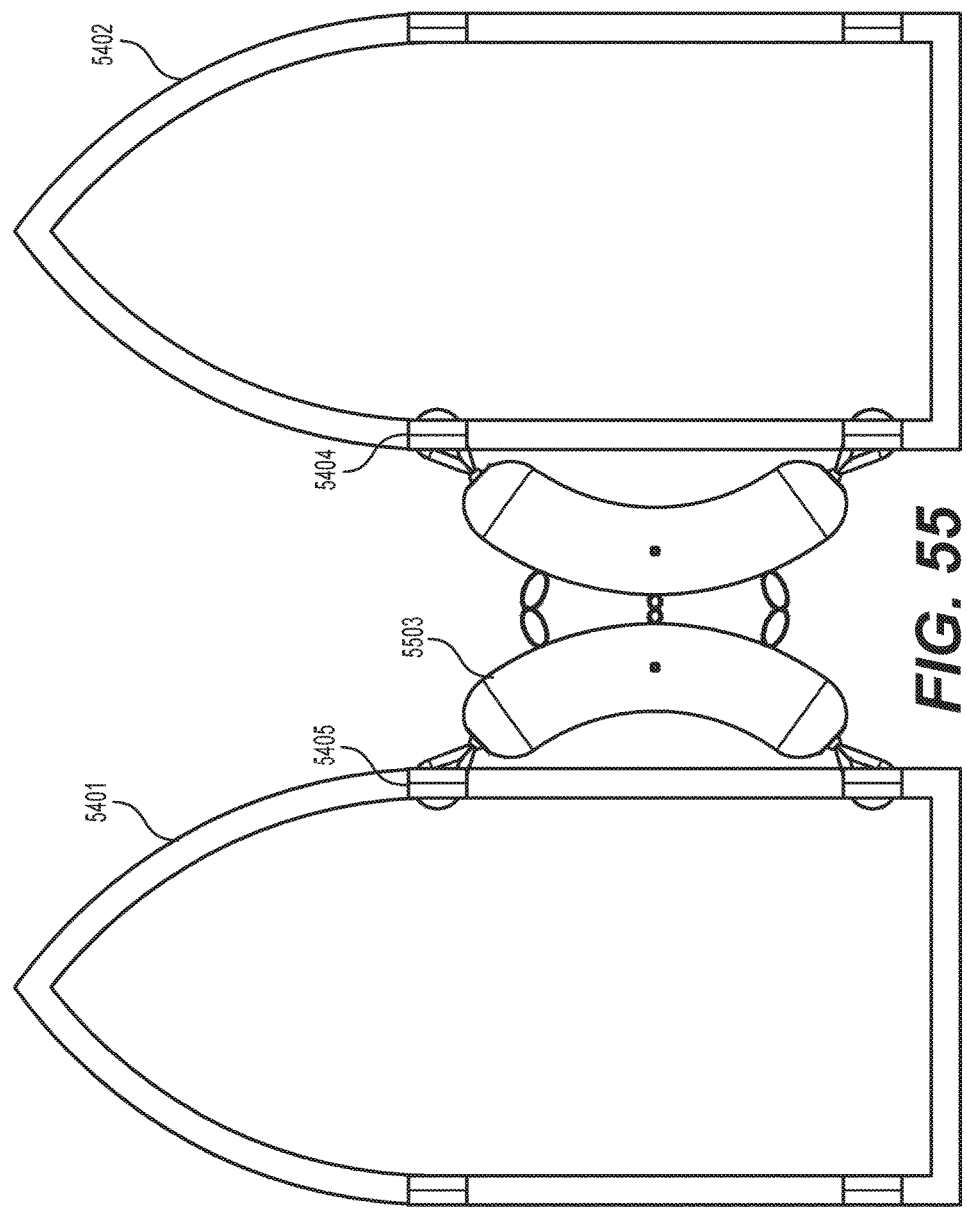
FIG. 55 is additionally illustrative of a plurality of structural spacing components affixed between two boats.

As described herein, the structural spacing component of examples may be comprised between a first article and a second article. In examples of the present subject matter, the first article may comprise a boat and the second article may comprise a constraint. FIGS. 53-55 are illustrative of examples of structural spacing components herein as deployed; or as defined in the specification herein, comprised in a partially rigidized or rigidized state and affixed between a plurality of articles.

FIG. 53 is illustrative of a deployed structural spacing component 5301 affixed between a first article which comprises a boat 5302 and a second article which comprises a dock 5303. The structural spacing component 5301 deployed in FIG. 53 may be affixed to cleats 5304 comprising the boat 5302, or other suitable affixment locations in additional examples of the present subject matter, and may additionally be affixed to the dock at affixment location 5305. One or more structural spacing components may be deployed to affix a plurality of articles to one another. As illustrated in FIG. 53, three structural spacing components 5301 may be deployed to reduce the effects of scissoring which may occur when only one or two structural spacing components 5301 may be deployed in examples herein.

FIG. 54 is additionally illustrative of a structural spacing component 5403 as deployed between a first article which comprises a first boat 5401 and a second article which comprises a second boat 5402. The structural spacing component illustrated in FIG. 54 may be affixed to cleats 5405, or other affixment locations comprising the first boat 5401 and cleats 5404, or other affixment locations comprising the second boat. While in the examples illustrated in FIGS. 53-54, the structural spacing components may comprise affixment features with a rope or other affixment device passing through them, in other examples, these may comprise affixment features and endcaps.

FIG. 55 is illustrative of the first boat 5401 and the second boat 5402 of FIG. 54 in which an additional example of a structural spacing component 5503 comprising a curvilinear shape is affixed between the first boat 5401 and the second boat 5402. In the example illustrated in FIG. 55 a first structural spacing component 5503 may be affixed to the cleats 5405, or other affixment locations, of the first boat 5401 and may be affixed to a second structural spacing component 5503 which may be affixed to the cleats 5404, or other affixment locations, of the second boat 5402. Therefore, in examples of the structural spacing component herein, one of the pluralities of articles to which the structural member may be affixed may comprise an additional structural spacing component. Subsequently, unlike FIG. 54, in which the structural spacing components 5403 may be affixed between a first and second article which may comprise a first boat 5401 and second 5402 boat, the structural article 5503 illustrated in FIG. 55 may be comprised between a first article and a second article in which the first article may comprise a boat, 5401 or 5402, and the second article may comprise an additional structural spacing component 5503.

As described in examples herein, the articles between which the structural spacing component may be affixed may comprise stationary articles. In additional examples, like that illustrated in FIG. 56, one or more of the articles to which the stationary article may be affixed may comprise non-stationary articles.

Figure 56:
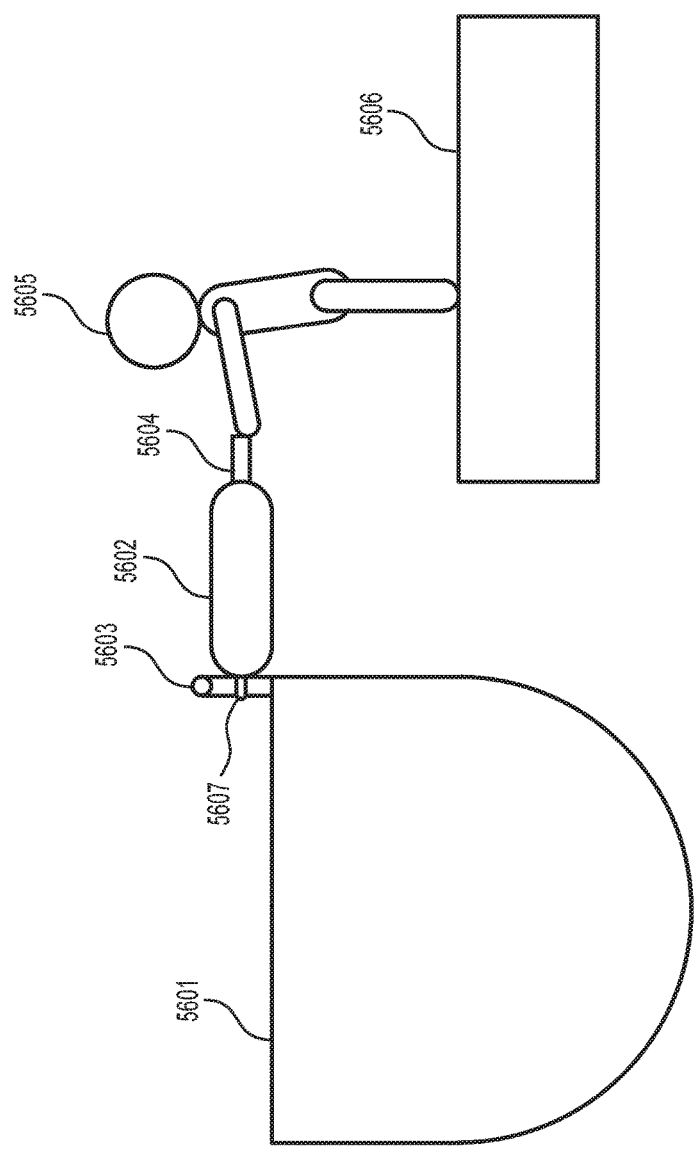
FIG. 56 is illustrative of a structural spacing component affixed between a boat and an individual.

FIG. 56 is illustrative of a structural spacing component 5602 comprised between a first article comprising a boat 5601 and a second article comprising an individual 5605. The structural spacing component 5602 may comprise a first affixment device 5607 which may be affixed to the cleat 5603 of the boat 5601 and a second affixment device 5604 which may be held, or gripped, by the individual 5605. The individual 5605 illustrated in FIG. 56 may be standing on a dock 5606 or a plurality of different locations including an outcropping. As described in examples herein, an individual, or a non-stationary article, may guide the boat, or second article, to a docking location for re-fueling or other purposes. Subsequently, the first article to which a structural spacing component of examples herein may be affixed may be generally stationary while the second article may be non-stationary.

As described herein, a plurality of structural spacing components of examples of the present subject matter may be affixed to one another such that one structural spacing component may be affixed between a plurality of additional structural spacing components. Subsequently, the structural spacing components in examples may be utilized for the creation of assemblies of structural spacing components which may comprise rafts in examples of the present subject matter.

Figure 57:
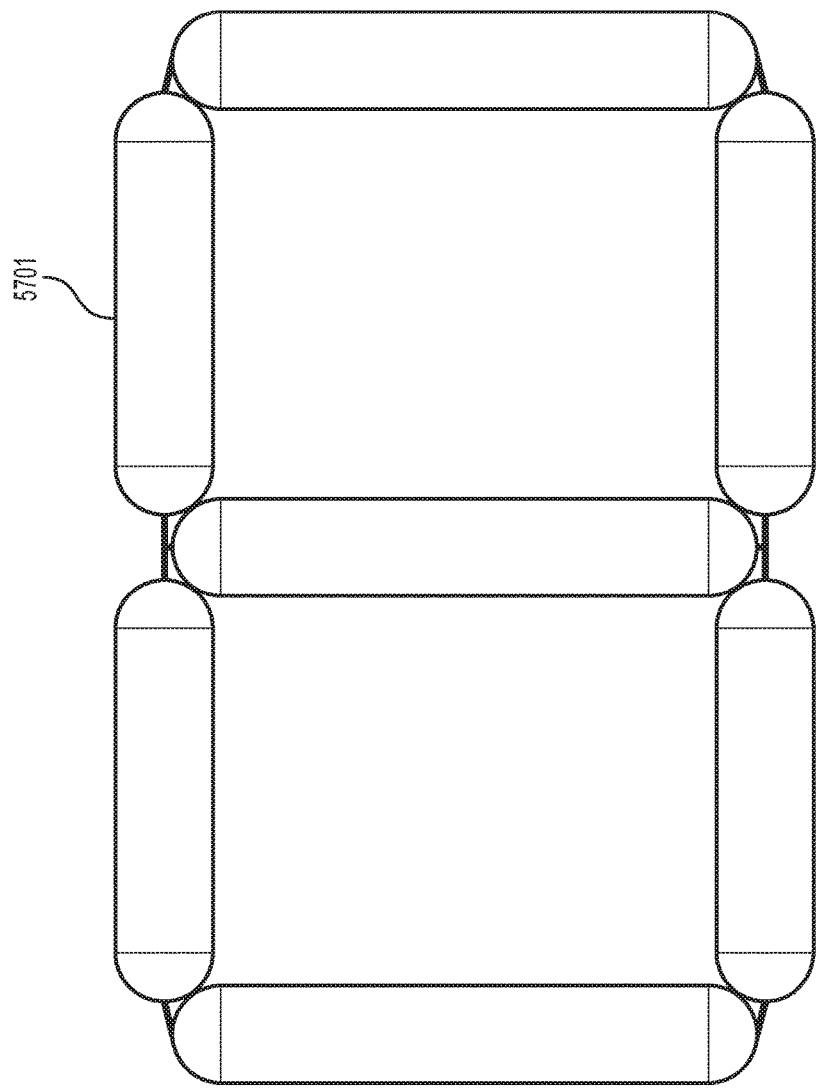
FIG. 57 is illustrative of a plurality of structural spacing components affixed to one another.

FIG. 57 is illustrative of an assembly of structural spacing components 5701 of examples herein in which a plurality of structural spacing components are affixed to one another. A raft like that illustrated in FIG. 57 may have particular utility for recreational or rescue applications. In an example in which the raft illustrated in FIG. 57 may have particular utility for recreational applications; a plurality of structural members of examples herein may additionally be affixed with decking or other surfaces for the creation of floating decks.

In an additional example, a raft like that illustrated in FIG. 57 may have particular utility for rescue, or emergency, applications. In an example in which a water vehicle may be disabled, such as a jet ski, a pre-rigidized assembly of structural spacing components may be drawn underneath of the disabled water vehicle. A rigidizing media may then be introduced to each of the structural members such that all structural members may be rigidized and comprised within a deployed state. The disabled water vehicle may then be comprised on top of the assembly of structural spacing components such that the disabled vehicle may be lifted out of the water. The assembly of structural spacing components beneath the disabled water vehicle may then be guided to a desired location. This same methodology may be applied in drowning or injury situations.

Figure 58:
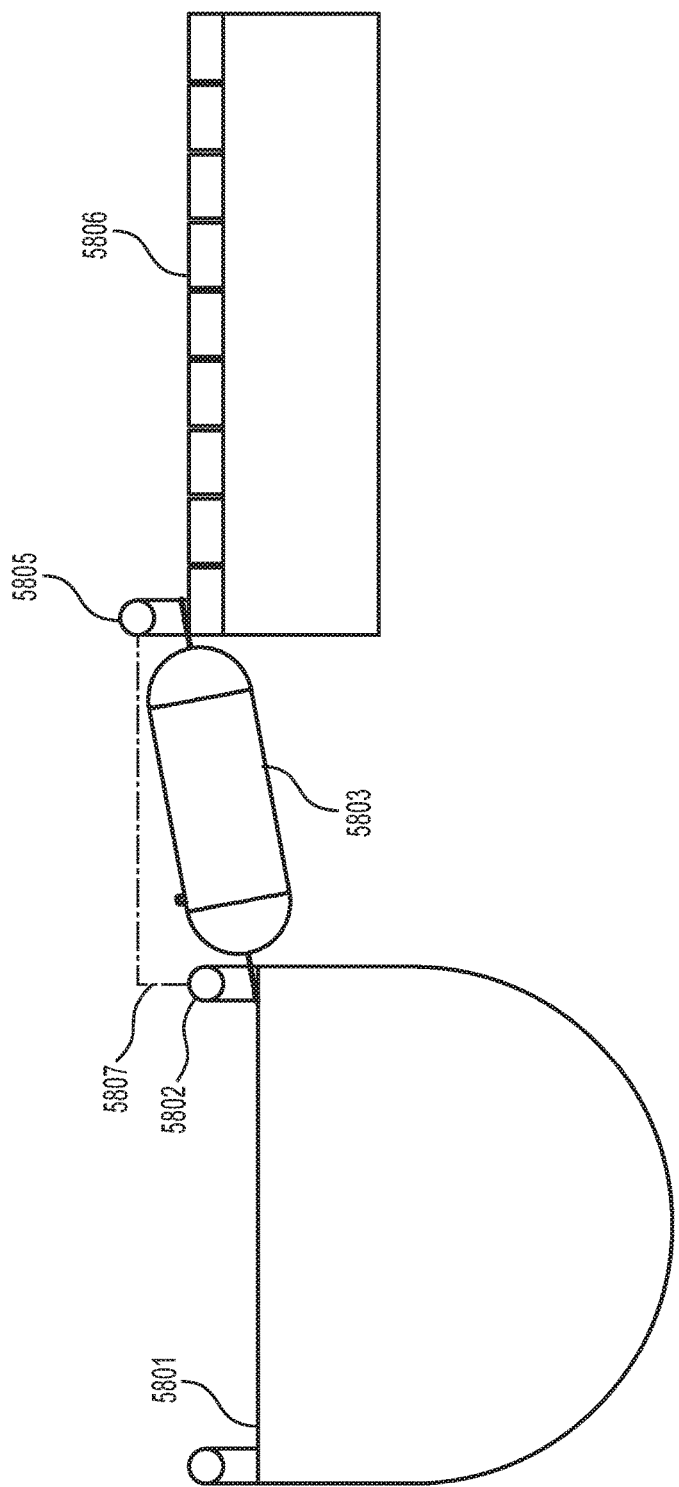
FIG. 58 is illustrative of an angular displacement between a boat and a dock.

As described herein, the structural spacing component of examples may allow for an angular displacement between the first article and the second article. FIG. 58 is illustrative of the angular displacement of a first article from a second article wherein the first article may comprise a boat 5801 and the second article may comprise a dock 5806 and such that a structural spacing component 5803 may be comprised between them. The structural spacing component may be affixed to a cleat 5802, or other affixment locations, comprising the boat and an affixment location 5805 comprising the dock 5806.

In the example provided in FIG. 58, the boat 5801 may be angularly displaced from the dock 5806 such that the cleats 5802 of the boat and the affixment locations 5805 comprising the dock 5806 may be located at a longitudinal displacement 5807 from one another, as illustrated in FIG. 58. In a continuing example of FIG. 58 the boat may be displaced at a positive and negative longitudinal distance from the boat. A positive longitudinal displacement maybe defined as a situation in which a first article and a second article may be configured such that the first article may be positioned at a higher longitudinal position than the second article. A negative longitudinal displacement between a first article and a second article may be defined as a situation in which the first article may be positioned at a lower longitudinal position than the second article. Therefore, as illustrated in FIG. 58, the boat 5801 may be comprised at a negative longitudinal displacement 5807 from the dock 5806.

Additionally, the structural spacing component of examples of the present subject matter may be angularly displaced between a first article and a second article such that there may be no longitudinal displacement and such that the first article and second article may be angularly displaced horizontally such that the structural spacing component may be configured to be comprised at an angular displacement with respect to the first and second article, but which may not be longitudinally displaced between the first and second article. Additionally, the structural spacing component of examples may be both longitudinally and horizontally displaced between a first and second article.

Figure 59:
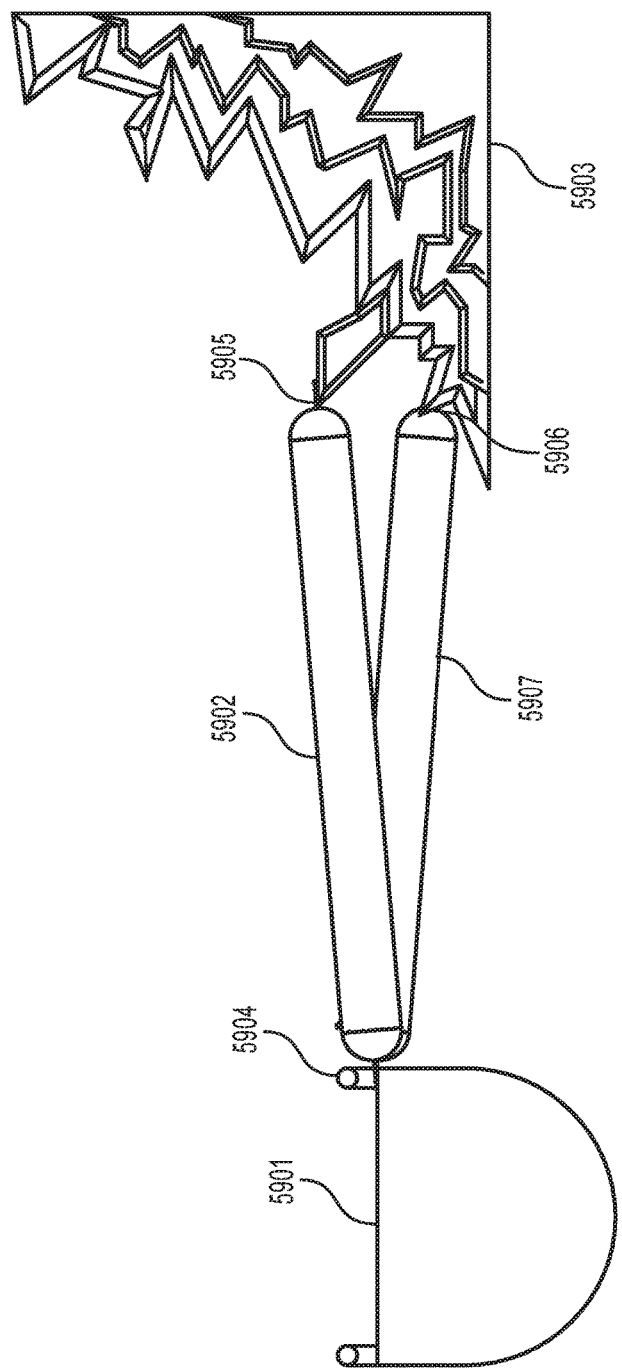
FIG. 59 is illustrative of a plurality of structural spacing components affixed between a boat and a rocky outcropping wherein the structural spacing components may be configured to be located at different angular displacements between the boat and the rocky outcropping.
Figure 60:
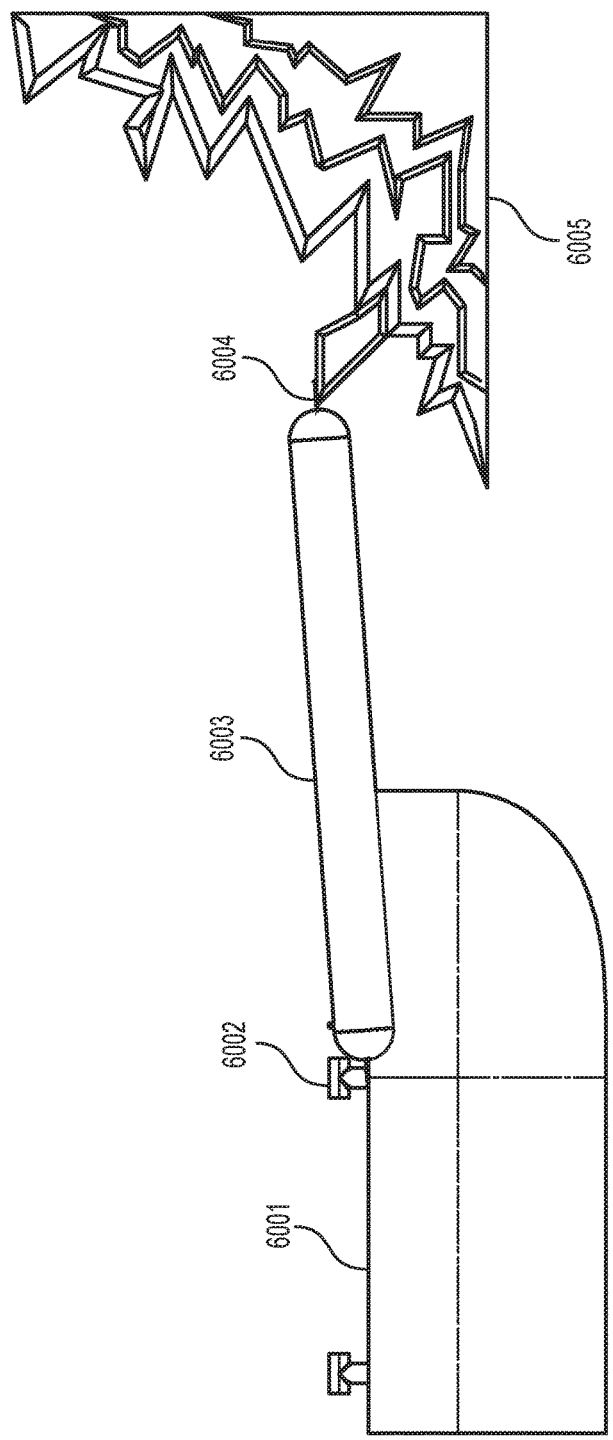
FIG. 60 is illustrative of a plurality of structural spacing components affixed between a boat and a rocky outcropping wherein the structural spacing components may be configured to be located at the same angular displacement between the boat and the outcropping.
Figure 61:
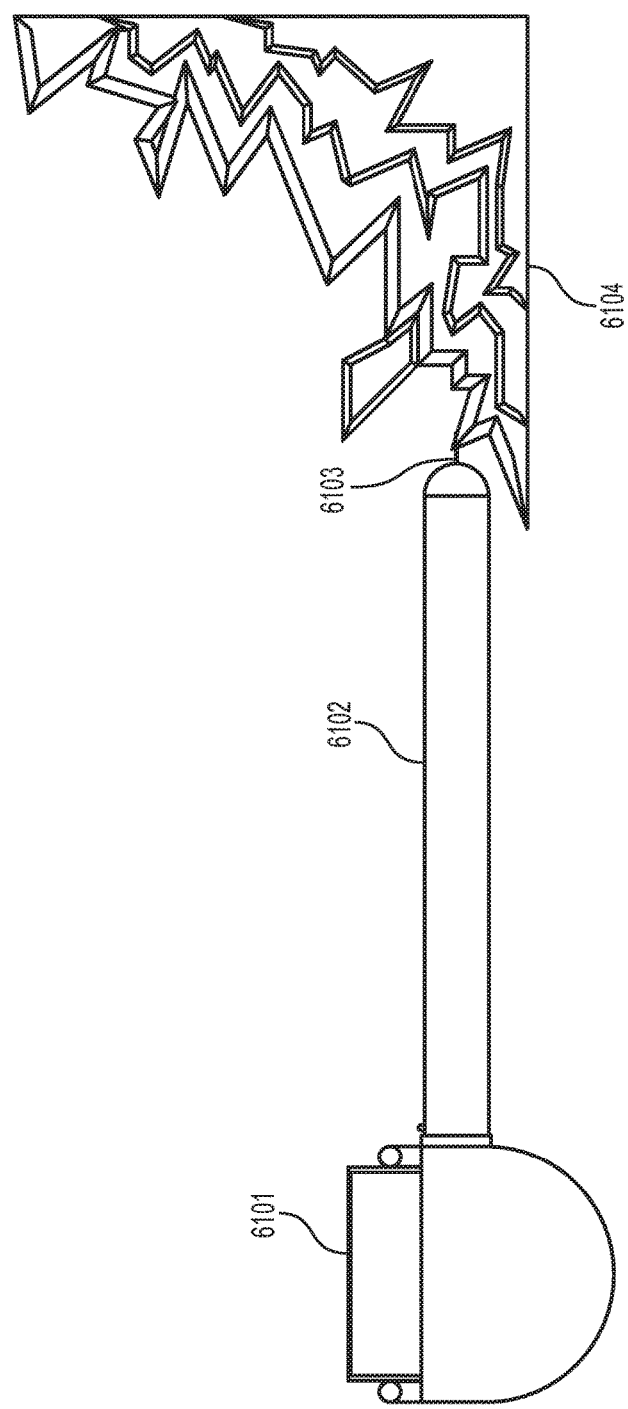
FIG. 61 is illustrative of a plurality of structural spacing components affixed between a boat and a rocky outcropping wherein the structural spacing components may be permanently affixed to the boat.

Examples of the structural spacing component described herein may comprise sufficient first lengths to separate a first article a significant distance from a second article. FIGS. 59-61 are illustrative of a first article comprising a boat and a second article comprising a rocky outcropping or wall configured to be separated a significant distance from one another through the use of structural spacing components of examples of the present subject matter.

FIG. 59 is illustrative of a plurality of structural spacing components 5902 and 5907 affixed to cleats 5904 comprising a boat 5901 and to affixment locations 5905 and 5906 comprising a rocky outcropping 5903. As illustrated in FIG. 59, the structural spacing components 5902 and 5907 may be affixed to the rocky outcropping 5903 and the boat 5901 at varying angular displacements between the two articles. As illustrated, structural spacing component 5902 may be configured to be located at a negative longitudinal displacement from the rocky outcropping, while structural spacing component 5907 may be configured to be located at a positive longitudinal displacement from the rocky outcropping 5903. The structural spacing components 5902 and 5907 may comprise sufficient length to separate the boat 5901 from the rocky outcropping 5903 such that the boat 5901 may not come into contact with the rocky outcropping 5903.

FIG. 60 is illustrative of a plurality of structural spacing components 6003 affixed to cleats 6002 of a boat 6001 and to affixment locations 6004 of a rocky outcropping 6005 such that the structural spacing components 6003 may be configured to be comprised at the same negative angular displacement between the boat 6001 and the rocky outcropping 6005. Additionally, the structural spacing components 6003 illustrated in FIG. 60 may be affixed to cleats 6002 located at the front most positions of the boat 6002 as opposed to cleats located on the same side of the boat as illustrated in FIG. 59.

FIG. 61 is additionally illustrative of a plurality of structural spacing components 6102 comprised between a boat 6101 and a rocky outcropping 6104 such that the structural spacing component 6102 may be permanently affixed to the boat 6101 and may be affixed to affixment locations 6103 of the rocky outcropping 6104.

As described herein, examples of the structural spacing component of the present subject matter may withstand compression and tension along a longitudinal axis to resist bending or buckling. Examples of the structural spacing component may be comprised of materials including, rubber, plastic, elastomeric materials and other materials. These materials may allow for a structural spacing component to be formed which may resist bending or buckling and may be configured such that the first article and second article may not collide and such that the tubular restrictive layer comprising the structural spacing component may not burst when the rigidizing media may be introduced into the interior region of the structural spacing component. Additionally, in examples of the tubular restrictive layer comprising the structural spacing component of the present subject matter, the tubular restrictive layer may comprise a braided structure.

Upon rigidization of a structural spacing component comprising a biaxial braided structure, tows comprising the braided structure may reorient to adopt the hose angle or neutral angle of the braided structure, in which the tensile and radial forces are in equilibrium. Upon application of external compression and tension forces, the braided structure comprising the structural spacing component will seek to regain the neutral angle, therefore resisting compression and tension forces.

As braided, tow orientations within a biaxial braided structure may only be held in place due to the friction between tow materials which may comprise the braided structure. Therefore, if these friction forces may be overcome, tows comprising the biaxial braided structure may shift. Subsequently, biaxial braided materials may move under application of external forces, or when subjected to compression and tension forces. Such movement may result in an increase or decrease in bias angle. Additionally, biaxial braided structures may increase or decrease in diameter while inversely decreasing or increasing in longitudinal length. Subsequently, the bias angle of a braided structure as manufactured prior to loading may be greater or less than the bias angle desired when the component is under load as desired for the application.

A braid hose angle may be defined as the angle between the longitudinal direction of a braided structure and a resultant force vector which may be obtained from the hoop and tensile forces applied to the braided structure upon rigidization in a partially or fully rigidized state. The hose angle, also known as the neutral angle, may be defined as the angle wherein the fibers may be loaded only by tensile forces. When a bias angle may be greater or less than the hose angle, unrestrained fibers under load may relocate such that the braided bias angle may increase or decrease until the fibers may be oriented along the hose angle. In an example, the neutral angle may be 54.7 degrees while in additional examples the neutral angle may vary by a few tenths of a degree greater or less than 54.7 degrees. In additional examples of the structural spacing component of examples comprising variable or transitory second lengths along the longitudinal axis of the structural spacing component, the hose angle may vary between sections of differing second lengths.

In an example of a rigidized or partially rigidized structural spacing component described herein in which a tubular restrictive layer may comprise a biaxial braided structure, the braided structure may be manufactured with a specific bias angle, which may be higher or lower than hose angle. As described herein, the braided structure may comprise positive and negative bias angles such that a first set of tows may be oriented with positive angles to the longitudinal axis and such that a second set of tows may be oriented at negative angles to the longitudinal axis. During rigidization of the structural spacing component of examples herein, tows comprising the braided structure may be reoriented wherein the tows may rise or fall to the hose angle upon rigidization of the structural spacing component to a partially or fully rigidized state. In an example in which the braided structure may be manufactured with bias angles greater than hose angle, the bias angles may be decreased and the braided structure may therefore decrease in one or a plurality of second lengths, and increase in the first length upon rigidization. Consequently, in a situation in which the structural spacing component comprising a braided structure may comprise bias angles less than hose angle, the bias may be increased, one or a plurality of second lengths may increase and the first length may decrease upon rigidization. In examples herein, the increase or decrease in one of the first or second lengths may be minimal.

The examples described above may be further described in relation to FIGS. 5A and 28. As described in this example, the tubular restrictive layer, comprising the structural spacing component of FIG. 5A may comprise a biaxial braided structure, comprised of constant braid architecture, such that there may be no changes in braid architecture along the longitudinal axis 520 comprising the structural spacing component. In this example, the braided structure comprising the tubular restrictive layer 411 of FIG. 5A may be manufactured to be comprised of bias angles like that illustrated by 2808 and 2809, such that a first set of tows may be oriented at bias angle 2808, at positive bias angles to the longitudinal axis, while a second set of tows may be oriented at bias angle 2809, and may comprise negative bias angles to the longitudinal axis. In this example, bias angles 2806 and 2807 may be representative of hose angle. In reference to FIG. 5A, upon rigidization, the tows comprising the braided structure may re-orient themselves such that the first and second sets of tows oriented at bias angles 2808 and 2809 may decrease until the tows may reach the same orientation defined by bias angles 2806 and 2807. Upon achieving bias angles like that illustrated in FIG. 28 by bias angles 2806 and 2807 the braided structure may increase slightly in longitudinal length 514 or 513 along the longitudinal axis 520, or the first length comprising the structural spacing component, and decrease in the second length, or the diameter 519 comprising the structural spacing component.

In a continued discussion of FIGS. 5A and 28, the braided structure comprising tubular restrictive layer 411 of FIG. 5A comprising bias angles like that illustrated by 2805 and 2804 in FIG. 28, the tows may again re-orient themselves upon rigidization. In this example, the braided structure comprising tubular restrictive layer 411 may be oriented generally along the longitudinal axis 520. Upon rigidization of the structural spacing component the bias angles 2805 and 2804 comprising the braided structure, may increase in bias angle, such that the bias angles comprising the braided structure may be like that illustrated by bias angles 2806 and 2807, or hose angle. In this manner, the structural spacing component may slightly decrease in the first length 514 or 513 and increase slightly in the second length 519 as defined herein.

In both these above described examples of a biaxial braided structure which may comprise a tubular restrictive layer of examples herein comprised in a rigidized state wherein the tows may be oriented at hose angle; if the braided structure were attempted to be bent or deformed, tow orientations within the braided structure may be attempted to be reoriented.

The above example may be described in relation to FIGS. 5A and 28. In this example the structural spacing component illustrated in FIG. 5A, wherein the tows may be oriented at hose angle, may be subjected to forces 523 and 525 which, as described herein may both comprise a force component in the same direction as force 522. Additionally, force 523 may comprise a force component in the same direction as force 515 and force 525 may comprise a force component in the same direction as force 517. Forces 523 and 525 may, acting in tandem, attempt to bend the structural spacing component illustrated in FIG. 5A. In this situation, tows comprising the structural spacing component located below the longitudinal axis 520 illustrated in FIG. 5A may experience greater tension forces than those located above the longitudinal axis 520. Further, the tows located above the longitudinal axis 520 may experience greater compression forces. The tows comprising the braided structure oriented at hose angle in this example, may experience some slight change, in bias angle away from hose angle, but may resist any reorientation such that the braided structure may seek to regain the hose angle, or equilibrium state initially comprised by the braided structure.

In additional examples of a structural spacing component comprising a braided structure, the braided structure may be coated with an elastomeric or other material. Additionally, in examples of a structural spacing component comprising a braided structure, the tubular restrictive layer may comprise a sleeve or liner for the retention of the rigidizing media of examples herein.

Triaxial braided structures comprising axial tows may inhibit the motion of bias tows and may therefore maintain more consistent diameters and lengths. Tows within a triaxial braided structure may be held by not only friction forces, as described herein with biaxial braided structures, but may additionally be held in place by axial fibers which may "lock" or greatly reduce the degree to which tow orientations may change within the braided structure of examples herein. Therefore, while some change in tow orientation may occur within a triaxial braided structure upon rigidization; triaxial braided structures may be stiffer and may resist a larger degree of compression and tensile forces when compared to biaxial braided structures.

Additionally, triaxial braided structures comprised of axial tow materials may be more resistant to bending than biaxial braided structures. As described herein, triaxial braided structures may be manufactured with axial tows all of a similar length or of different lengths which may lock in the shape of the braided structure. The presence of axial tows of a predefined length within triaxial braided structures may result in a stiff braided structure which may be more resistant to bending. The pre-defined lengths of axial tows within a braided structure may not allow for stretching, or elongation of the braided structure to occur, or may not allow for increased radii of curvature along any surface of the braided structure after formation of the braided structure. In examples of the present subject matter, triaxial braided structures may be manufactured to comprise bias angles higher than hose angle and may more efficiently carry loads than triaxial braided structures comprising bias angles lower than hose angle.

Described in examples herein is a structural spacing component comprising flexural stiffness to resist buckling and bending in compression and tension situations. In examples, the structural spacing component may be comprised of a tubular restrictive layer such that the tubular restrictive layer may comprise an interior region, which may retain a rigidizing media, and a longitudinal axis such that a first length, which may be the longest length comprising the structural spacing component, may lie along the longitudinal axis. Additionally the structural spacing component may comprise one or a plurality of second lengths which may be oriented to be transverse to the longitudinal axis wherein at least one of the second lengths may be configured to be smaller than the first length. Further, the structural spacing component of examples may additionally comprise ports such that a rigidizing media may be introduced and expelled from the interior region comprising the structural spacing component through the ports. The structural spacing component of examples herein may additionally be comprised of endcaps wherein the ends of the tubular restrictive layer may be affixed to the endcaps such that a rigidizing media may not escape the interior region comprising the structural spacing component of examples herein.

Described in examples herein is a structural spacing component comprising endcaps and a tubular restrictive layer comprising a braided structure wherein the ends of the tubular braided structure may be affixed to the endcaps such that the ends of each tow comprising the braided structure may be affixed to the endcaps, wherein movement, or reorientation, of tows comprising the braided structure may be constrained by the affixment of the tows to the endcaps. In examples, of structural spacing components comprising endcaps and a tubular restrictive layer comprising a braided structure, upon rigidization, tows comprising the braided structure may reorient to approximate hose angle due to the constraint of tow materials due to affixation of the ends of the tows to the endcaps.

Described herein is a structural spacing component comprising flexural stiffness to resist buckling and bending in compression and tension situations which may comprise a tubular restrictive layer comprised of a braided structure. The structural spacing component of examples herein may comprise a braided structure such that the braided structure may comprise a longitudinal axis, which may be the same as the longitudinal axis comprising the structural spacing component, and such that the braided structure may comprise at least a first set of tows oriented at negative angles to the longitudinal axis and a second set of tows oriented at positive angles to the longitudinal axis. Upon rigidization of a biaxial braided structure manufactured with bias angles less than hose angle, the first set of tows and second set of tows may change orientation such that the tows may increase in bias angle with respect to the longitudinal axis until hose angle may be achieved. Upon rigidization of a biaxial braided structure manufactured with bias angles greater than hose angle, the first set and second set of tows may change orientation such that the tows may decrease in bias angle with respect to the longitudinal axis until hose angle is achieved. Due to the reorientation of tows to hose upon rigidization, the braided structure may seek to regain hose angle upon application of tensile or compressive forces which therefore may allow for resistance to buckling and bending within the structural spacing component as deployed. In examples which may comprise a non-coated braided structure, the tubular restrictive layer comprising the structural spacing component may additionally comprise an elastomeric sleeve or liner, which may comprise the rigidizing media of examples herein. In additional examples, the tubular restrictive layer may comprise other materials in addition to an elastomeric material.

Described herein is a structural spacing component which may comprise sufficient flexural stiffness to resist buckling and bending which may comprise a braided structure. The braided structure may comprise a longitudinal axis and a first set of tows and a second set of tows wherein the first set of tows may be oriented at negative angles to the longitudinal axis and such that the second set of tows may be oriented at positive angles to the longitudinal axis. Upon rigidization of the braided structure, the tows comprising the first set of tows and second set of tows may reorient such that the tows may be comprised at hose angle, or may approximate hose angle. Upon application of an external force, the braided structure may seek to regain or maintain hose angle such that the external force may be resisted.

Described herein is a structural spacing component comprised of a tubular restrictive layer, comprising a tubular braided structure. The braided structure of examples may comprise a longitudinal axis, a first set of tows and a second set of tows such that the first set of tows may be oriented at negative angles to the longitudinal axis and the second set of tows may be oriented at positive angles to the longitudinal axis. Upon rigidization of the structural spacing component, the braided structure may be reoriented such that subsets of tows within each set of tows may be formed and such that each subset of tows may comprise at least one tow. Upon rigidization, each subset of tows may be re-oriented with respect to the longitudinal axis such that the positive or negative angular relationship with the longitudinal axis may be maintained. Additionally, each subset of tows may be reoriented at varying angular displacements with respect to the longitudinal axis such that the tows comprising the two sets of tows may achieve or approximate hose angle. Upon application of an external force, tows comprising each subset of tows may be attempted to be reoriented such that the tows may not be maintained at the same angle along the entire length of the tow such that there may be a plurality of portions of each tow which may be comprised at varying angular relationships with the longitudinal axis. Additionally, upon application of an external force, the braided structure comprising the structural spacing component may seek to regain hose angle and may therefore resist any deformation induced by the application of an external force.

In examples herein, the structural spacing component may comprise a boat standoff such that the structural spacing component may be configured to define a certain amount of space between a boat and another boat or article and such that the dimension of longest longitudinal length along the longitudinal axis comprising the structural spacing component may define the amount of space comprised between the two articles.

Described herein is a tubular spacing component having a longitudinal axis. The tubular spacing component may be configured to be at least partially inflated. The tubular spacing component may include a tubular restrictive layer. The tubular restrictive layer may include a braided structure with at least a first set of tows and at least a second set of tows intertwined along the longitudinal axis by at least a first angle with respect to each other when the tubular spacing component may be in a first configuration, and at least a subset of the first set of tows and at least a subset of the second set tows which may be reoriented by at least a second angle with respect to each other along the longitudinal axis when the tubular spacing component may be in a second configuration. The tubular spacing component may additionally comprise a first length along the longitudinal axis and at least one cross section having a diameter at a point along the first length wherein the diameter may have a second length less than the first length. The tubular restrictive layer may comprise an annular cross section along the longitudinal axis, and may further be configured to reorient the subset of first set of tows and the subset of second set of tows of the braided structure into the second configuration upon the tubular spacing component being at least partially inflated and may receive at least one of a compression force, a tension forces or a transverse force, wherein the second configuration may position the first length to be greater than the second length.

Described herein is a tubular spacing component which may be at least partially inflated and subject to at least one of a compression force, a tension force or a transverse force. The tubular spacing component may comprise a braided structure having a longitudinal axis and, defining an annular cross section, a first length along the longitudinal axis, at least one diameter at a point along the first length and the diameter having a second length. The second length may be less than the first length. The braided structure may be formed of at least a first set of tows and at least a second set of tows intertwined along the longitudinal axis by at least a first angle with respect to each other, and at least a subset of the first set of tows and at least a subset of the second set of tows which may be configured to be repositioned to be intertwined along the longitudinal axis by at least a second angle with respect to each other upon the tubular spacing component being at least partially inflated and being subjected to the at least one of the compression force, the tension force or the transverse force.

In examples of the structural component herein, the braided structure may further include a first end and a second end spaced apart by the first length and further comprising two ends caps positioned at the first end and the second end, wherein the end caps may provide a constraint to movement of the at least the subset of the first set of tows and the at least the subset of the second set of tows, the second angle being based, at least in part on, the constraint.

The structural component may further comprise a braided structure at least partially enclosing an interior region, the braided structure further including at least one opening, the opening configured to support the introduction of a rigidizing material into the interior region with which the tubular spacing component may be at least partially inflated.

In examples herein the braided structure may further include a hose angle and the second angle may based, at least in part on, the hose angle.

Additionally described herein is a tubular boat standoff having a longitudinal axis wherein the tubular boat standoff may be configured to provide a boundary between a first object and a second object along its longitudinal axis. The boat standoff may comprise a tubular restrictive layer at least partially enclosing an interior region such that the tubular restrictive layer may define a first length along a longitudinal axis and at least one cross section having a diameter at a point along the first length. The tubular restrictive layer may be formed of a plurality of braided strands. Additionally, the tubular restrictive layer may define at least a partially enclosed interior region and may have flexural stiffness in order to maintain the first length to be greater than the second length.

Described herein is a tubular spacing component having a longitudinal axis and which may be configured to be at least partially inflated, the tubular spacing component may include a tubular restrictive layer. The tubular restrictive layer may further include a braided structure with at least a first set of tows and at least a second set of tows intertwined along the longitudinal axis by at least a first angle. The tubular spacing component may comprise a first length along the longitudinal axis, at least one cross section having a diameter at a point along the first length, wherein the diameter may have a second length less than the first length, and the tubular restrictive layer may have an annular cross section along the longitudinal axis, and may receive at least one of a compression force, a tension forces or a transverse force, wherein the first length may be maintained to be greater than the second length. Additionally, the braided structure may comprise a third set of tows configured to be intertwined with the first set of tows and second set of tows and configured to be generally parallel with the longitudinal axis. Further, the braided structure may at least partially enclose an interior region and may further include at least one opening, such that the opening may be configured to support the introduction of a rigidizing material into the interior region with which the tubular spacing component may be at least partially inflated. Additionally, the braided structure may further include a first end and a second end spaced apart by the first length and may further comprise two ends caps positioned at the first end and the second end.

Further described herein is a tubular spacing component having a longitudinal axis and which may be configured to be at least partially inflated. The tubular spacing component may include a tubular restrictive layer, such that the tubular restrictive layer may include a braided structure including longitudinally varying architecture which may be comprised of a longitudinal axis and may include a plurality of tows. The plurality of tows may be contiguous along the longitudinal axis and at least some of the plurality of tows may be intertwined with one or more other tows of the plurality of tows. Additionally, one of the plurality of tows may be removed from being intertwined with a remaining plurality of tows along a portion of the longitudinal axis and the removed tow may be intertwined with the remaining plurality of tows along another portion of the longitudinal axis. The tubular spacing component may additionally comprise a first length along the longitudinal axis, at least one cross section having a diameter at a point along the first length, such that the diameter may have a second length less than the first length. Additionally the tubular restrictive layer may have an annular cross section along the longitudinal axis, and may receive at least one of a compression force, a tension forces or a transverse force, wherein the first length may be maintained to be greater than the second length.

Further described herein is a boat standoff comprising a longitudinal axis and which may be configured to be at least partially inflated. The boat standoff may include a tubular restrictive layer, wherein the tubular restrictive layer may comprise a first length along the longitudinal axis, at least one cross section having a diameter at a point along the first length, such that the diameter may have a second length less than the first length. Additionally the boat standoff may comprise a first end and a second end spaced apart by the first length and which may further comprise two ends caps positioned at the first end and the second end. Further, the tubular restrictive layer may at least partially enclose an interior region, wherein the braided structure may further include at least one opening. The opening may be configured to support the introduction of a rigidizing material into the interior region with which the tubular spacing component may be at least partially inflated. In an example the rigidizing material may be air.

Further examples of structural components herein may comprise elastomeric coatings and affixment devices.

While the above subject matter has been illustrated and described in detail in the drawings and foregoing discussion, the same is to be considered as illustrative and not restrictive in character, it being understood that example examples have been shown and described and that all changes and modifications that come within the scope and spirit of the invention are embraced by the disclosure.

The invention claimed is:

1. A tubular spacing component having a longitudinal axis and configured to be at least partially inflated, the tubular spacing component including a tubular restrictive layer, the tubular restrictive layer including a braided structure with at least a first set of tows and at least a second set of tows intertwined along the longitudinal axis by at least a first angle with respect to each other when the tubular spacing component is in a first configuration, and at least a subset of the first set of tows and at least a subset of the second set tows being reoriented by at least a second angle with respect to each other along the longitudinal axis when the tubular spacing component is in a second configuration, the tubular spacing component comprising:
a first length along the longitudinal axis, at least one cross section having a diameter at a point along the first length, the diameter having a second length less than the first length; and
the tubular restrictive layer having an annular cross section along the longitudinal axis, and being further configured to reorient the subset of first set of tows and the subset of second set of tows of the braided structure into the second configuration upon the tubular spacing component being at least partially inflated and receiving at least one of a compression force, a tension forces or a transverse force, wherein the second configuration positions the first length to be greater than the second length.

2. A tubular spacing component which may be at least partially inflated and subject to at least one of a compression force, a tension force or a transverse force, the tubular spacing component comprising:
a braided structure having a longitudinal axis and defining an annular cross section, a first length along the longitudinal axis, at least one diameter at a point along the first length and the diameter having a second length, the second length being less than the first length; and wherein the braided structure is formed of at least a first set of tows and at least a second set of tows intertwined along the longitudinal axis by at least a first angle with respect to each other, and at least a subset of the first set of tows and at least a subset of the second set of tows being configured to be repositioned to be intertwined along the longitudinal axis by at least a second angle with respect to each other upon the tubular spacing component being at least partially inflated and being subjected to the at least one of the compression force, the tension force or the transverse force.

3. The tubular spacing component of claim 2, further comprising:
wherein the braided structure further includes a first end and a second end spaced apart by the first length and further comprising two ends caps positioned at the first end and the second end, wherein the end caps provide a constraint to movement of the at least the subset of the first set of tows and the at least the subset of the second set of tows, the second angle being based, at least in part on, the constraint.

4. The tubular spacing component of claim 2, further comprising:
the braided structure at least partially enclosing an interior region, the braided structure further including at least one opening, the opening configured to support the introduction of a rigidizing material into the interior region with which the tubular spacing component is at least partially inflated.

5. The tubular spacing component of claim 2, further comprising:
wherein the braided structure further includes a hose angle and the second angle is based, at least in part on, the hose angle.

6. A tubular boat standoff having a longitudinal axis, the tubular boat standoff configured to provide a boundary between a first object and a second object along the longitudinal axis, the boat standoff comprising:
a tubular restrictive layer at least partially enclosing an interior region, the tubular restrictive layer defining a first length along the longitudinal axis and at least one cross section having a diameter at a point along the first length, the tubular restrictive layer formed of a plurality of braided strands;
the partially enclosed interior region including a flexural stiffness configured to maintain the first length to be greater than the second length; and
a first end and a second end spaced apart by the first length, the first end configured to be affixed to the first object and the second end configured to be spaced apart from the first object.

7. A tubular spacing component having a longitudinal axis and configured to be at least partially inflated, the tubular spacing component including a tubular restrictive layer, the tubular restrictive layer including a braided structure with at least a first set of tows and at least a second set of tows intertwined along the longitudinal axis by at least a first angle, the tubular spacing component comprising:
a first length along the longitudinal axis, at least one cross section having a diameter at a point along the first length, the diameter having a second length less than the first length; and
the tubular restrictive layer having an annular cross section along the longitudinal axis, and receiving at least one of a compression force, a tension forces or a transverse force, wherein the first length is maintained to be greater than the second length.

8. The tubular spacing component of claim 4 comprising:
a coating applied to the tubular restrictive layer for the retention of a rigidizing material.

9. The tubular spacing component of claim 7 further comprising:
a third set of tows configured to be intertwined with the first set of tows and second set of tows and configured to be generally parallel with the longitudinal axis.

10. The tubular spacing component of claim 8 additionally comprising:
the braided structure at least partially enclosing an interior region, the braided structure further including at least one opening, the opening configured to support the introduction of a rigidizing material into the interior region with which the tubular spacing component is at least partially inflated.

11. The tubular spacing component of claim 10 comprising:
wherein the braided structure further includes a first end and a second end spaced apart by the first length and further comprising two ends caps positioned at the first end and the second end.

12. A tubular spacing component having a longitudinal axis and configured to be at least partially inflated, the tubular spacing component including a tubular restrictive layer, the tubular restrictive layer including a braided structure along the longitudinal axis and including varying architecture comprising:
the braided structure including a plurality of tows;
the plurality of tows being contiguous along the longitudinal axis;
at least some of the plurality of tows being intertwined with one or more other tows of the plurality of tows;
one of the plurality of tows being removed from being intertwined with a remaining plurality of tows along a portion of the longitudinal axis; and
the removed tow being intertwined with the remaining plurality of tows along another portion of the longitudinal axis
a first length along the longitudinal axis, at least one cross section having a diameter at a point along the first length, the diameter having a second length less than the first length; and
the tubular restrictive layer having an annular cross section along the longitudinal axis, and receiving at least one of a compression force, a tension forces or a transverse force, wherein the first length is maintained to be greater than the second length.

13. A water vehicle standoff having a longitudinal axis, the water vehicle standoff comprising:
a tubular restrictive layer configured to transition from a deflated position to at least a partially inflated position;
a first length along the longitudinal axis, at least one cross section having a diameter at a point along the first length, the diameter having a second length less than the first length; and
a first end and a second end spaced apart by the first length, the first end configured to be affixed to a water vehicle and the second end configured to be spaced apart from the water vehicle.

14. The boat standoff of claim 13 comprising:
the second end configured to be spaced apart from the boat based, at least in part, on the first length.

15. The boat standoff of claim 13 comprising:
the tubular restrictive layer at least partially enclosing an interior region, the braided structure further including at least one opening, the opening configured to support the introduction of a rigidizing material into the interior region with which the tubular spacing component is at least partially inflated.

16. The boat standoff of claim 15, the rigidizing material is air.

17. The boat standoff of claim 13 further comprising at least one affixment device.

18. The boat standoff of claim 2 further comprising at least one affixment device.

19. The tubular spacing component of claim 2 is a buoy for a water vehicle.

20. The water vehicle standoff of claim 13 is a buoy.

* * * * *